United States Patent
Lucera et al.

(10) Patent No.: US 6,874,690 B2
(45) Date of Patent: Apr. 5, 2005

(54) MODULAR OMNIDIRECTIONAL BAR CODE SYMBOL SCANNING SYSTEM WITH AT LEAST ONE SERVICE PORT FOR REMOVABLE INSTALLATION OF SCAN MODULE INSERT

(75) Inventors: Mark Lucera, Pine Hill, NJ (US); Timothy A. Good, Clementon, NJ (US); Mark S. Schmidt, Williamstown, NJ (US); Matt Jefferson, Seaville, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 48 days.

(21) Appl. No.: 10/138,936

(22) Filed: May 3, 2002

(65) Prior Publication Data

US 2003/0141367 A1 Jul. 31, 2003

Related U.S. Application Data

(63) Continuation-in-part of application No. 10/138,934, filed on May 3, 2002, and a continuation-in-part of application No. 10/053,486, filed on Jan. 16, 2002, and a continuation-in-part of application No. 10/045,577, filed on Jan. 11, 2002, and a continuation-in-part of application No. 10/045,605, filed on Jan. 11, 2002.

(51) Int. Cl.[7] ............................................... G06K 7/10
(52) U.S. Cl. ............................... 235/462.4; 235/462.25
(58) Field of Search .............................. 235/462, 472, 235/470, 454, 494

(56) References Cited

U.S. PATENT DOCUMENTS

| | | |
|---|---|---|
| 3,902,048 A | 8/1975 | Fleischer et al. |
| 3,947,816 A | 3/1976 | Rabedeau |
| 4,093,865 A | 6/1978 | Nickl |
| 4,333,006 A | 6/1982 | Gorin et al. |
| 4,647,143 A | 3/1987 | Yamazaki et al. |
| 4,652,732 A | 3/1987 | Nicki |
| 4,794,237 A | 12/1988 | Ferrante |

(Continued)

FOREIGN PATENT DOCUMENTS

| | | | |
|---|---|---|---|
| EP | 0 663 643 A2 | 7/1995 | ............ G06K/7/10 |
| WO | WO 99/01839 | 1/1999 | |

OTHER PUBLICATIONS

Product Brochure for the Magellan SL 360–Degree Scanner/Scale by PSC Inc., Webster, NY, Feb. 2000, pp. 1–2.

Primary Examiner—Thien M. Le
(74) Attorney, Agent, or Firm—Thomas J. Perkowski, Esq., P.C.

(57) ABSTRACT

A modular omnidirectional laser-based bar code symbol scanning system having at least one scan module insert that is removably disposed (e.g., removably installed) within a system housing (or portion thereof) through a service port (e.g., opening) in the system housing (or portion thereof). The scan module insert is a self-contained unit including at least the following components (in addition to mechanical support structures for such components): at least one laser diode, a rotating scanning element, an electric motor that rotates the rotating scanning element, one or more photodetectors, and analog signal processing circuitry that conditions (e.g., amplifies and/or filters out unwanted noise in) the electrical signal produced by the one or more photodetectors. The scan module insert can optionally include additional components including one or more light collecting optical elements, one or more beam folding mirrors, circuitry for detecting and decoding bar code symbols scanned by the system, etc. The modular architecture of omnidirectional laser scanner of the present invention enables quick access to the scan module insert for efficient repair/reconfiguration/configuration of the optical components, electro-optical, electro-mechanical components and/or electrical components integral thereto.

32 Claims, 78 Drawing Sheets

U.S. PATENT DOCUMENTS

| | | |
|---|---|---|
| 4,795,224 A | 1/1989 | Goto |
| 4,861,973 A | 8/1989 | Hellekson et al. |
| 4,960,985 A | 10/1990 | Knowles |
| 5,000,529 A | 3/1991 | Katoh et al. |
| 5,026,975 A | 6/1991 | Guber et al. |
| 5,039,184 A | 8/1991 | Murakawa et al. |
| 5,073,702 A | 12/1991 | Schuhmacher |
| 5,132,524 A | 7/1992 | Singh et al. |
| 5,206,491 A | 4/1993 | Katoh et al. |
| 5,229,588 A | 7/1993 | Detwiler et al. |
| 5,286,961 A | 2/1994 | Saegusa |
| 5,343,027 A | 8/1994 | Knowles et al. |
| 5,361,158 A | 11/1994 | Tang |
| 5,459,308 A | 10/1995 | Detwiler et al. |
| 5,475,207 A | 12/1995 | Bobba et al. |
| 5,479,000 A * | 12/1995 | Dvorkis et al. ........ 235/472.01 |
| 5,491,328 A | 2/1996 | Rando |
| 5,495,097 A | 2/1996 | Katz et al. |
| 5,557,093 A | 9/1996 | Knowles et al. |
| 5,684,289 A | 11/1997 | Detwiler et al. |
| 5,689,102 A | 11/1997 | Schonenberg et al. |
| 5,693,930 A | 12/1997 | Katoh et al. |
| 5,705,802 A | 1/1998 | Bobba et al. |
| 5,723,852 A | 3/1998 | Rando et al. |
| 5,801,370 A | 9/1998 | Katoh et al. |
| 5,834,708 A | 11/1998 | Svetal et al. |
| 5,837,988 A | 11/1998 | Bobba et al. |
| 5,869,827 A | 2/1999 | Rando |
| 5,886,336 A | 3/1999 | Tang et al. |
| 5,914,481 A * | 6/1999 | Danielson et al. ..... 235/462.15 |
| 5,917,175 A * | 6/1999 | Miller et al. ........... 235/472.01 |
| 6,065,679 A * | 5/2000 | Levie et al. ........... 235/462.47 |
| 6,069,700 A | 5/2000 | Rudnick et al. |
| 6,098,885 A | 8/2000 | Knowles et al. |
| 6,117,080 A | 9/2000 | Schwartz |
| 6,213,397 B1 | 4/2001 | Rando |
| 6,223,986 B1 | 5/2001 | Bobba et al. |
| 6,237,852 B1 | 5/2001 | Svetal et al. |
| 6,290,134 B1 * | 9/2001 | Rando et al. .......... 235/472.01 |
| 6,330,973 B1 | 12/2001 | Bridgelall et al. |
| 6,357,659 B1 * | 3/2002 | Kelly et al. ............ 235/462.01 |
| 6,390,370 B1 * | 5/2002 | Plesko ................... 235/462.49 |
| 6,536,670 B1 * | 3/2003 | Postman et al. ............ 235/487 |
| 6,572,019 B1 * | 6/2003 | Rando et al. .......... 235/472.01 |
| 6,578,765 B2 * | 6/2003 | Huss et al. .................. 235/454 |
| 6,685,092 B2 | 2/2004 | Patel et al. |
| 2001/0017320 A1 | 8/2001 | Knowles et al. |

\* cited by examiner

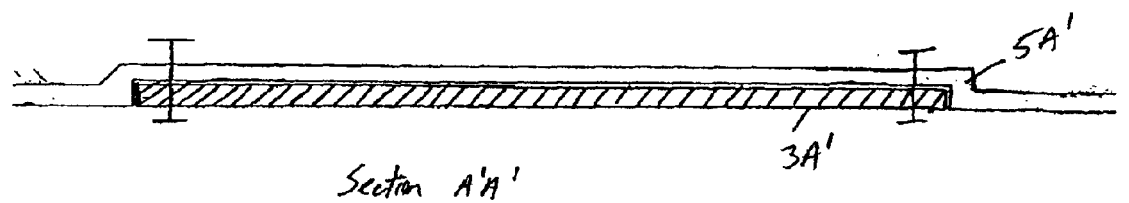
Section A'A'
FIG. 1C1
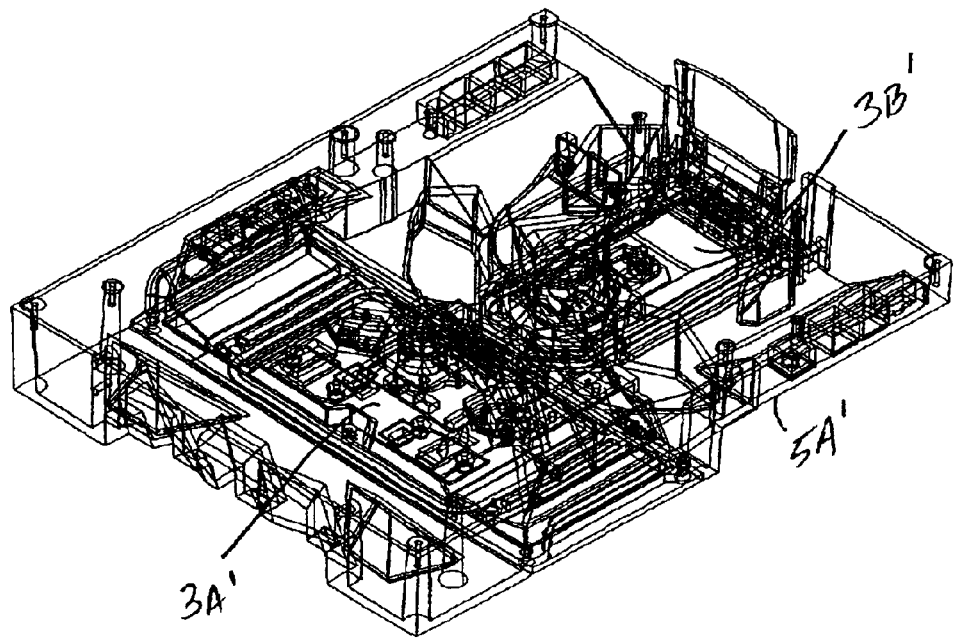
FIG. 1C2

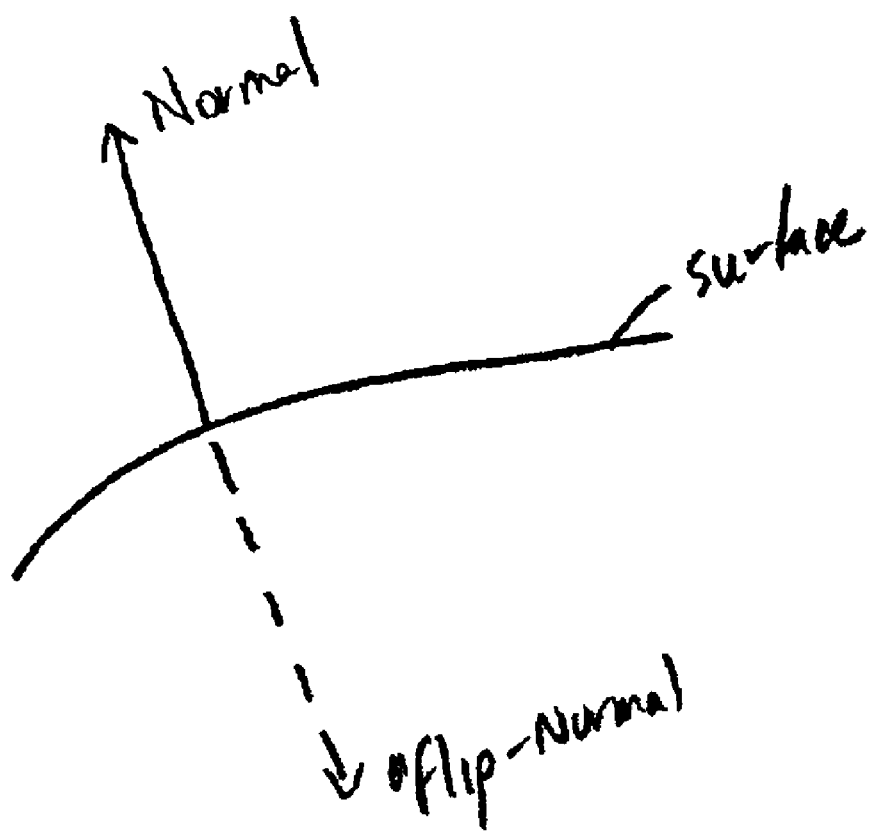

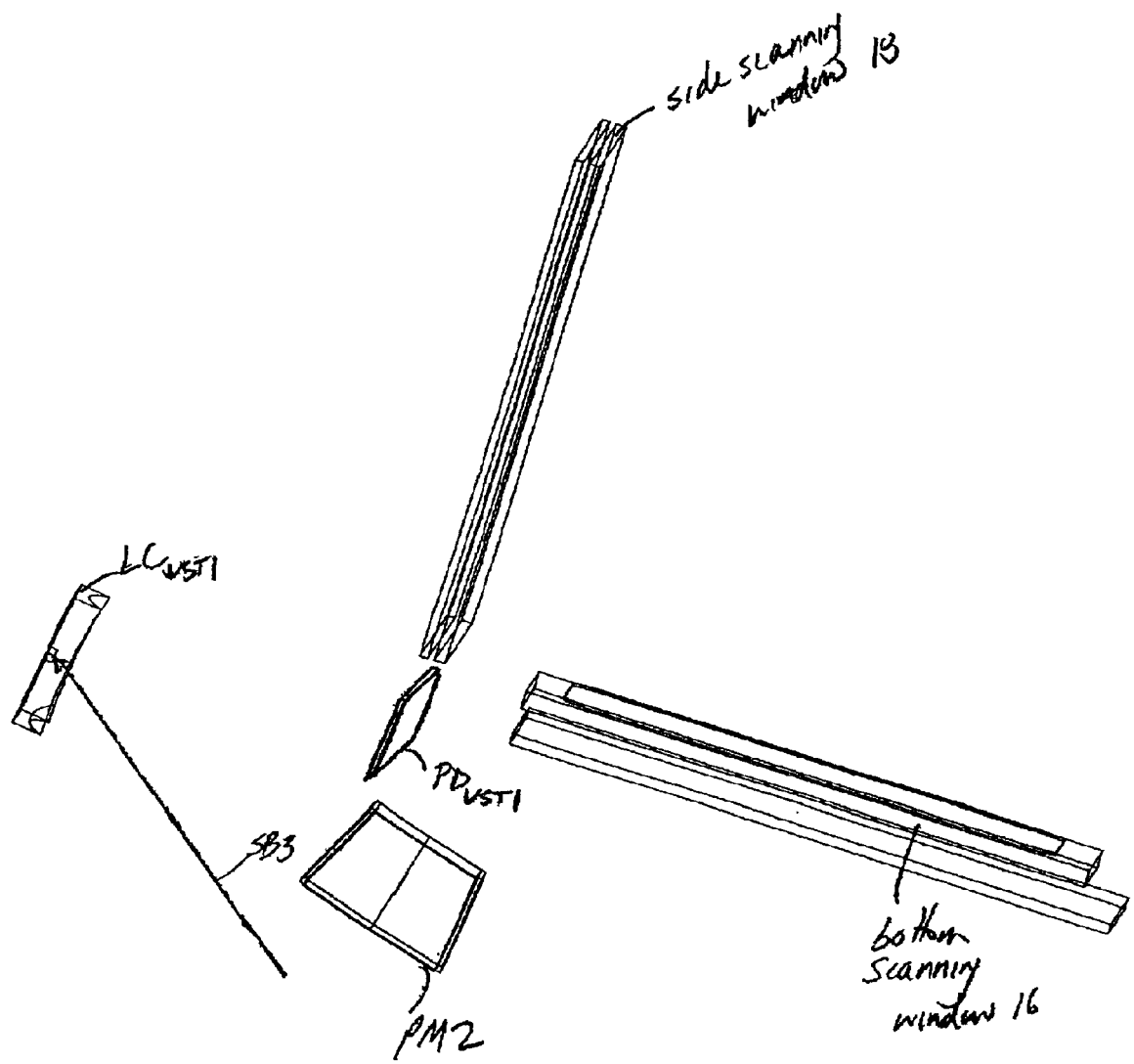

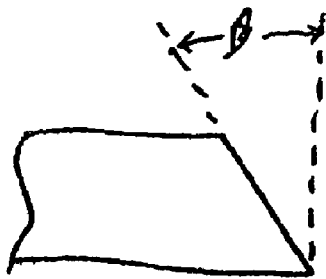
First Polygon PM1
$\beta_1 = 11.6°$
$\beta_2 = 13.3°$
$\beta_3 = 14.9°$
$\beta_4 = 16.6°$
Second Polygon PM2
$\beta_1 = 10°$
$\beta_2 = 12°$
$\beta_3 = -10°$
$\beta_4 = -12°$
FIG. 2N1

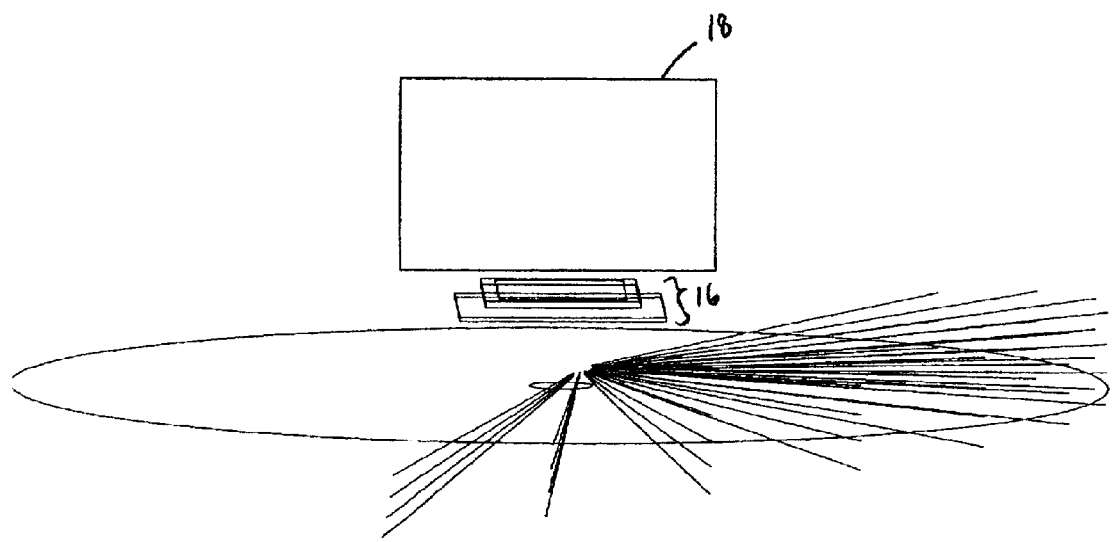
FIG. 2 N2

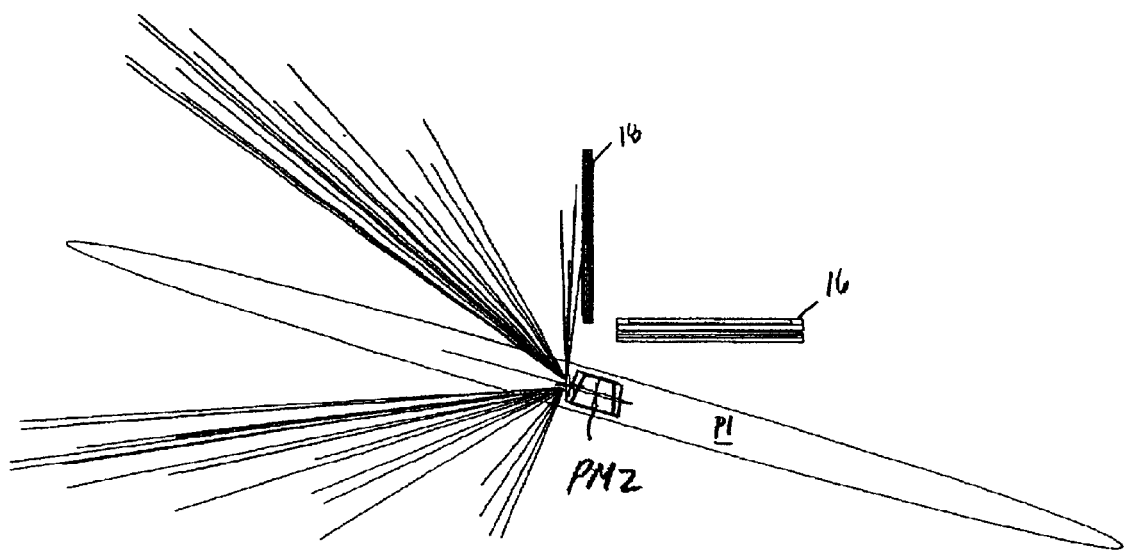
FIG. 2N3

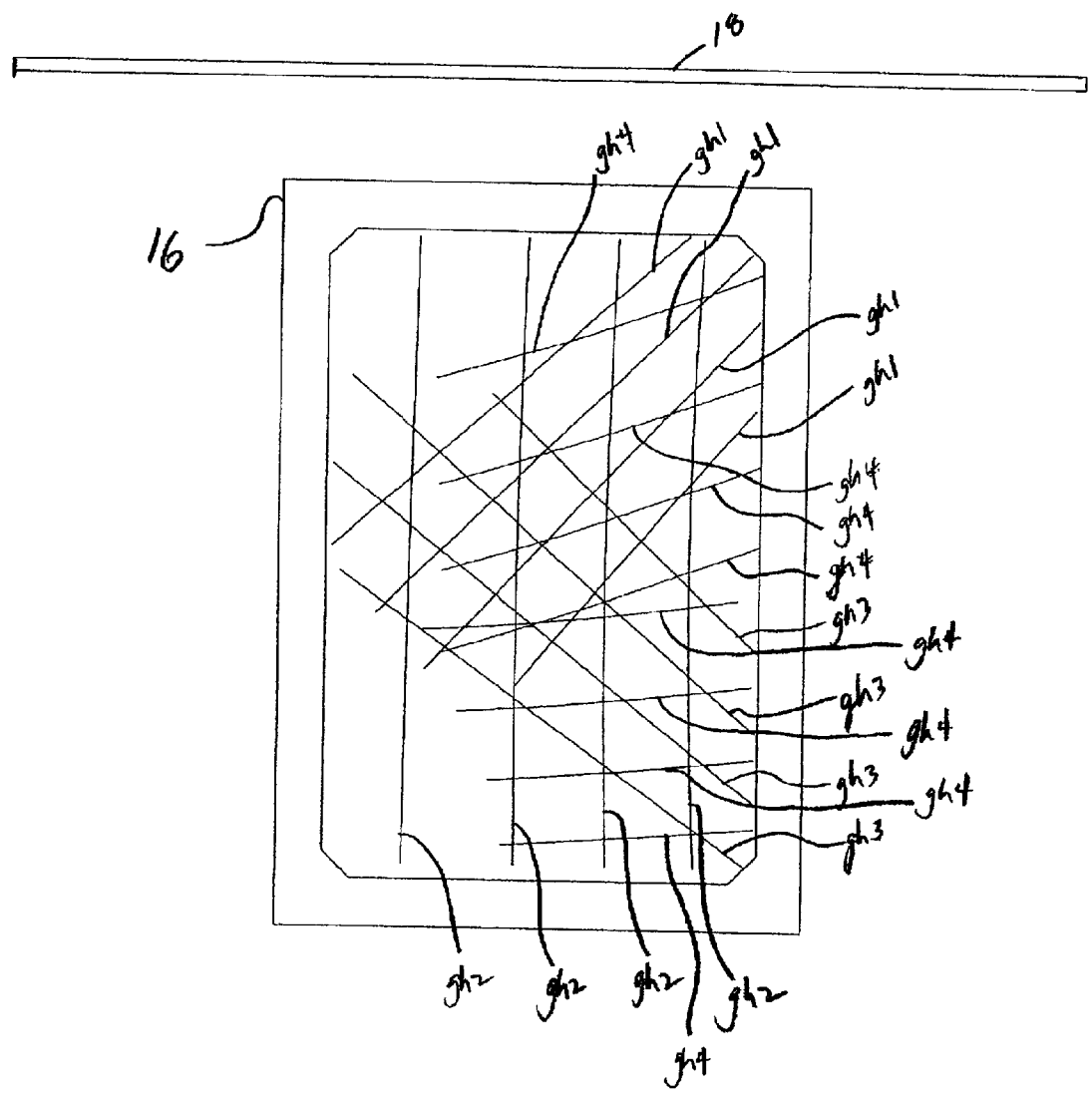

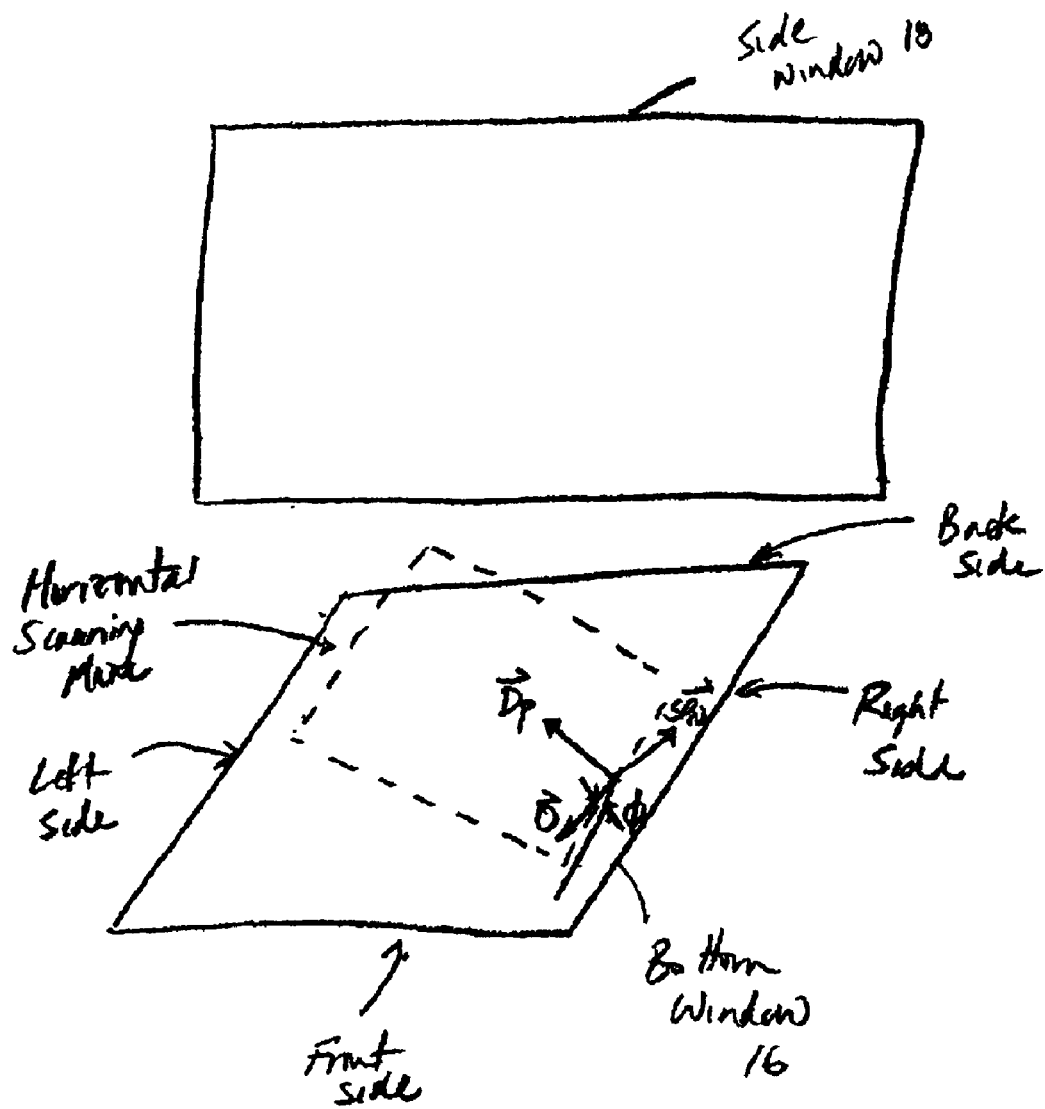
Fig. 3B1

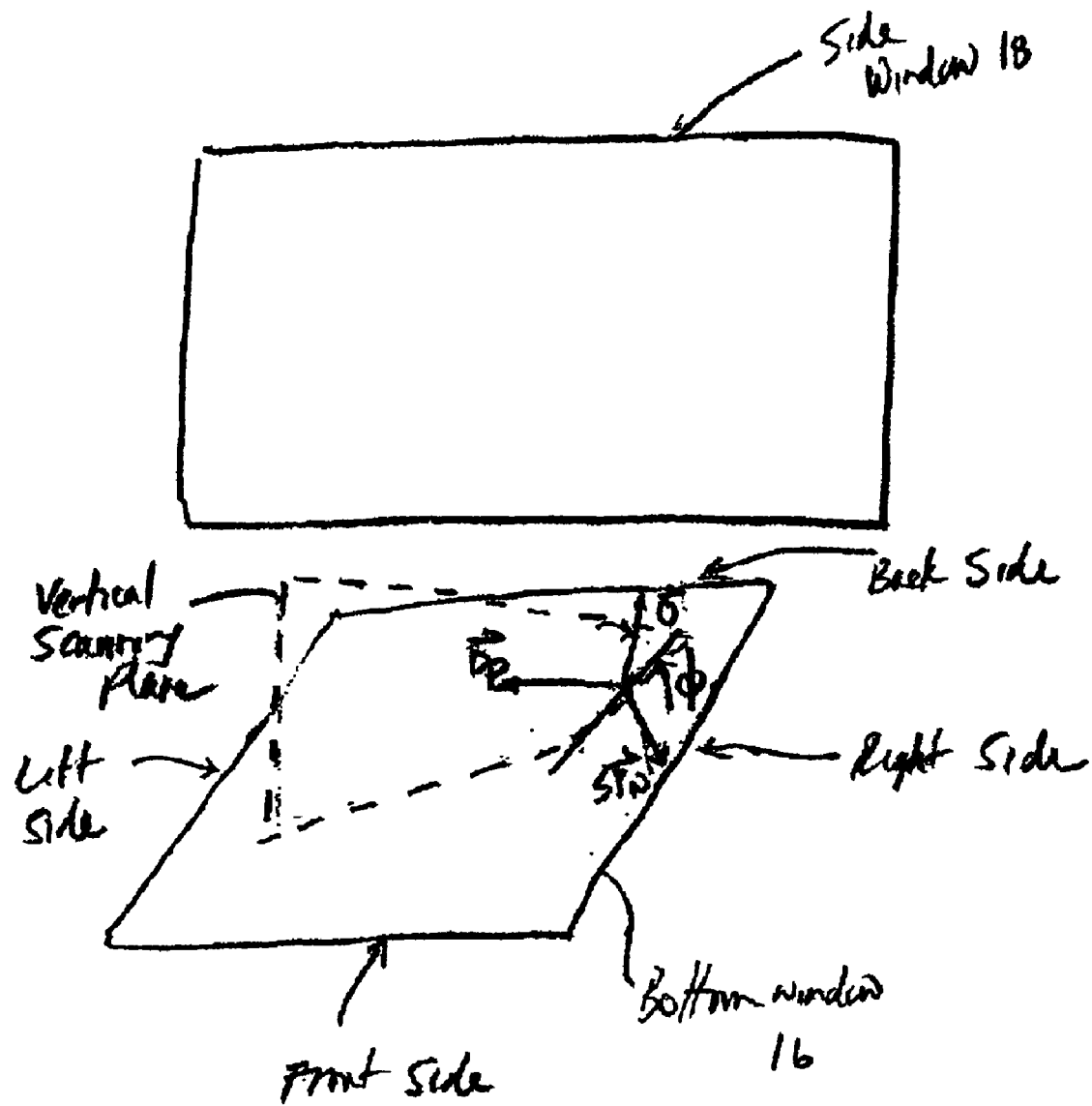
FIG. 3B2

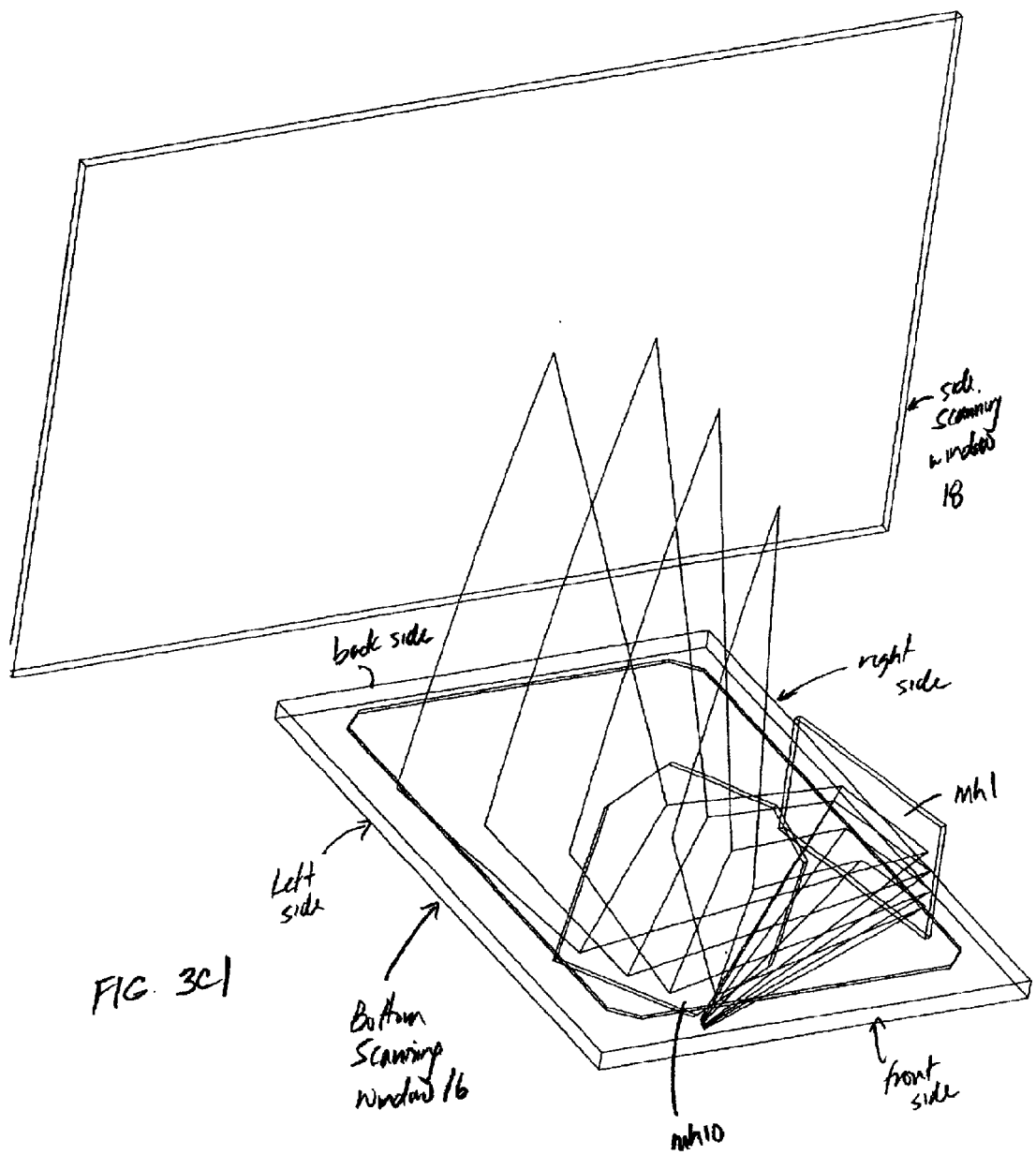

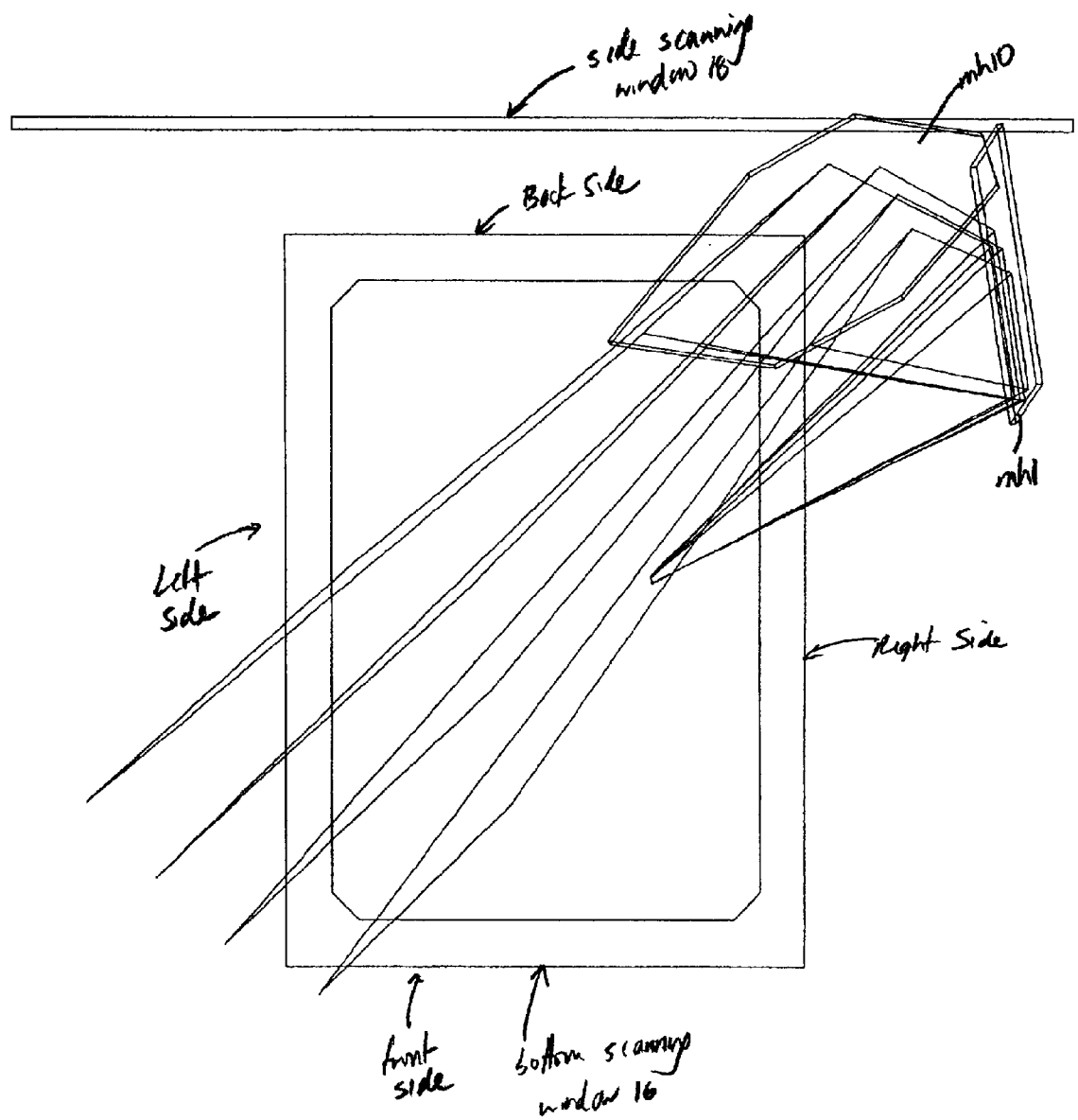

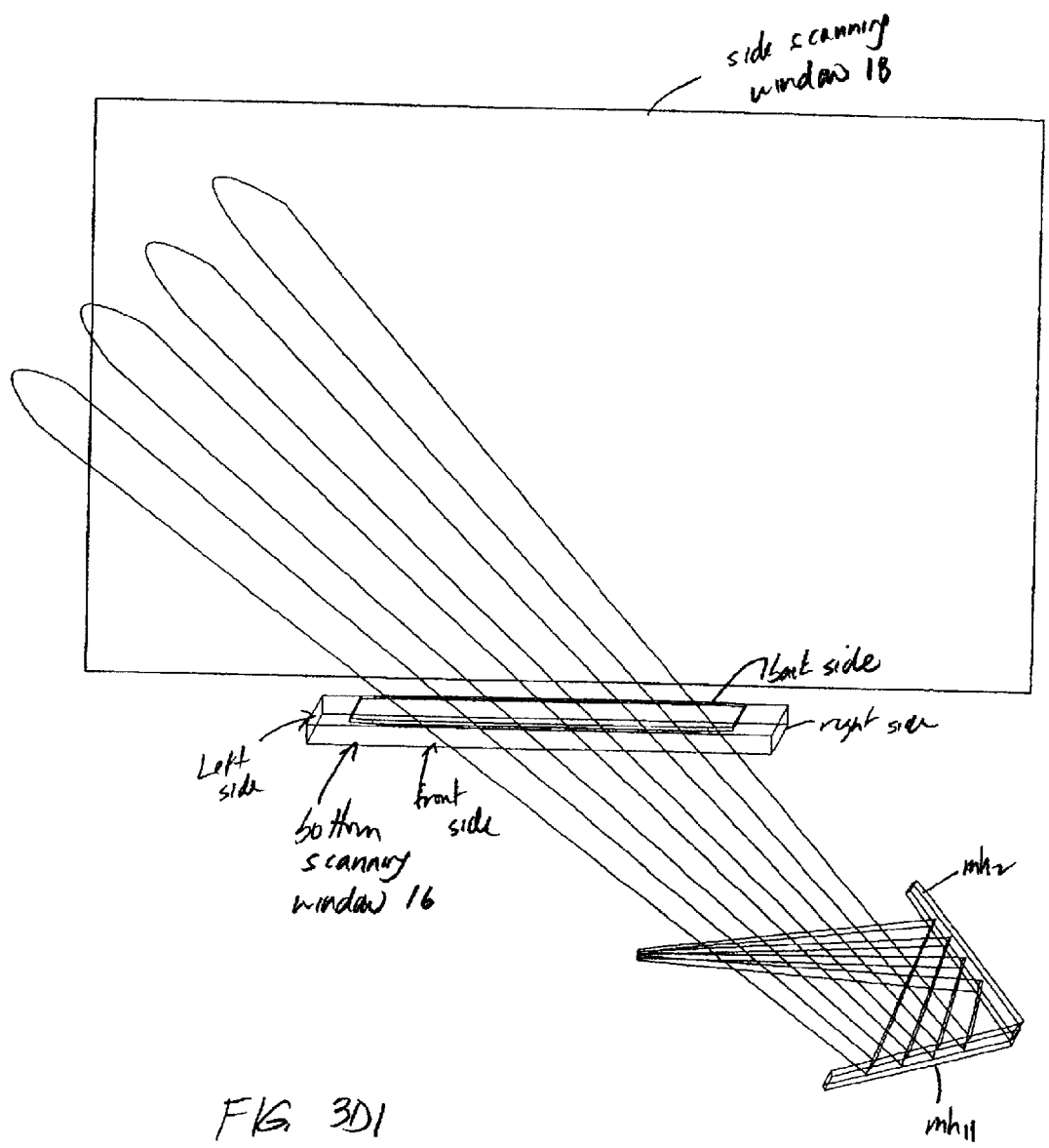
FIG. 3D1

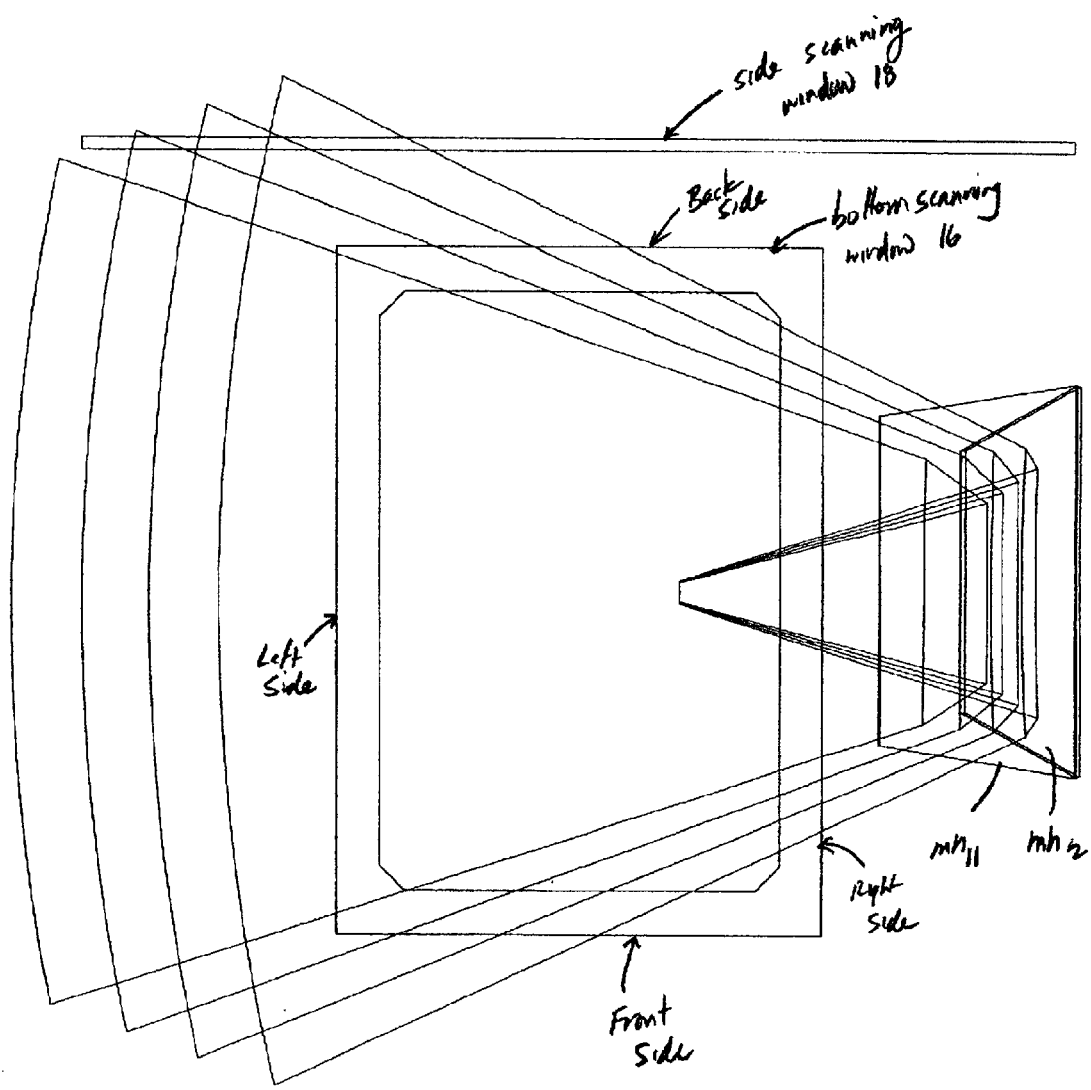
FIG. 3D2

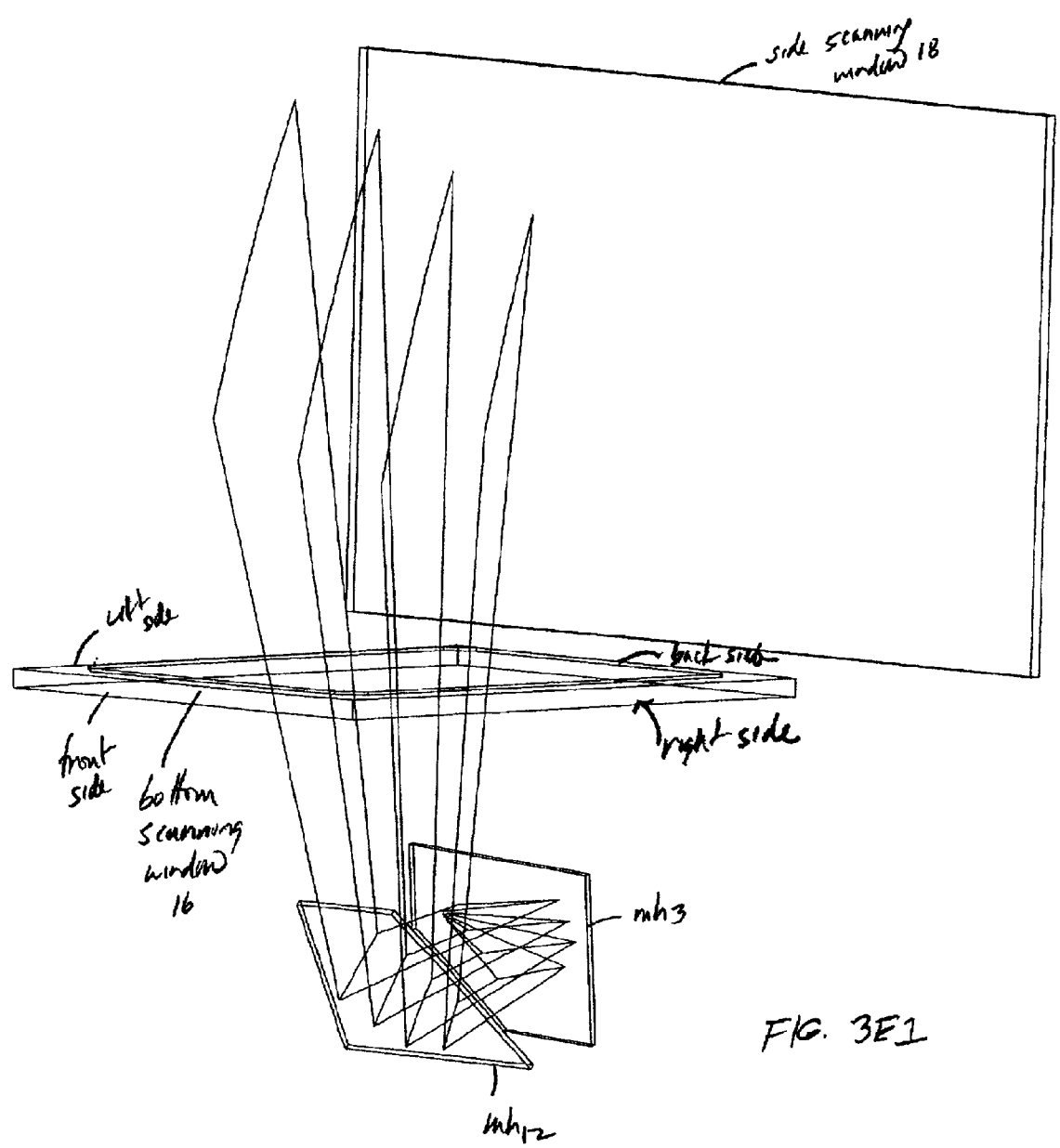

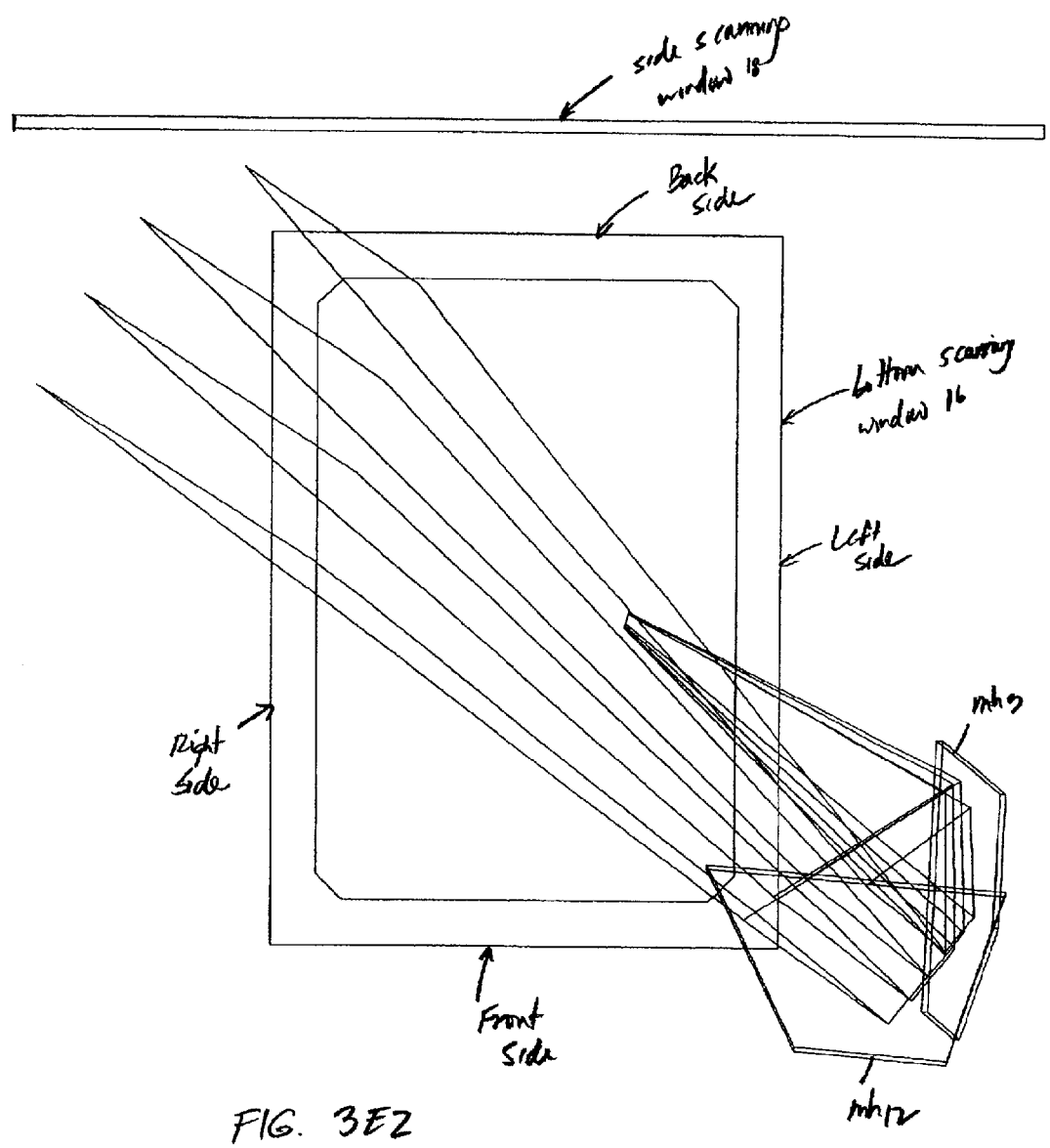
FIG. 3E2

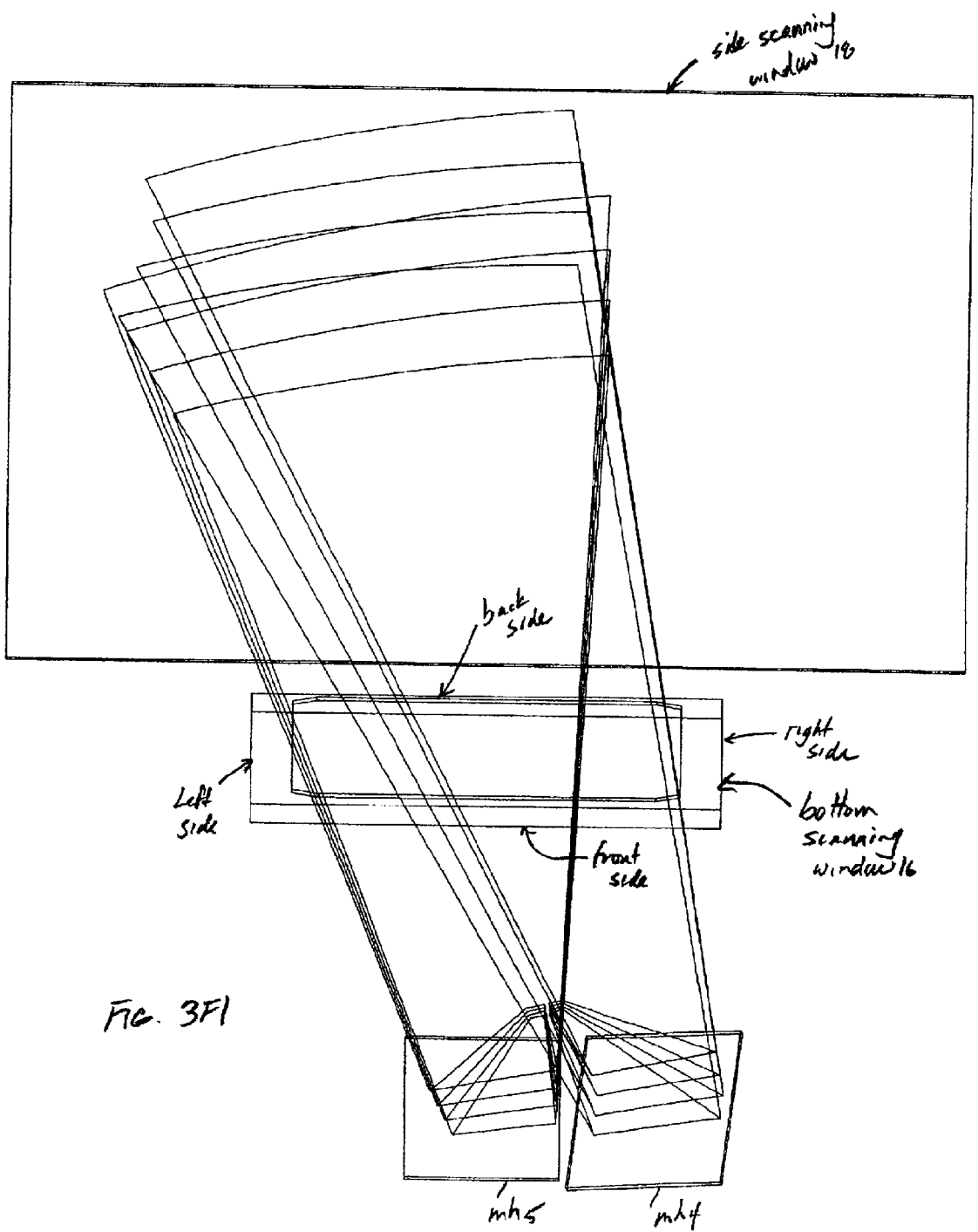
FIG. 3F1

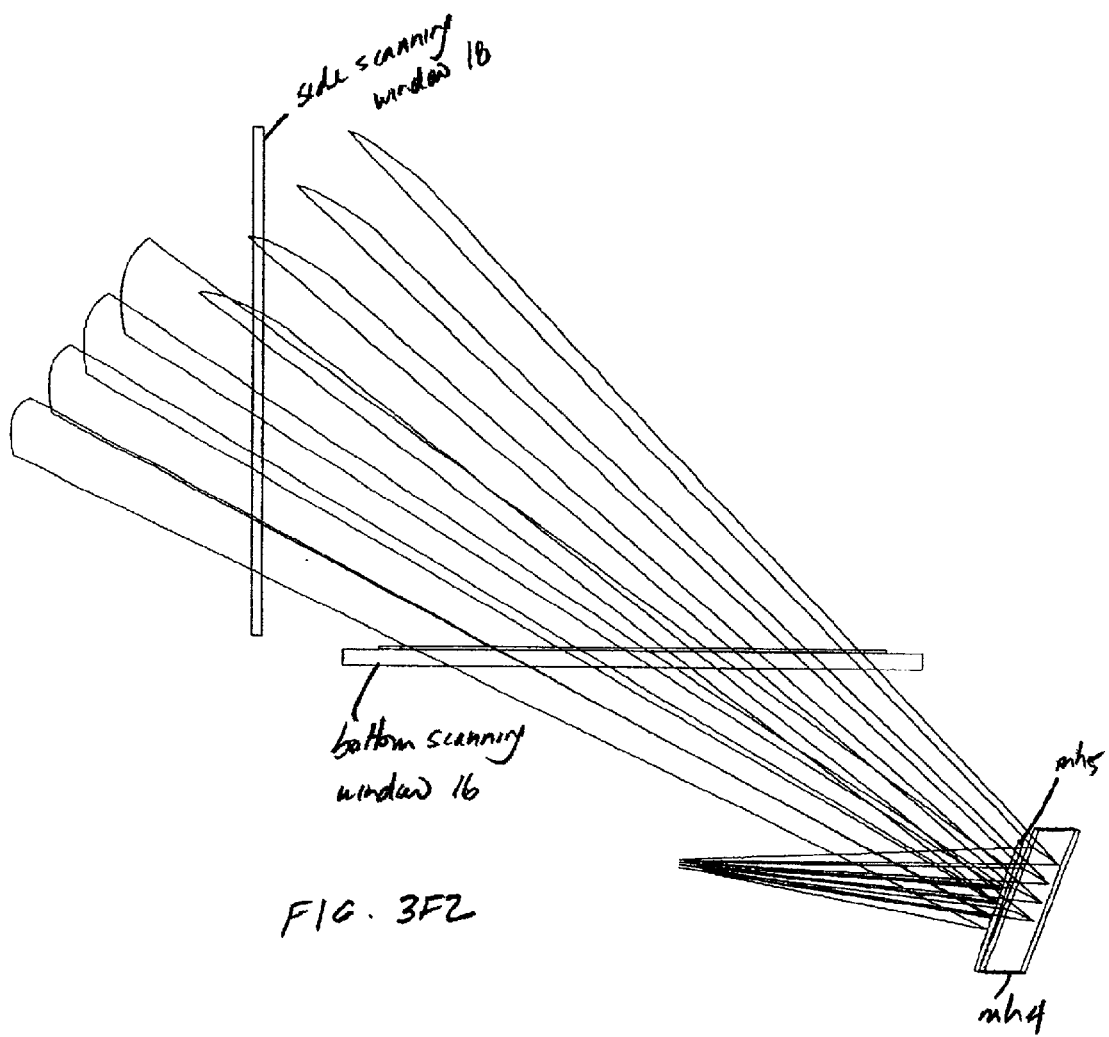
FIG. 3F2

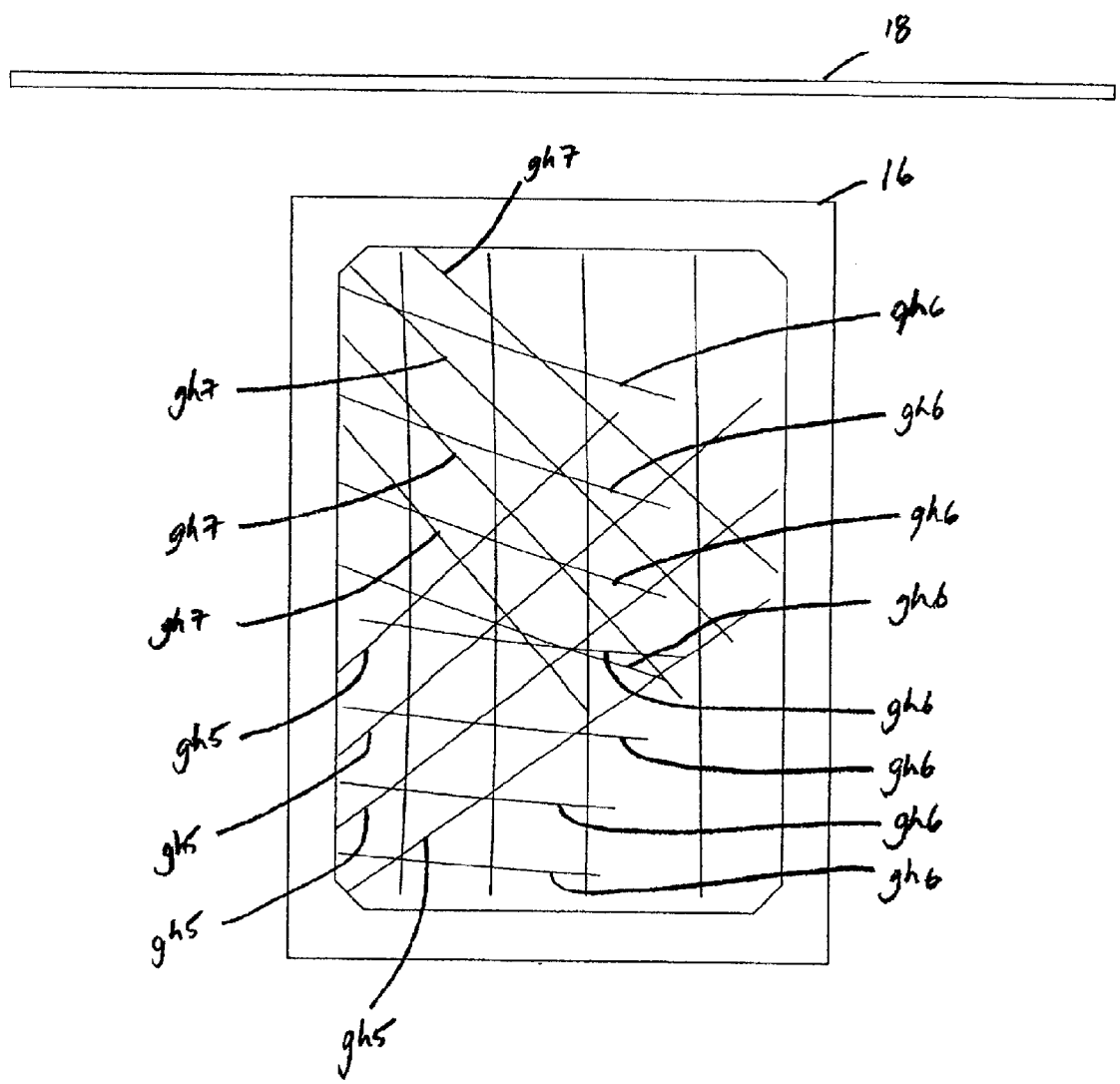

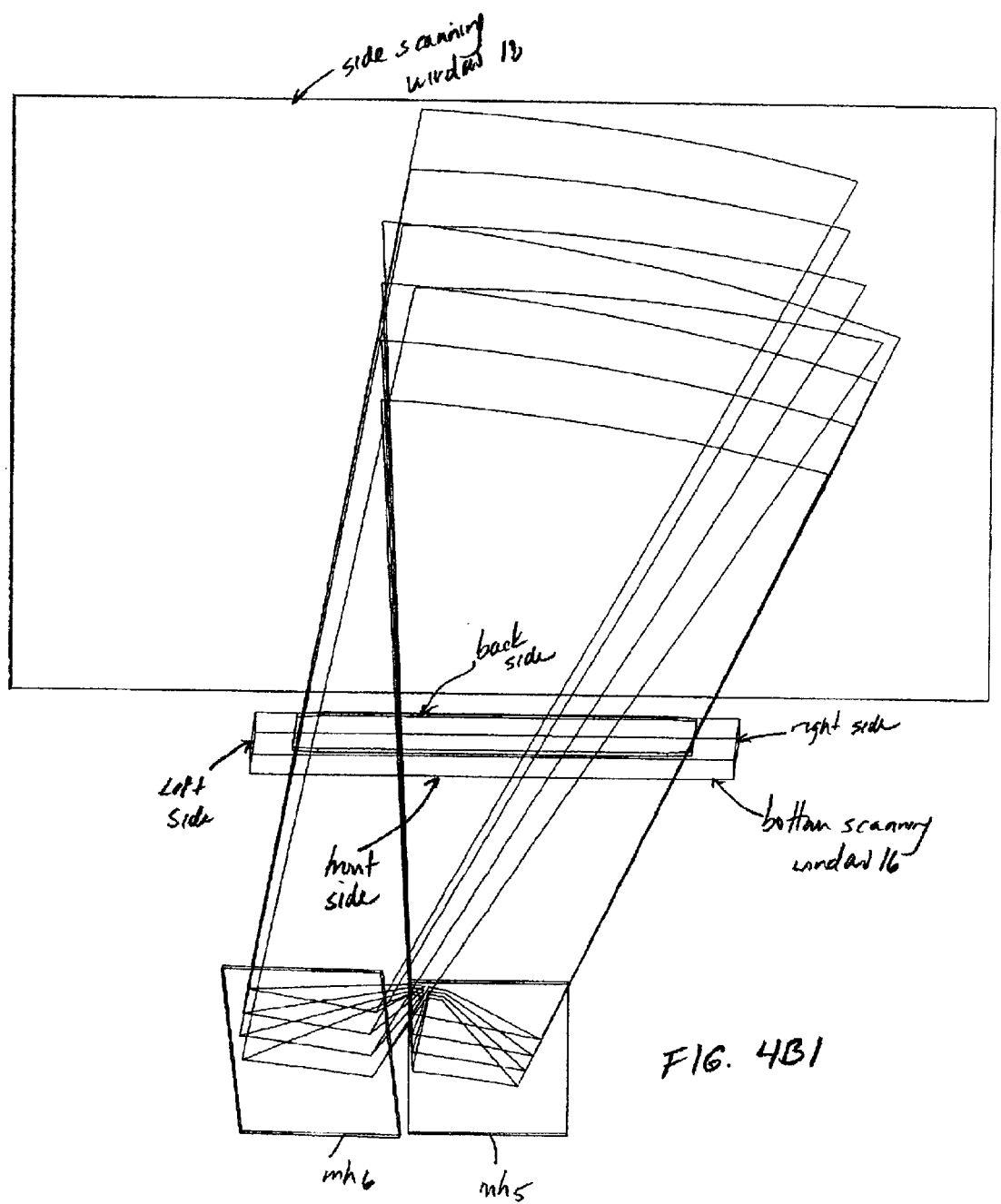
FIG. 4B1

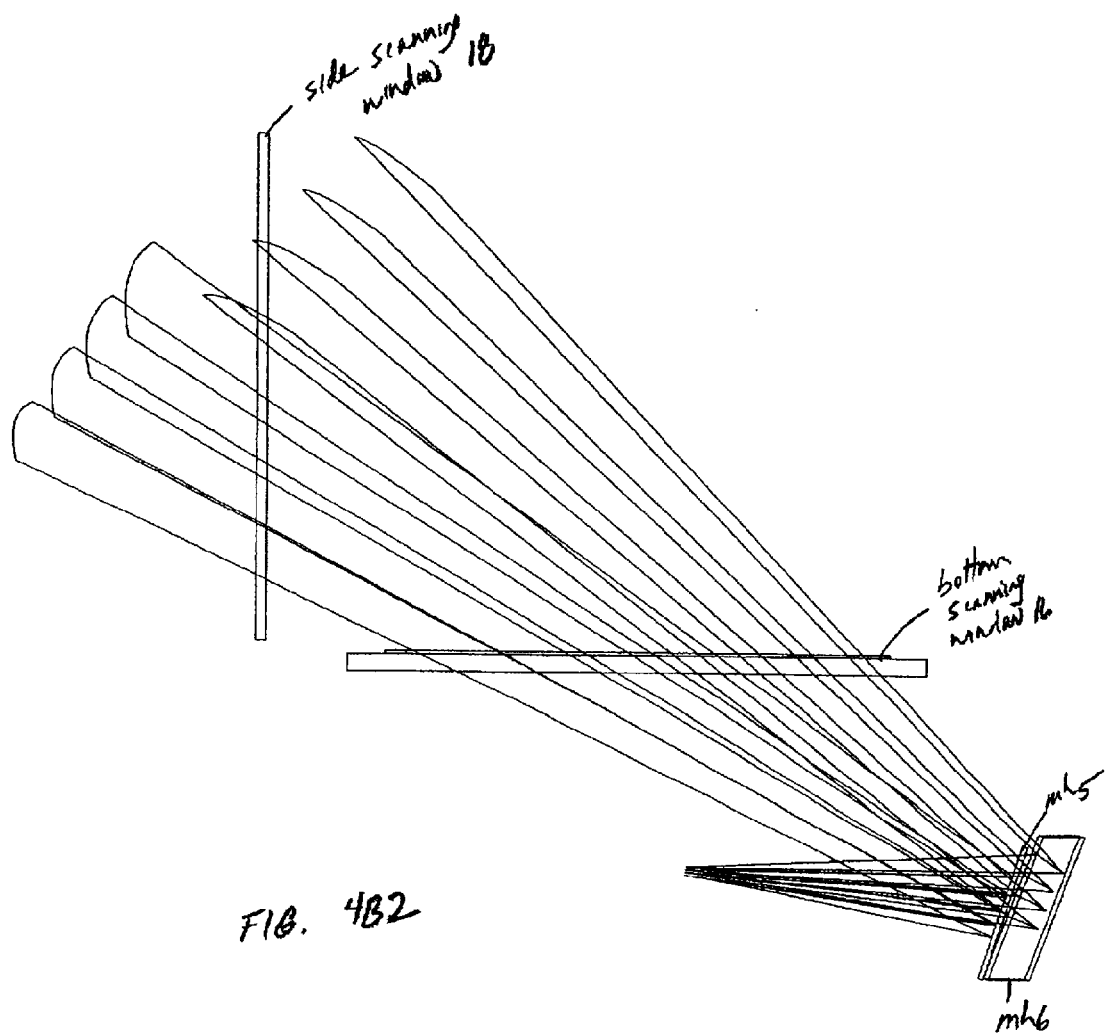
FIG. 4B2

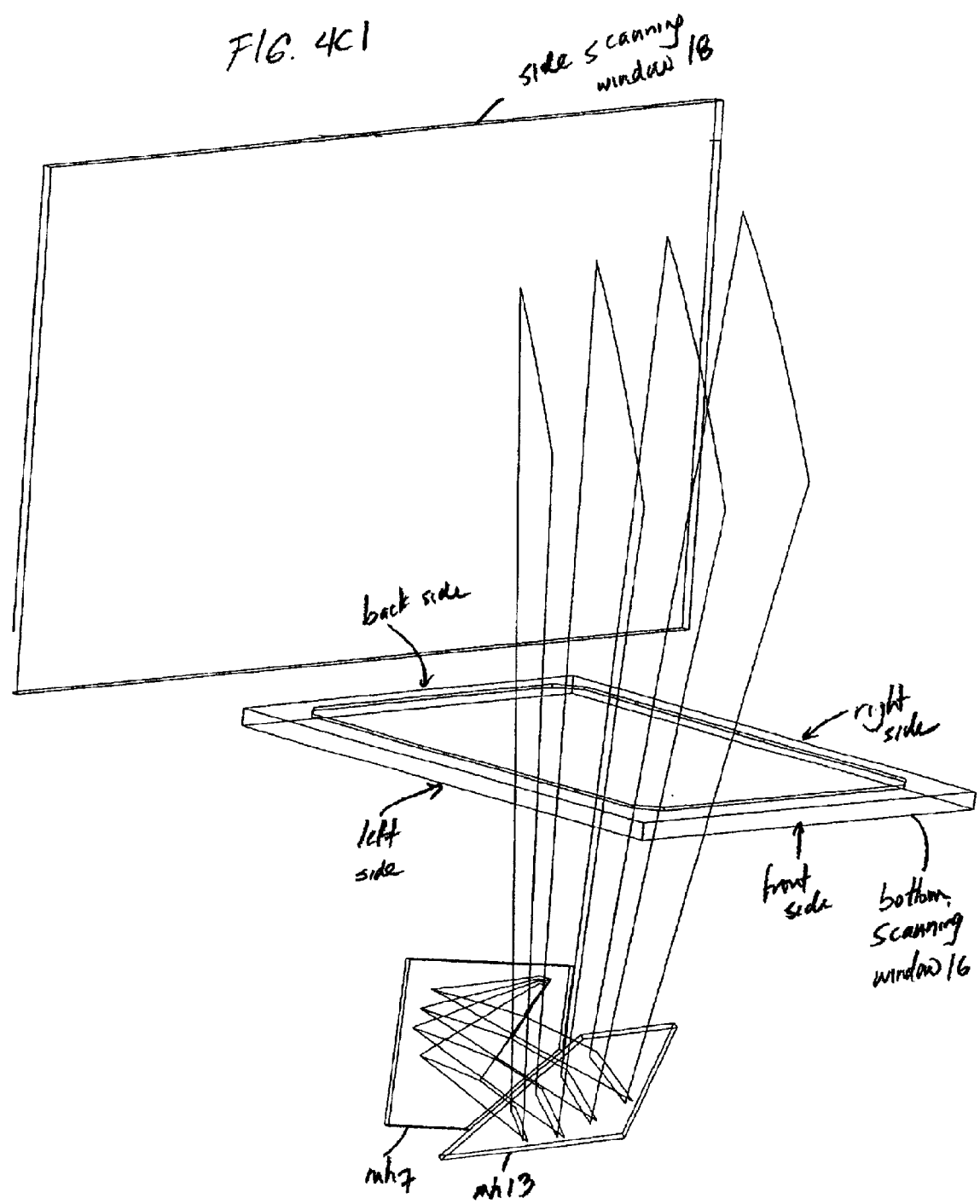

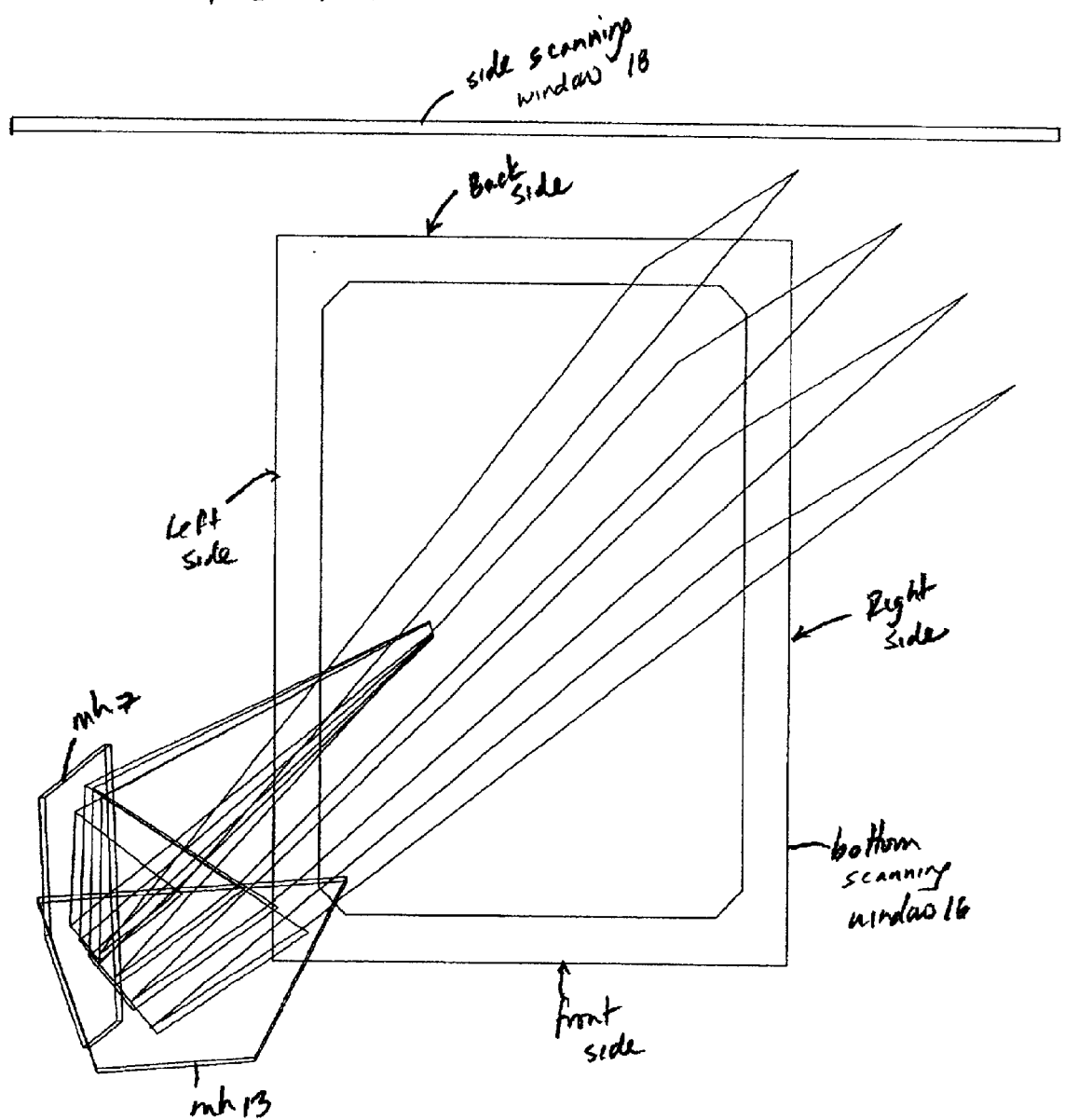

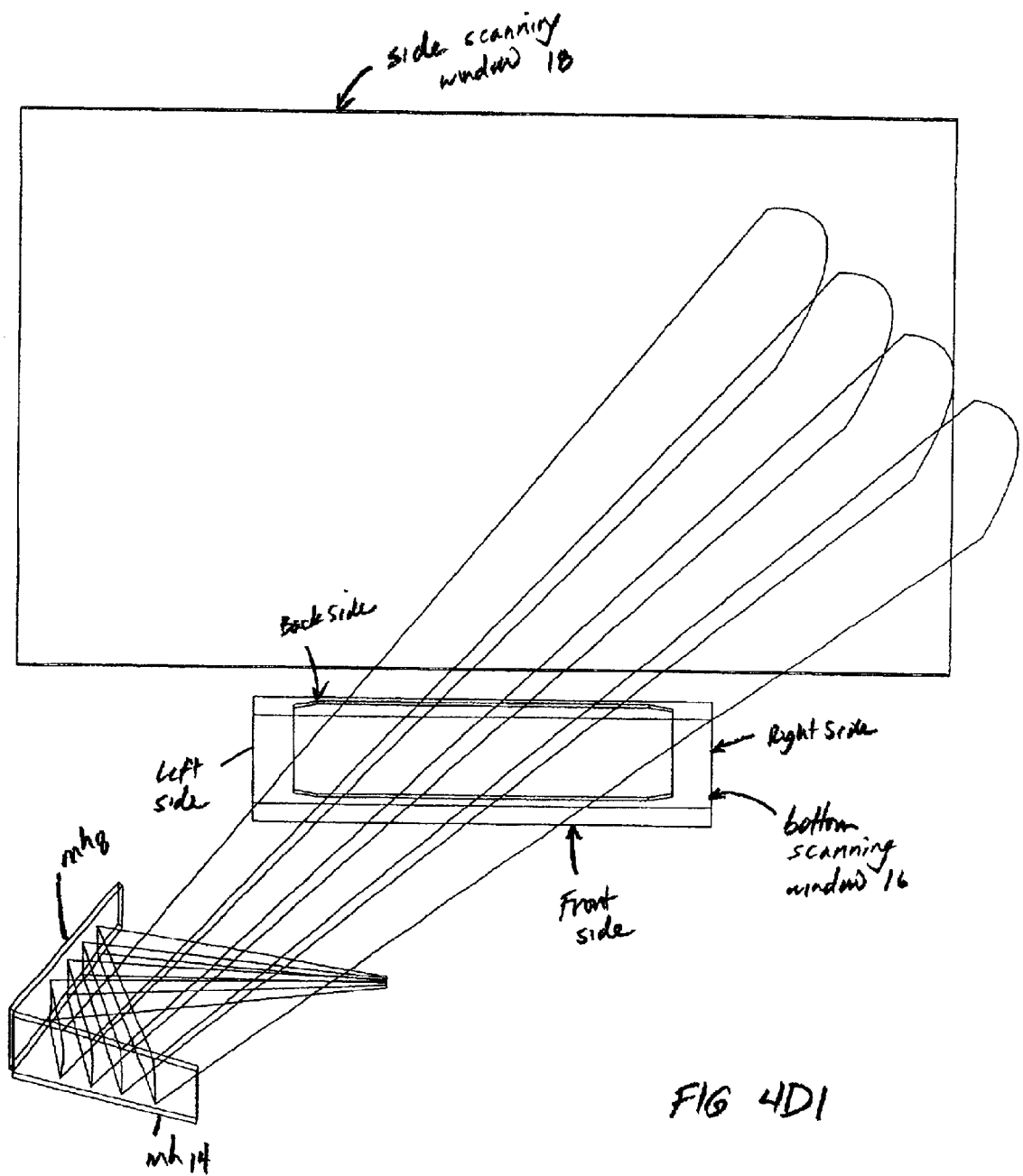
FIG 4D1

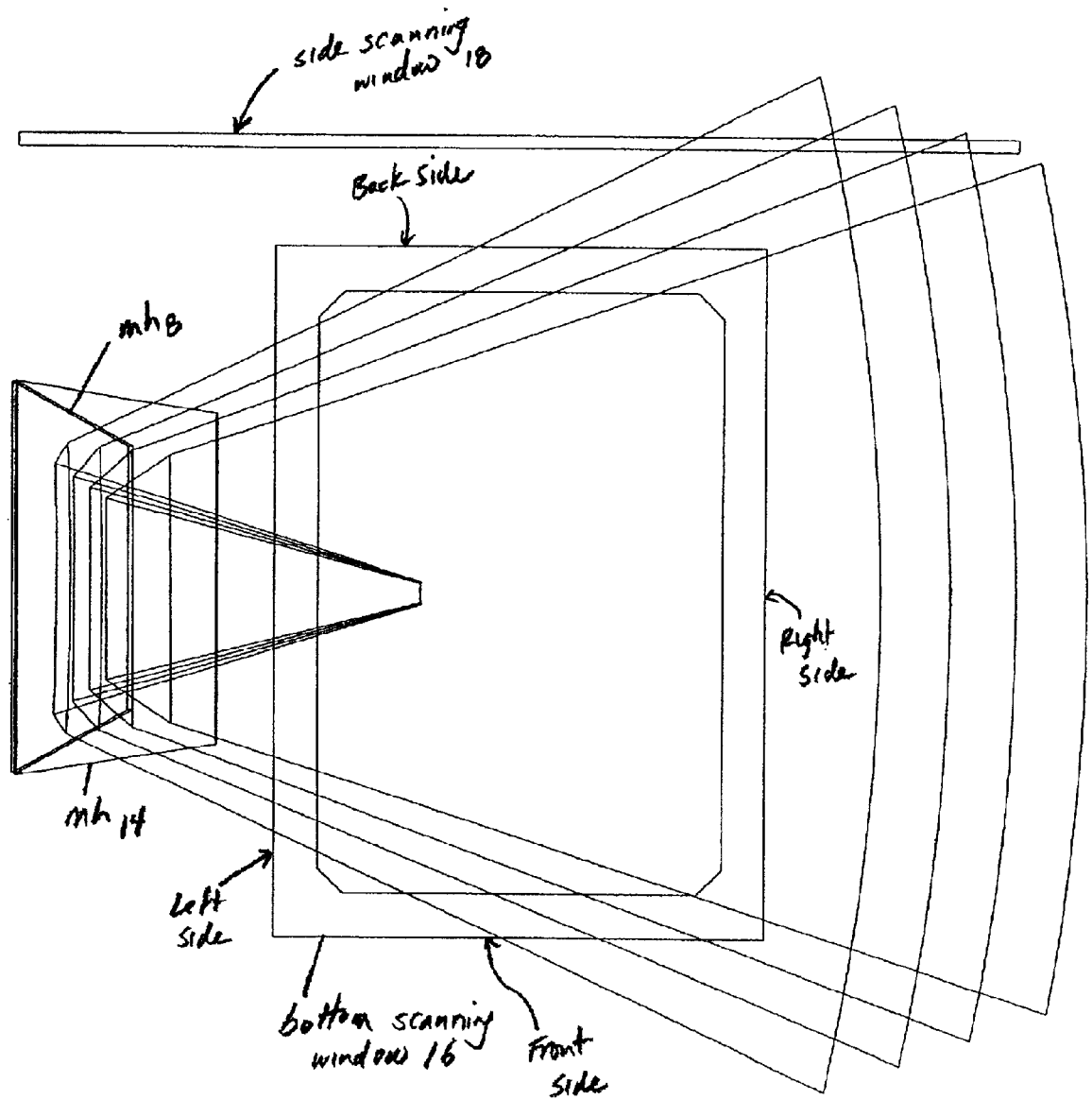
FIG. 4D2

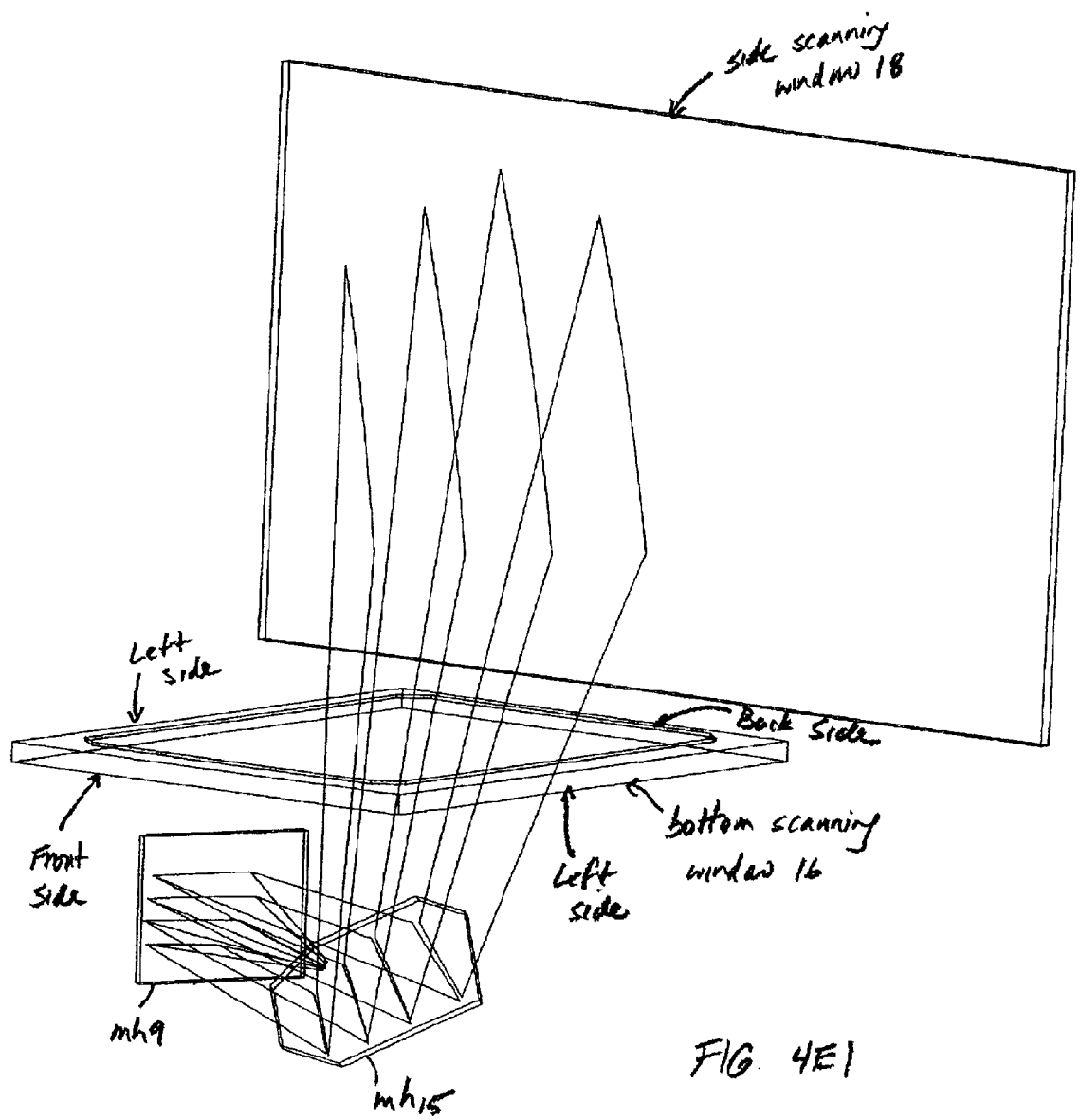
FIG. 4E1

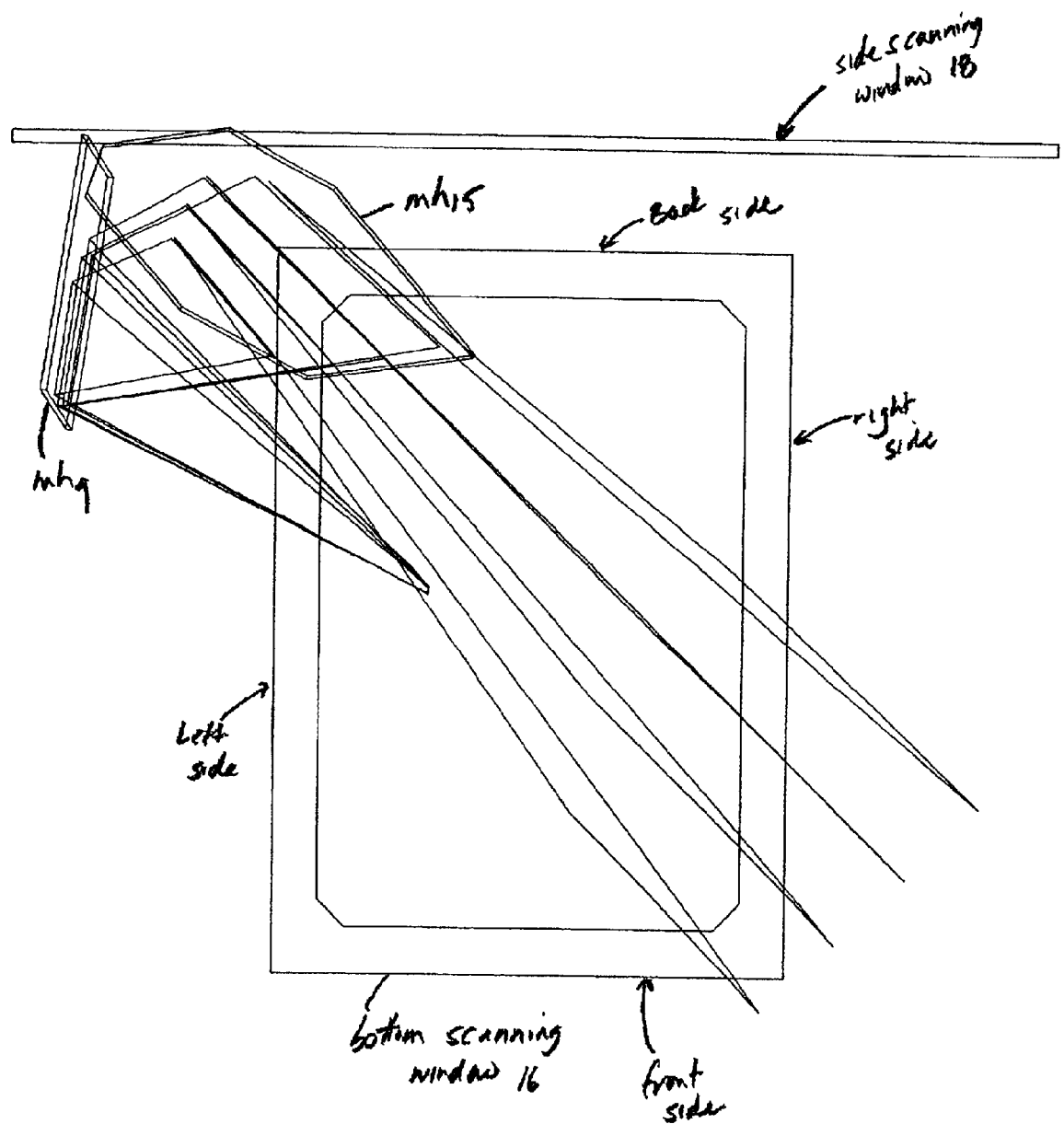

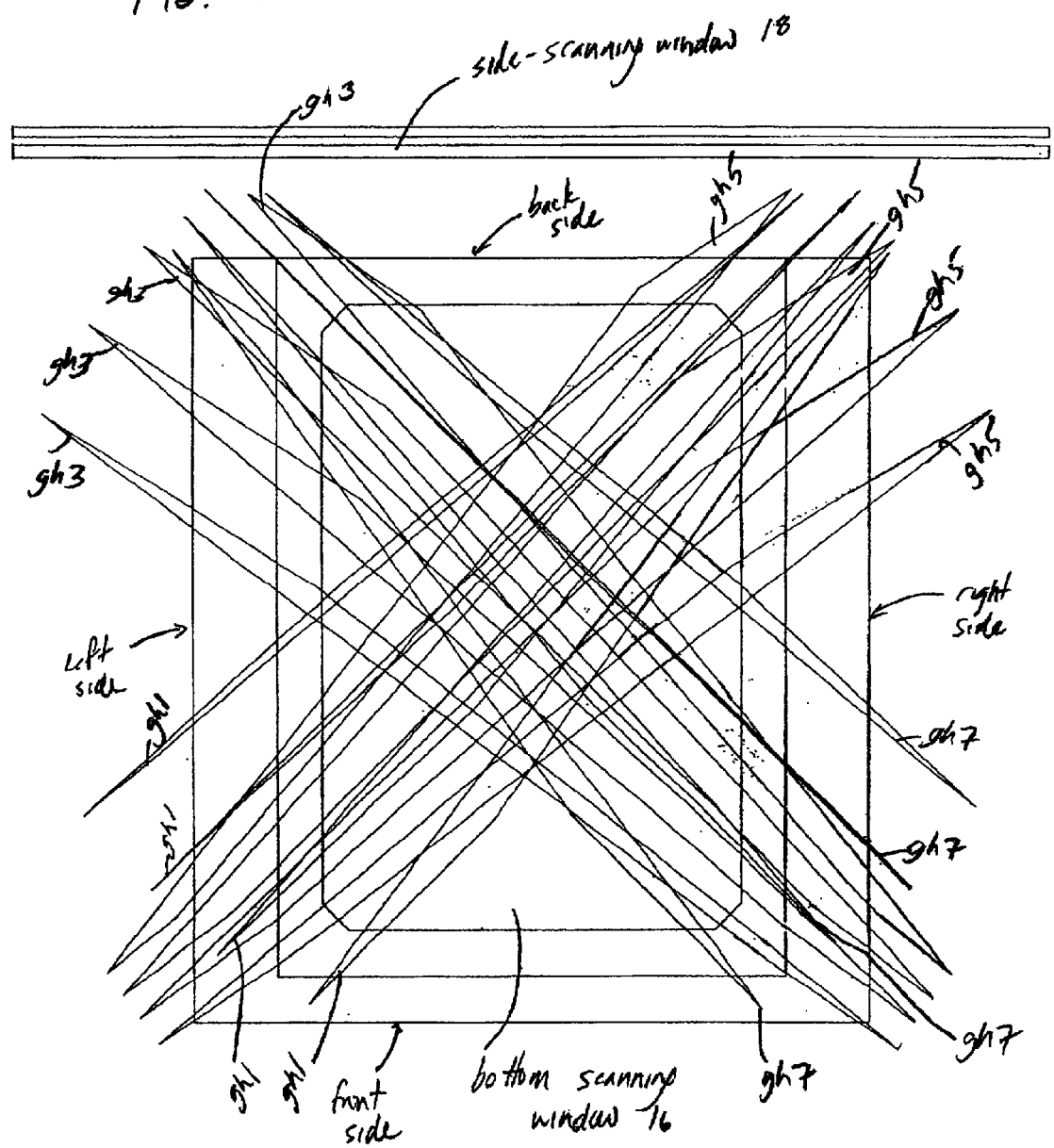

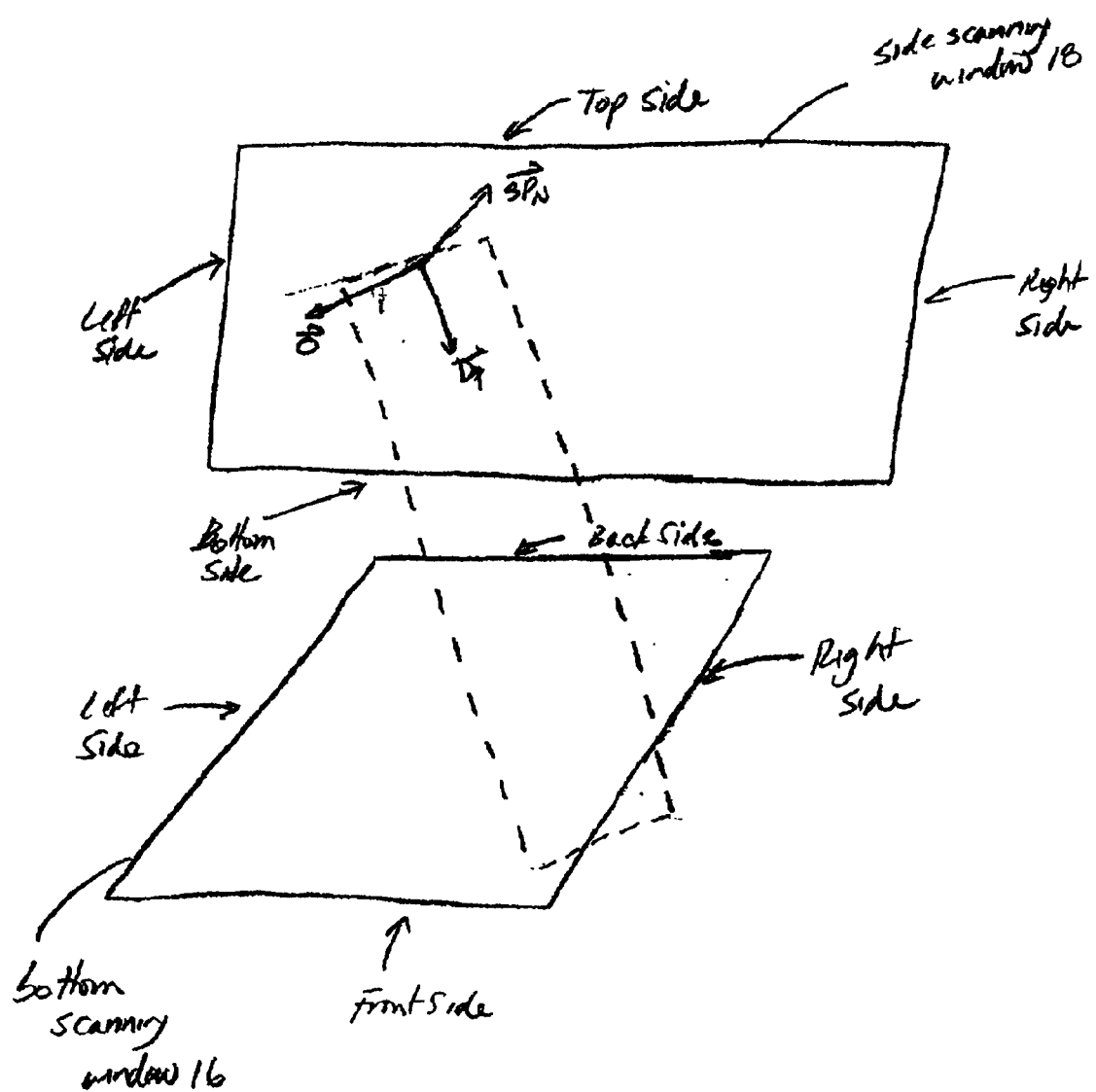
FIG. 5B1

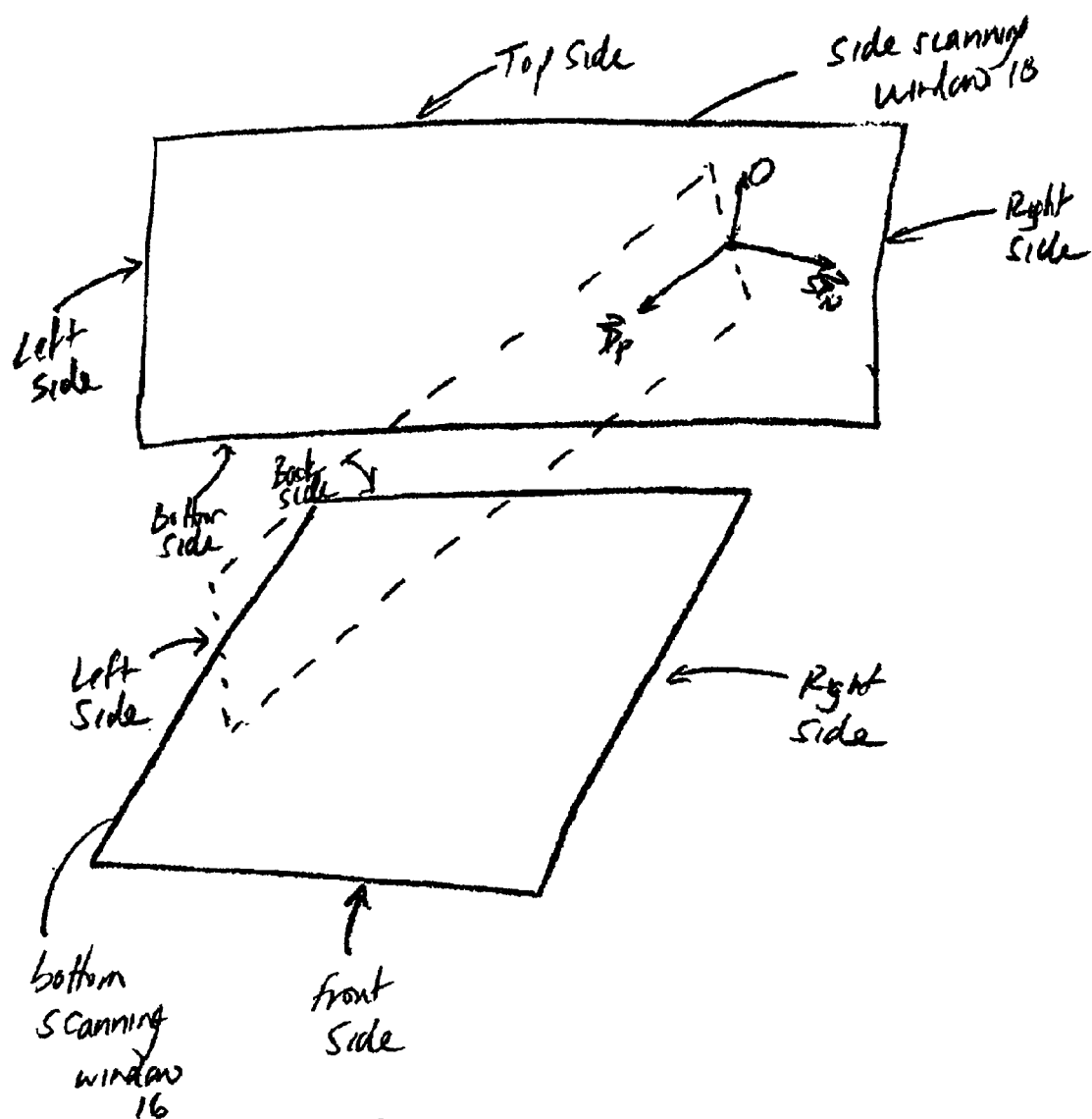
FIG. 5B2

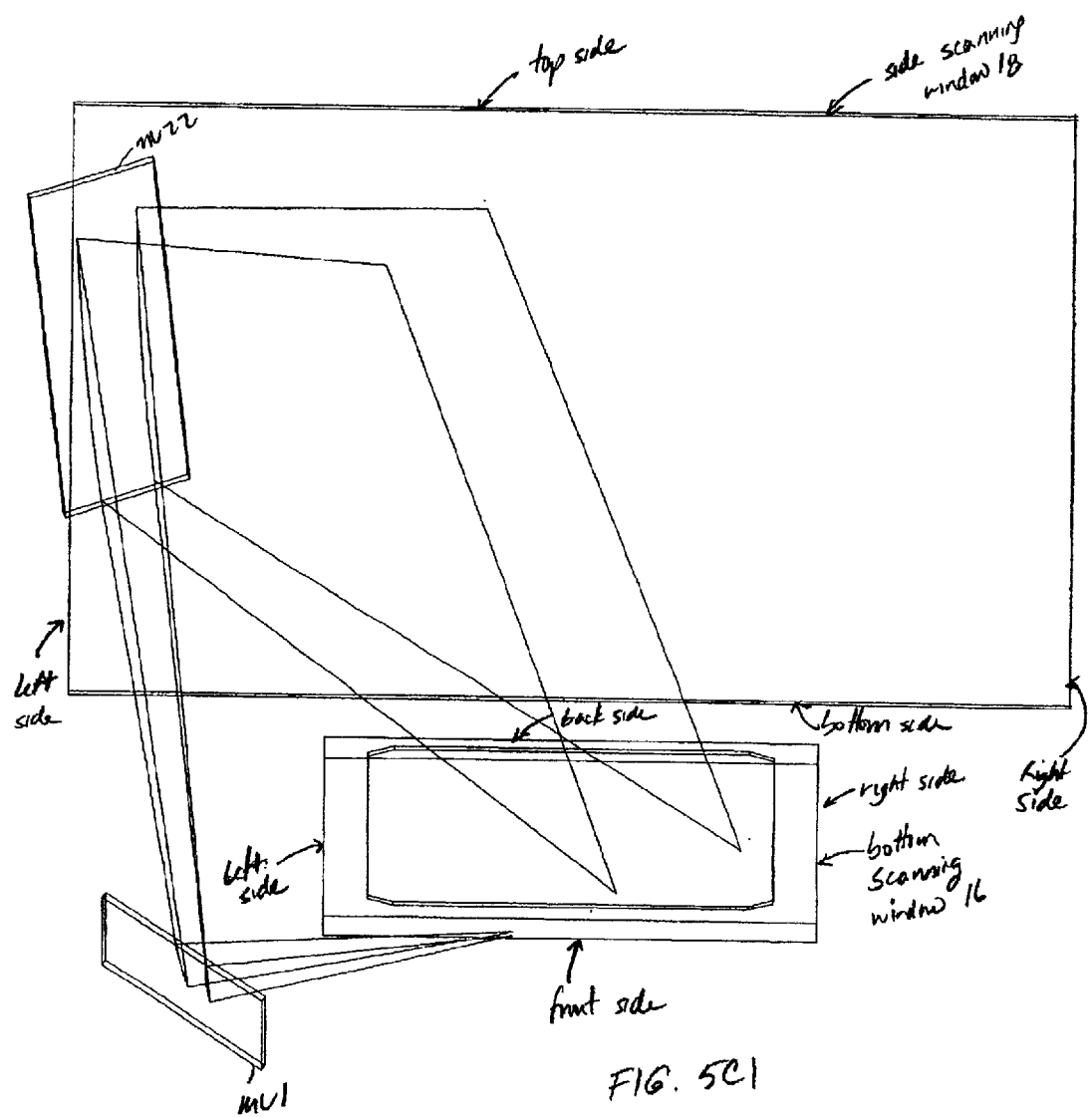

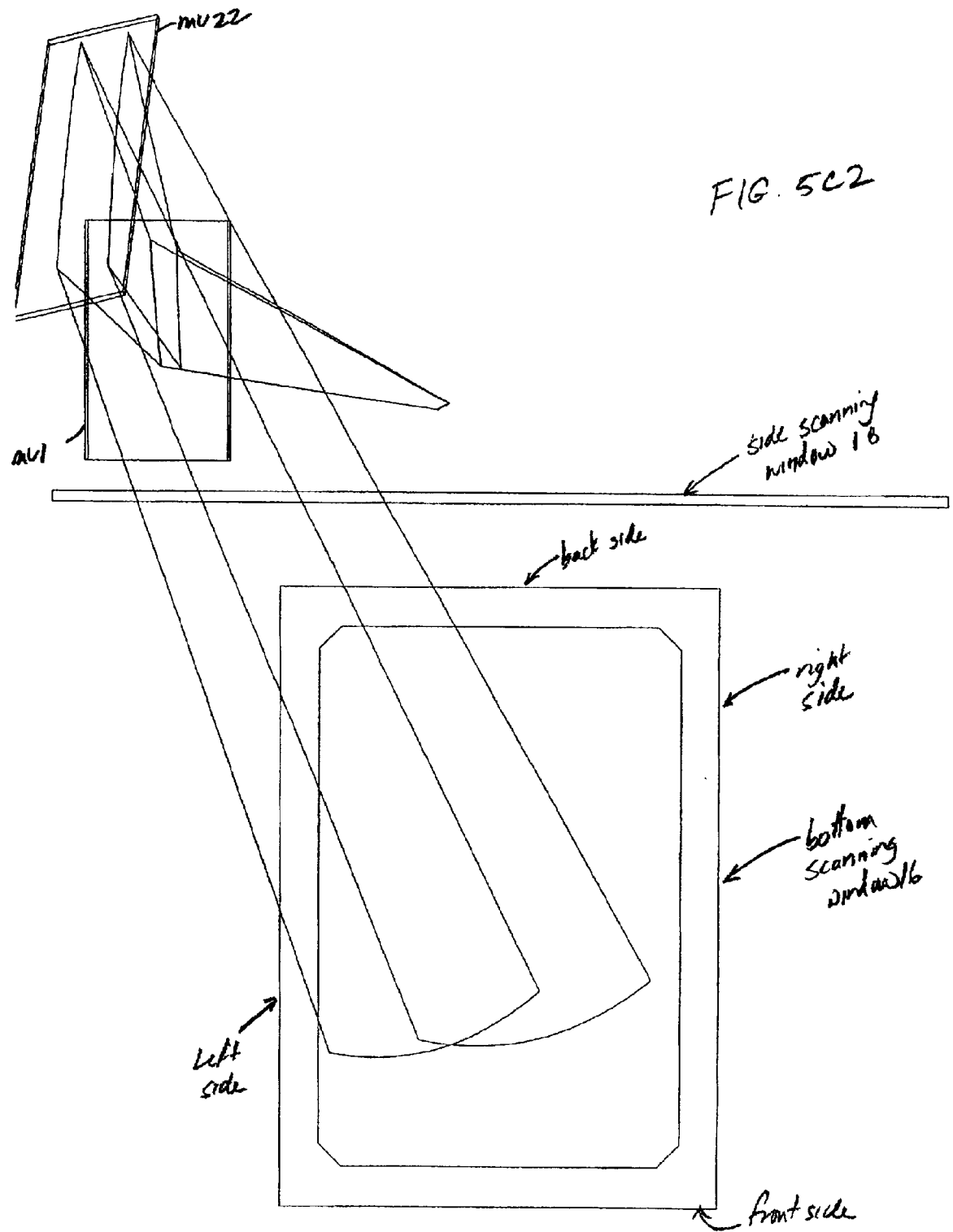

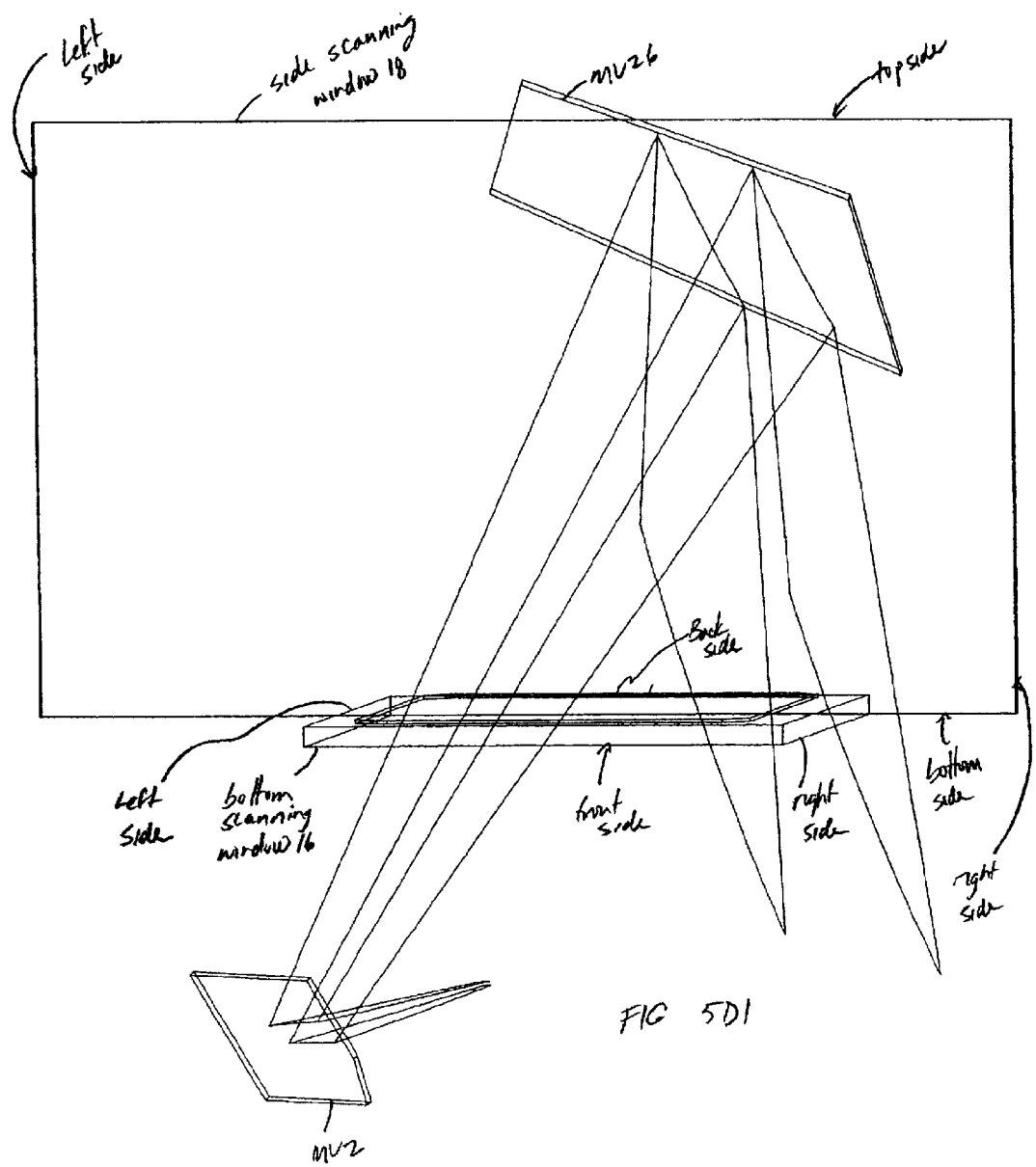

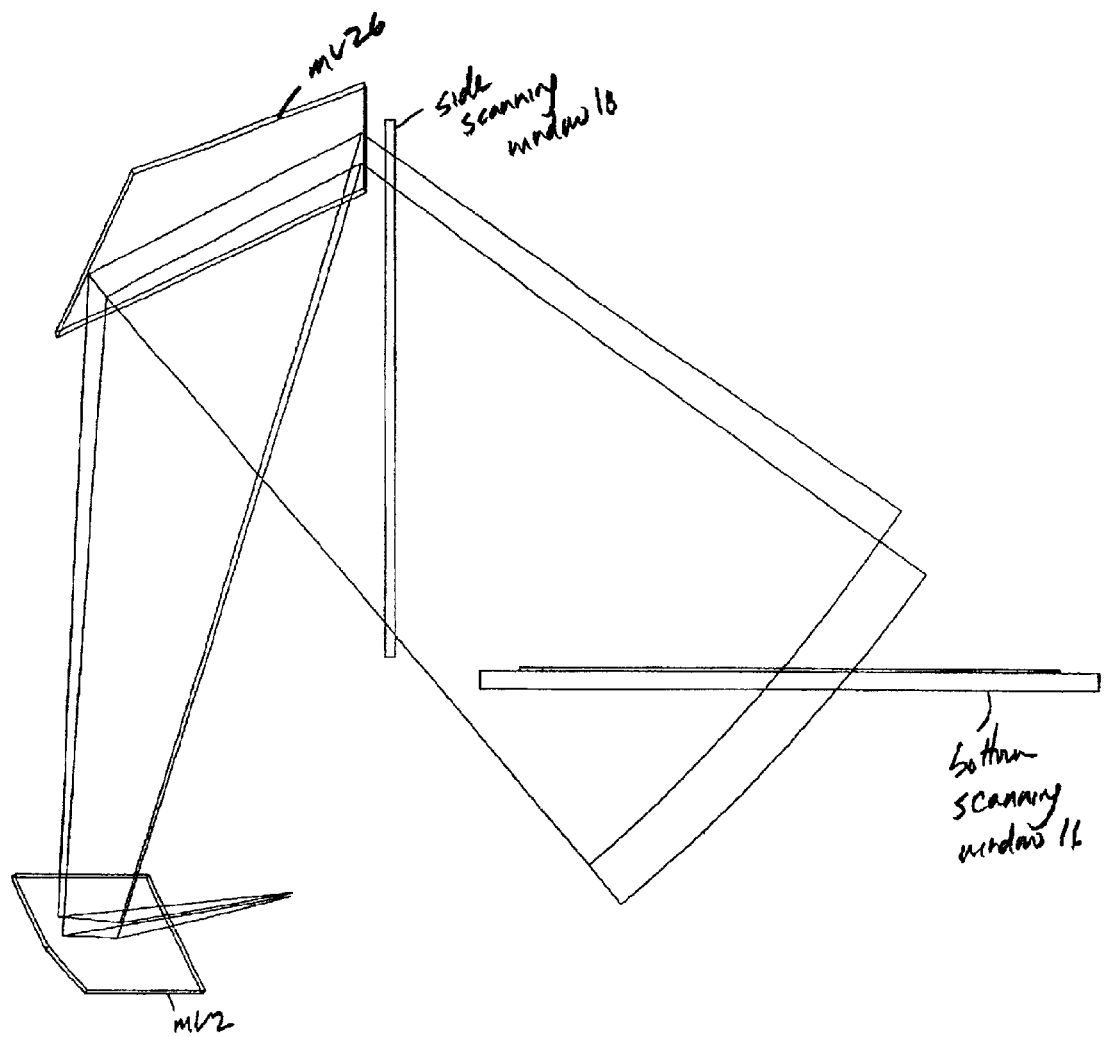

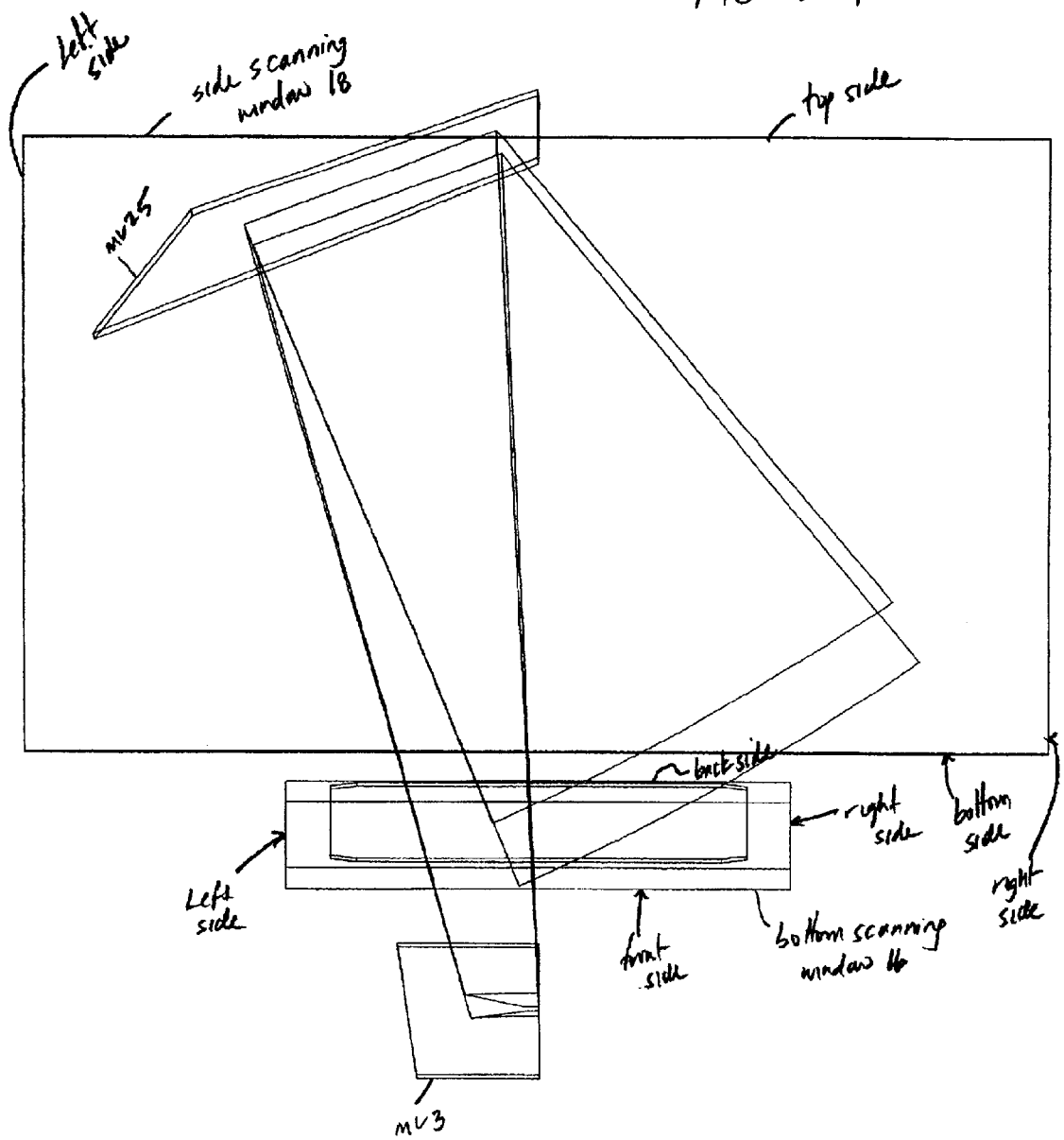

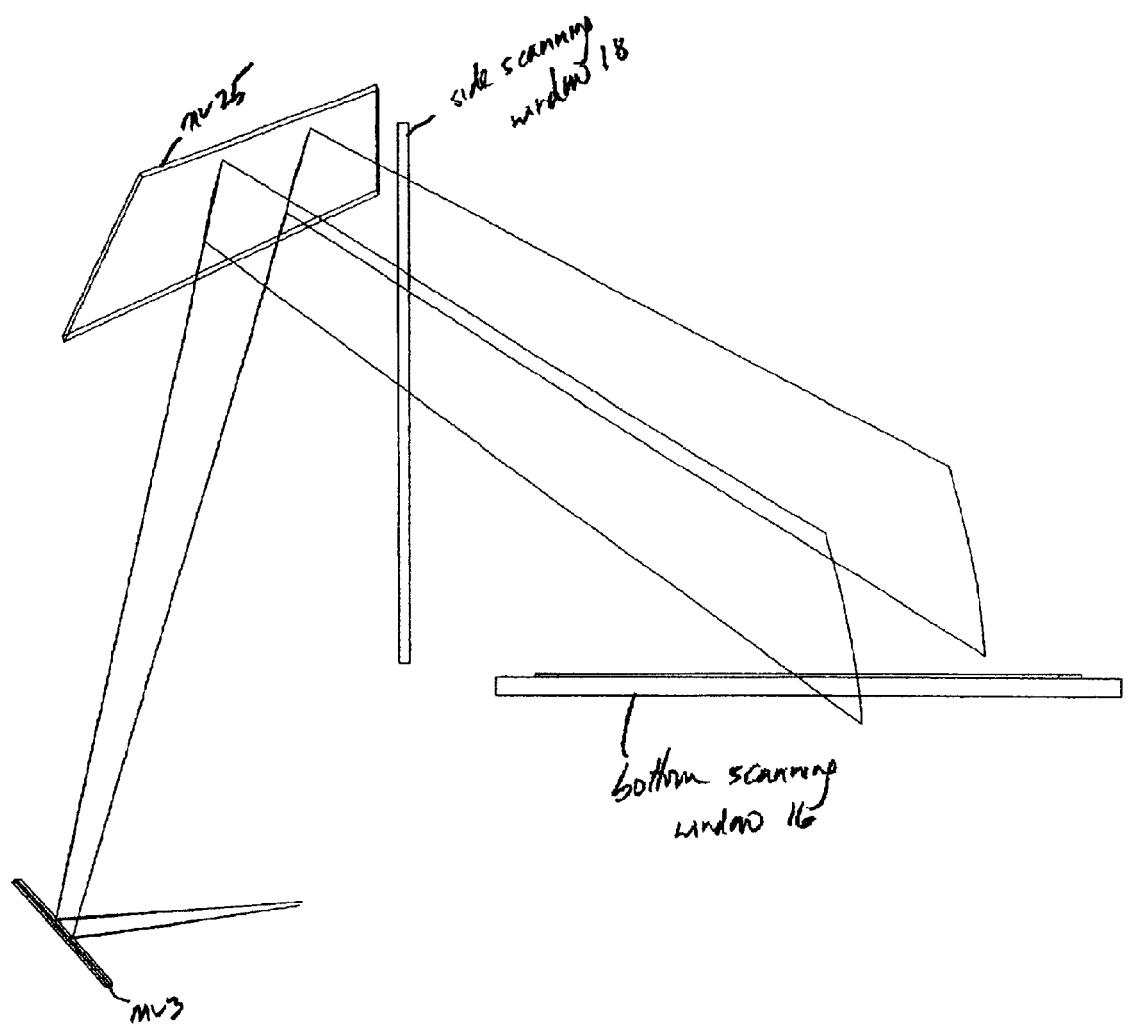

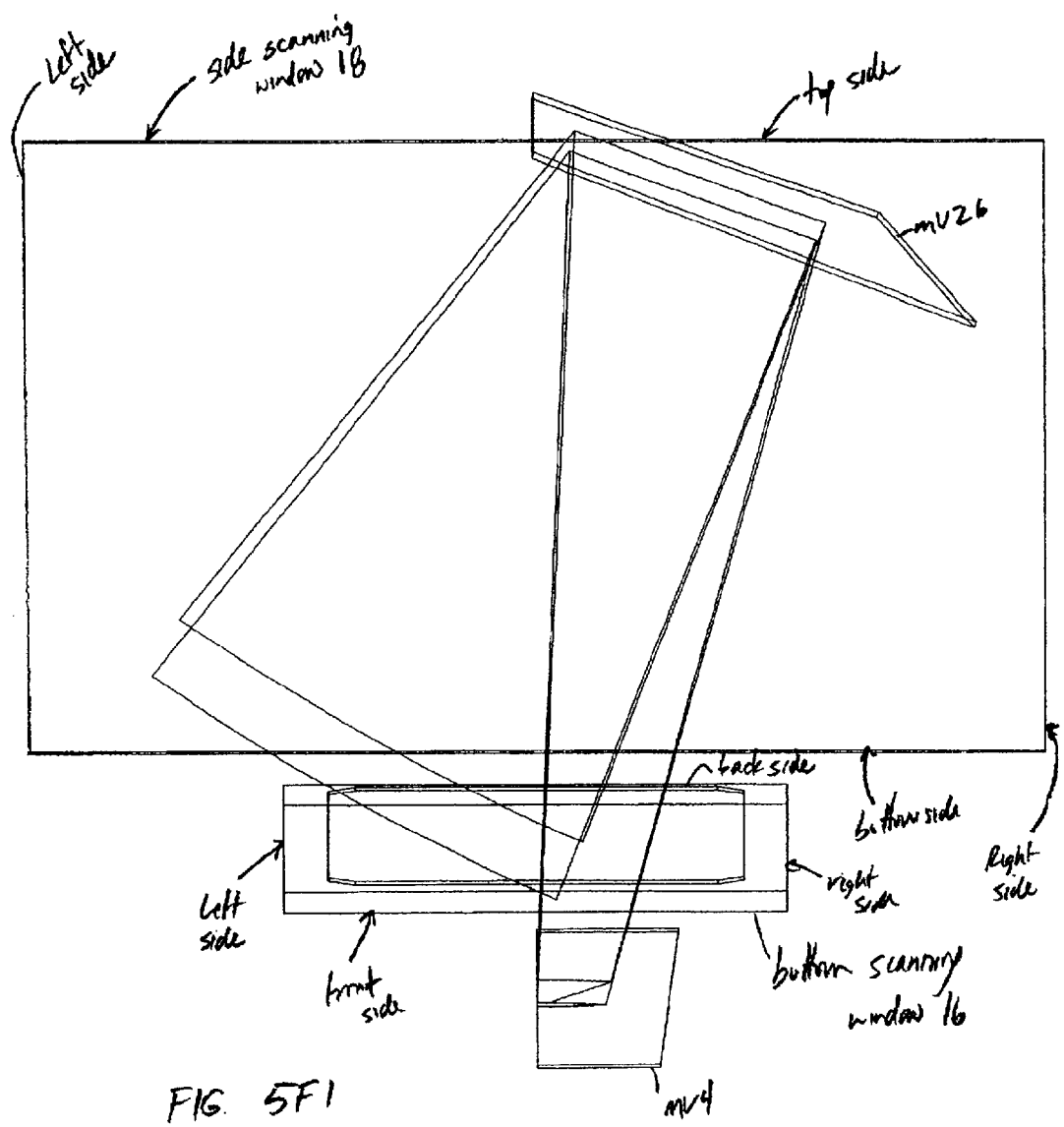
FIG. 5F1

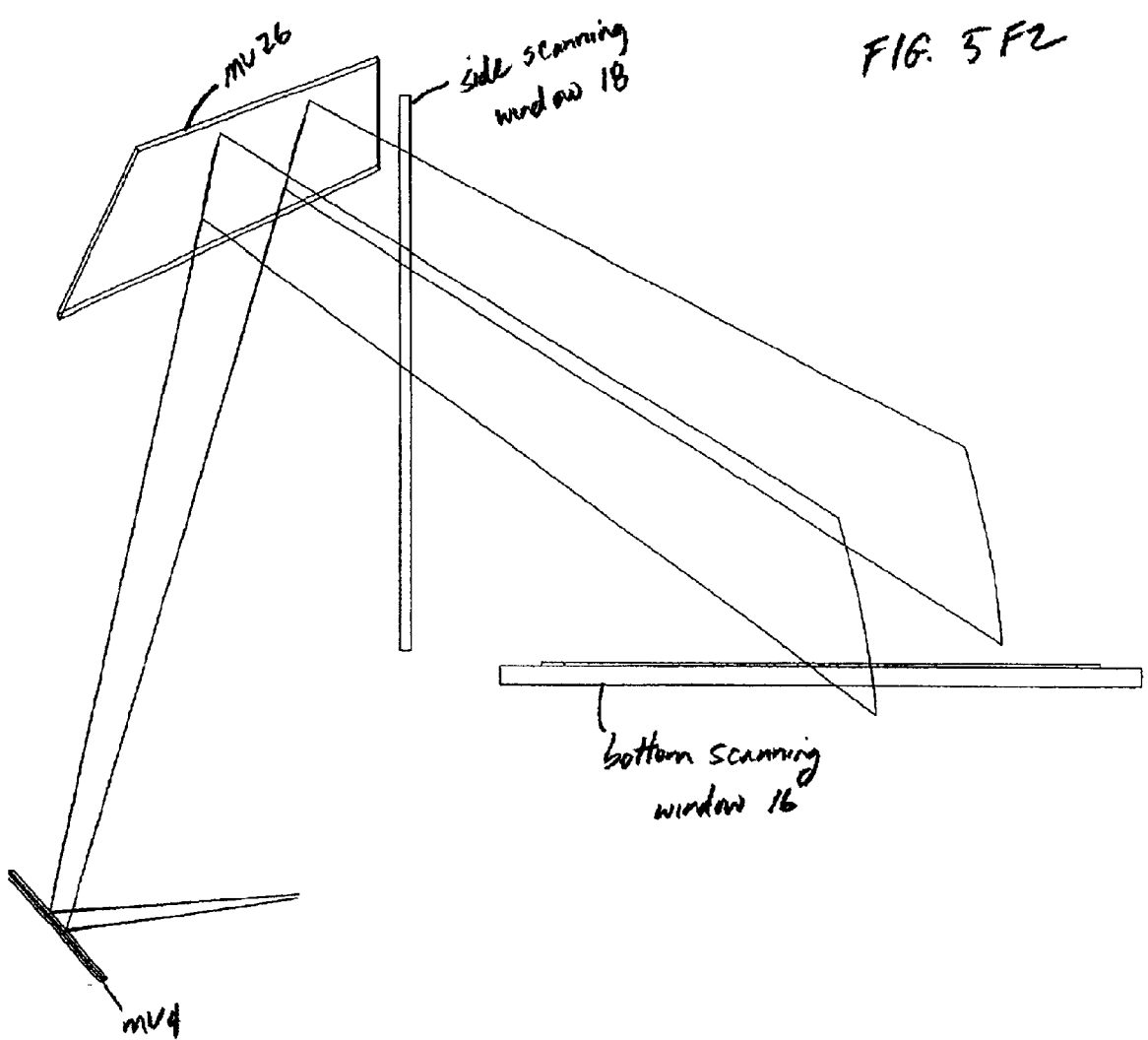

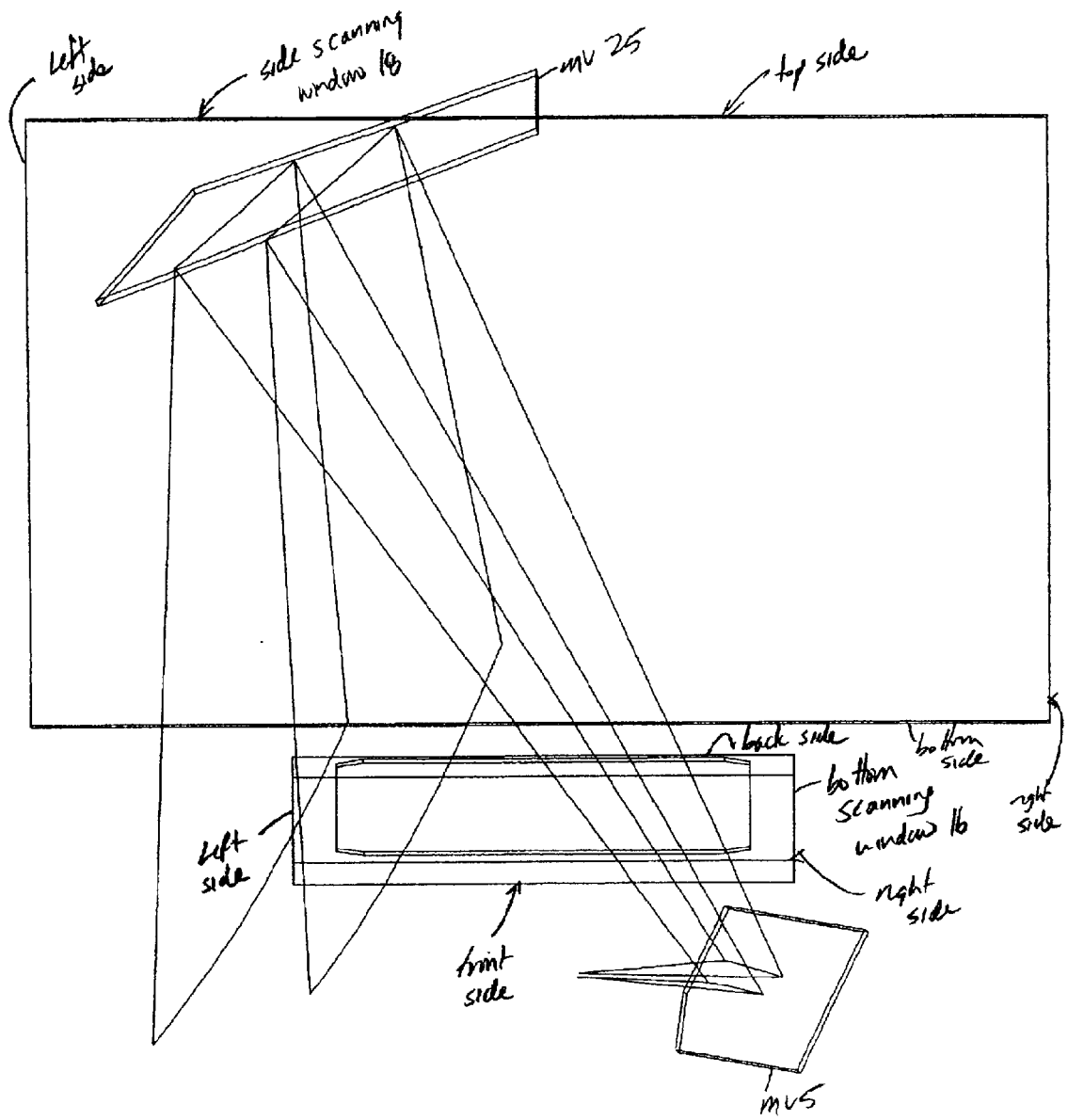
FIG. 5G1

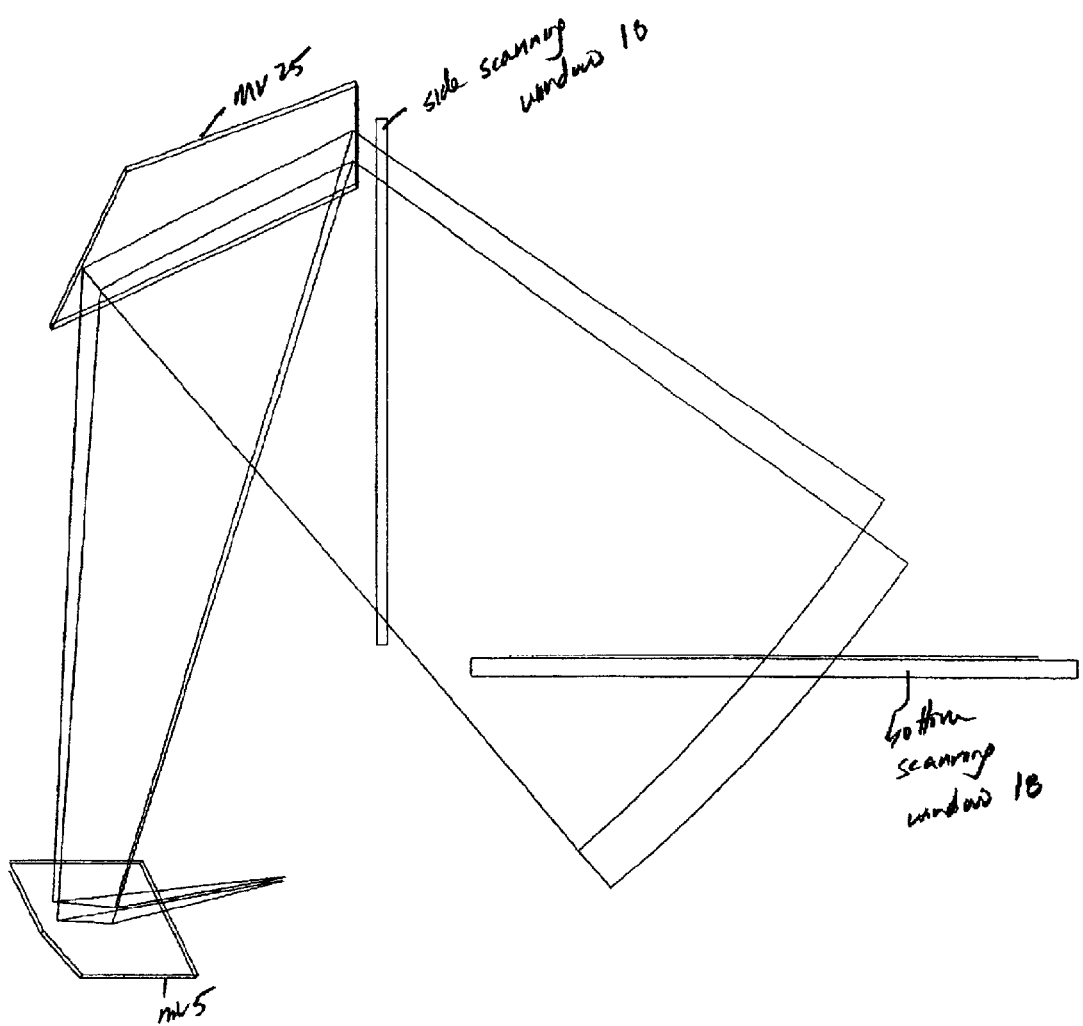
FIG. 5G2

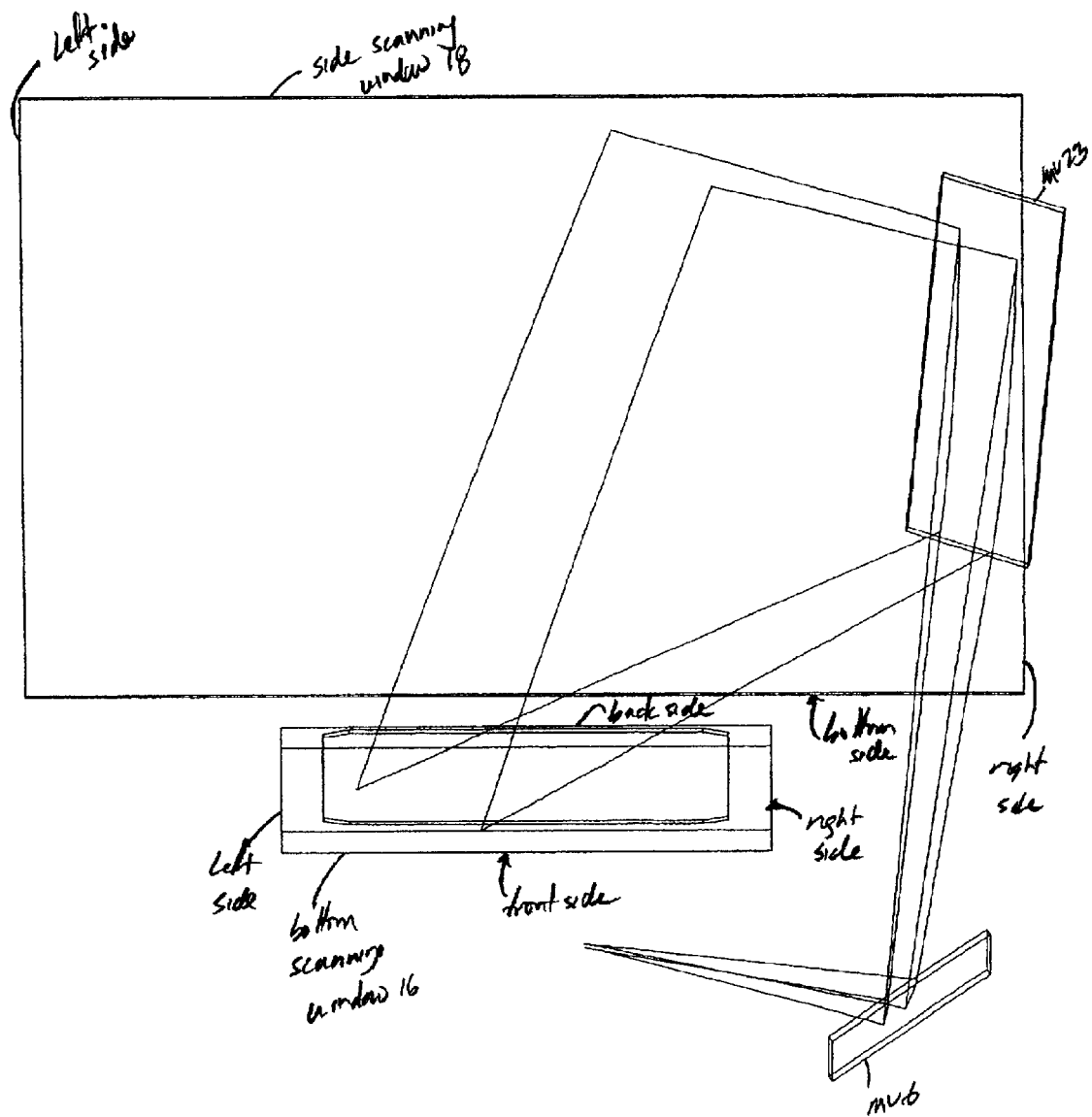

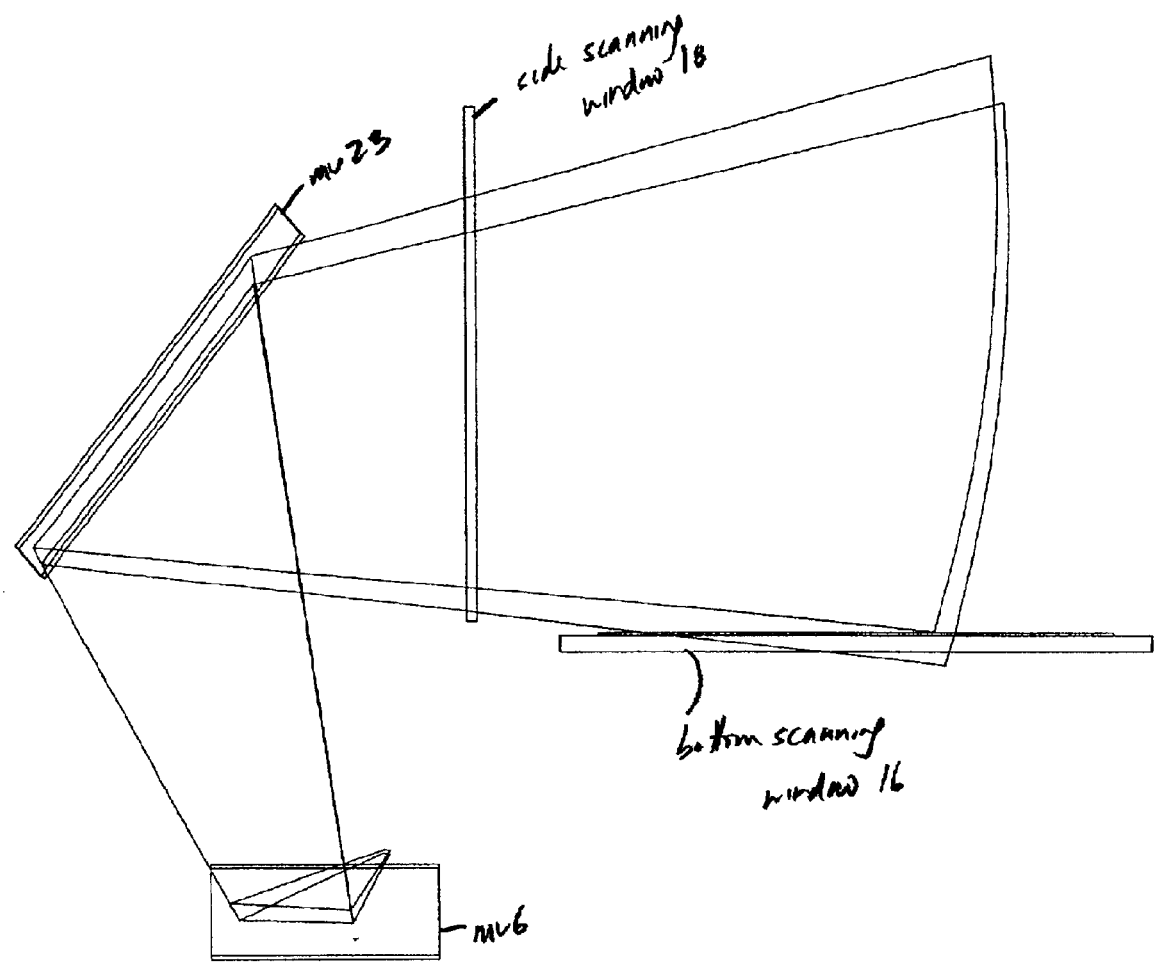

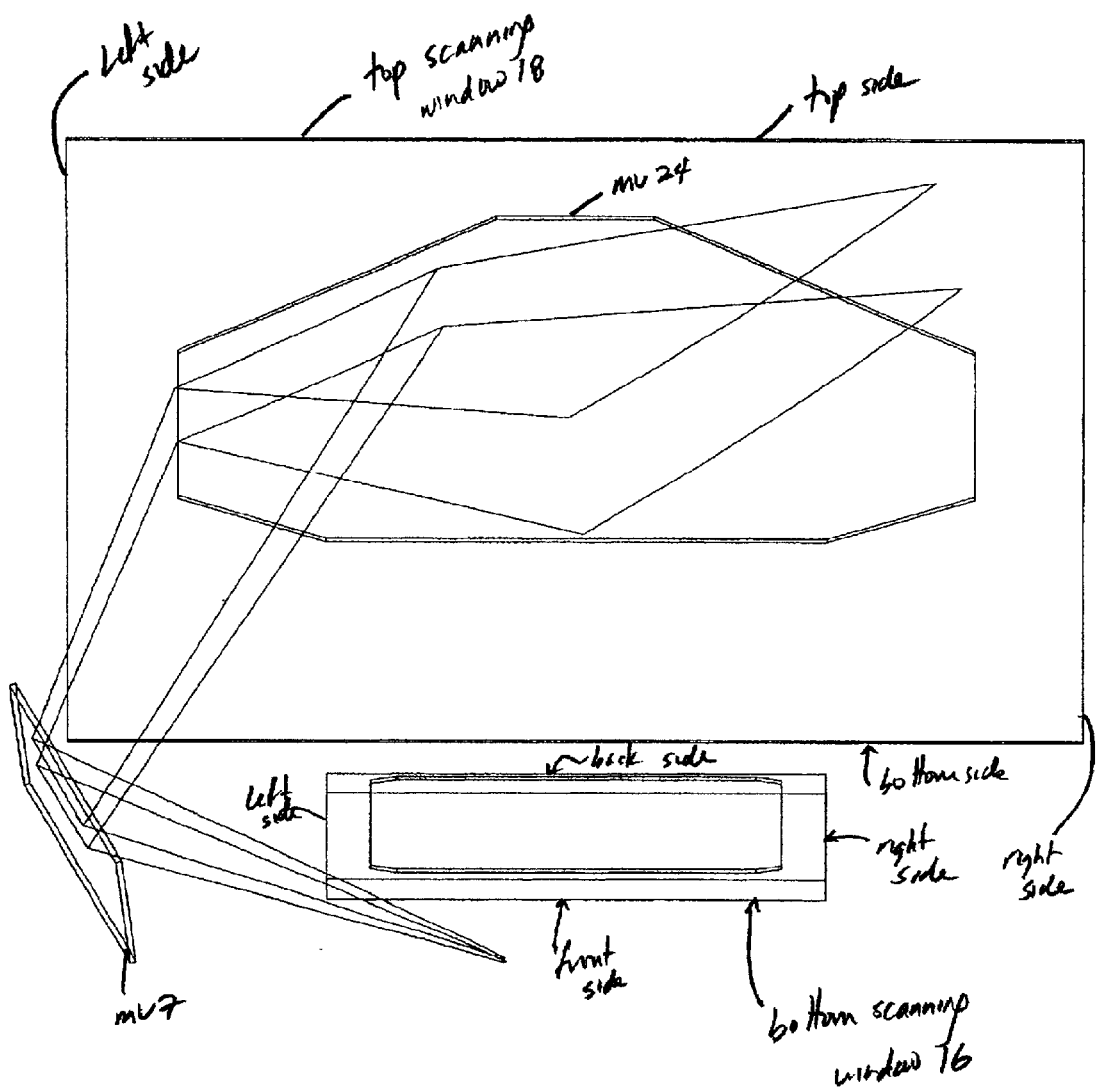

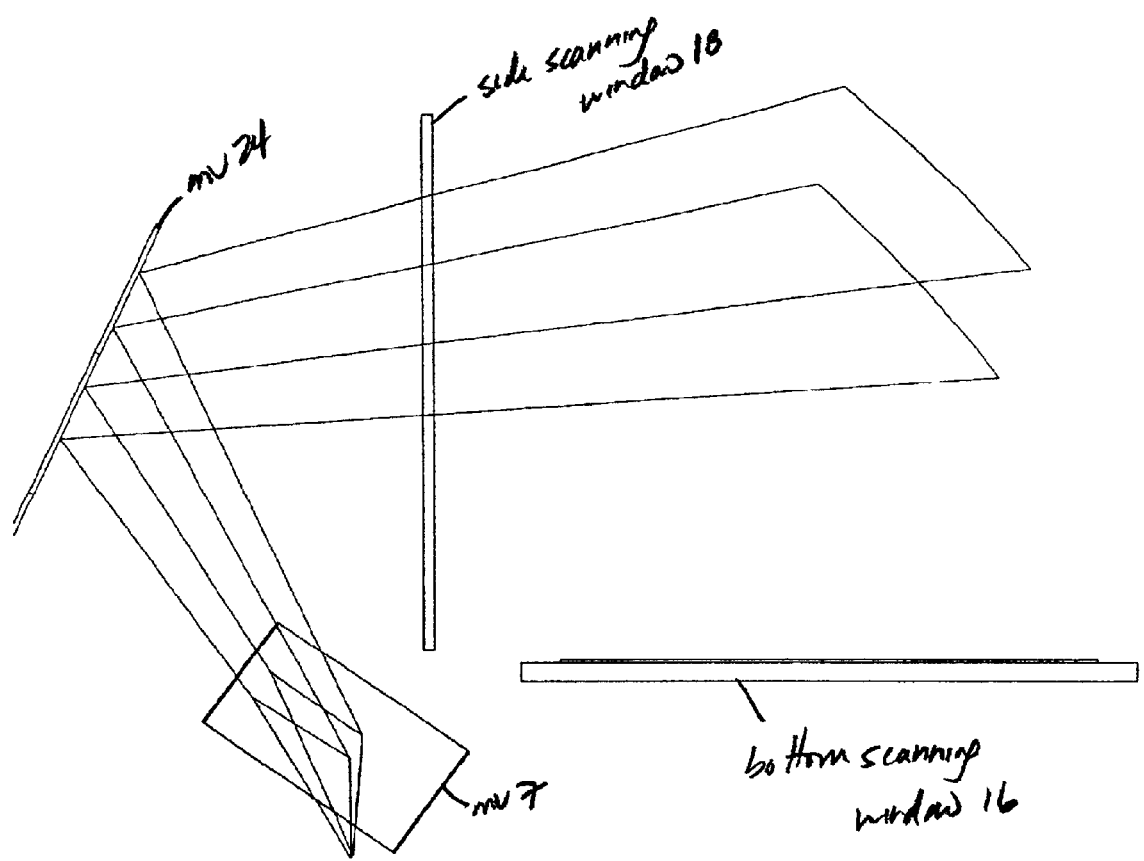

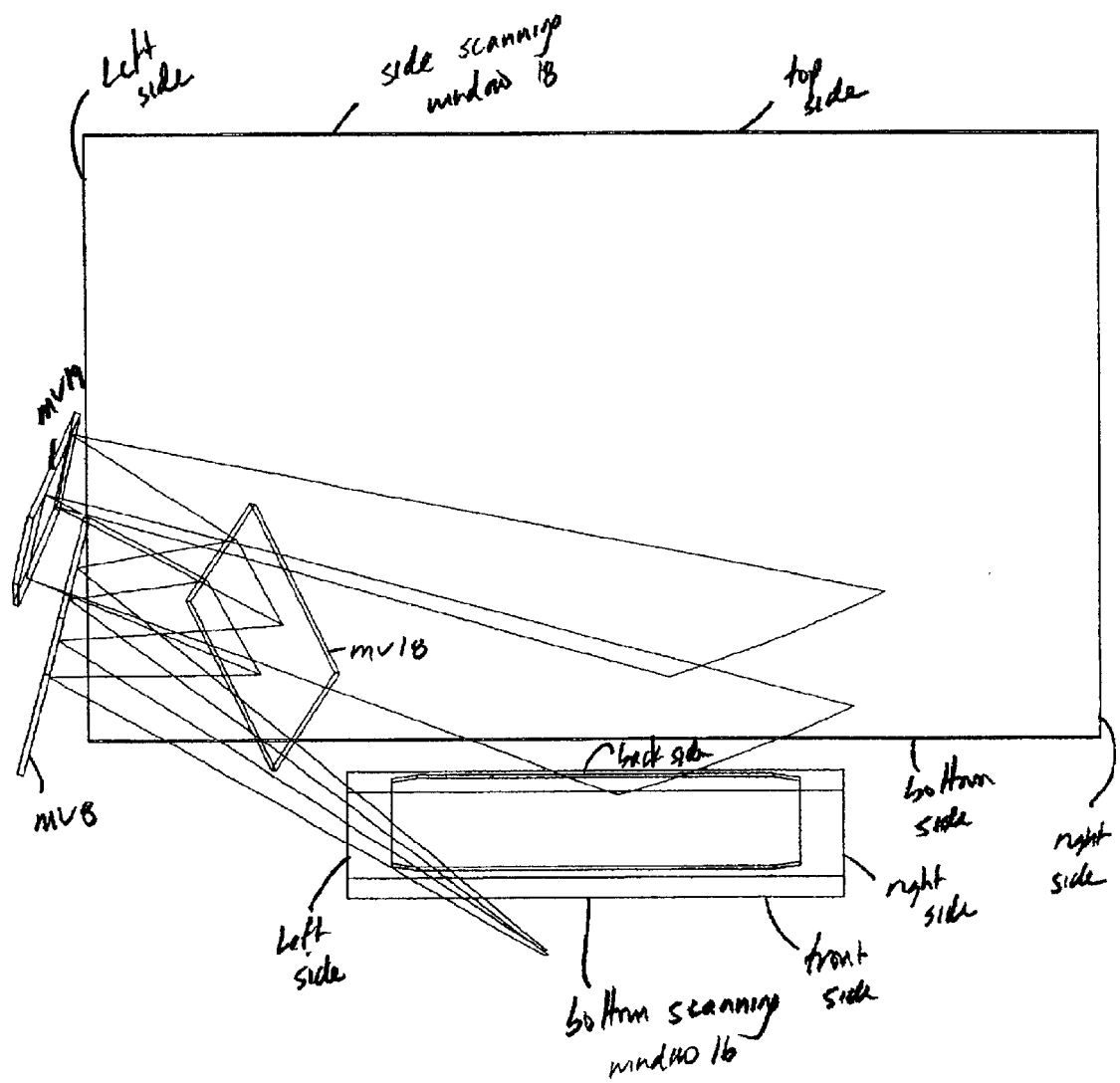
FIG. 5J1

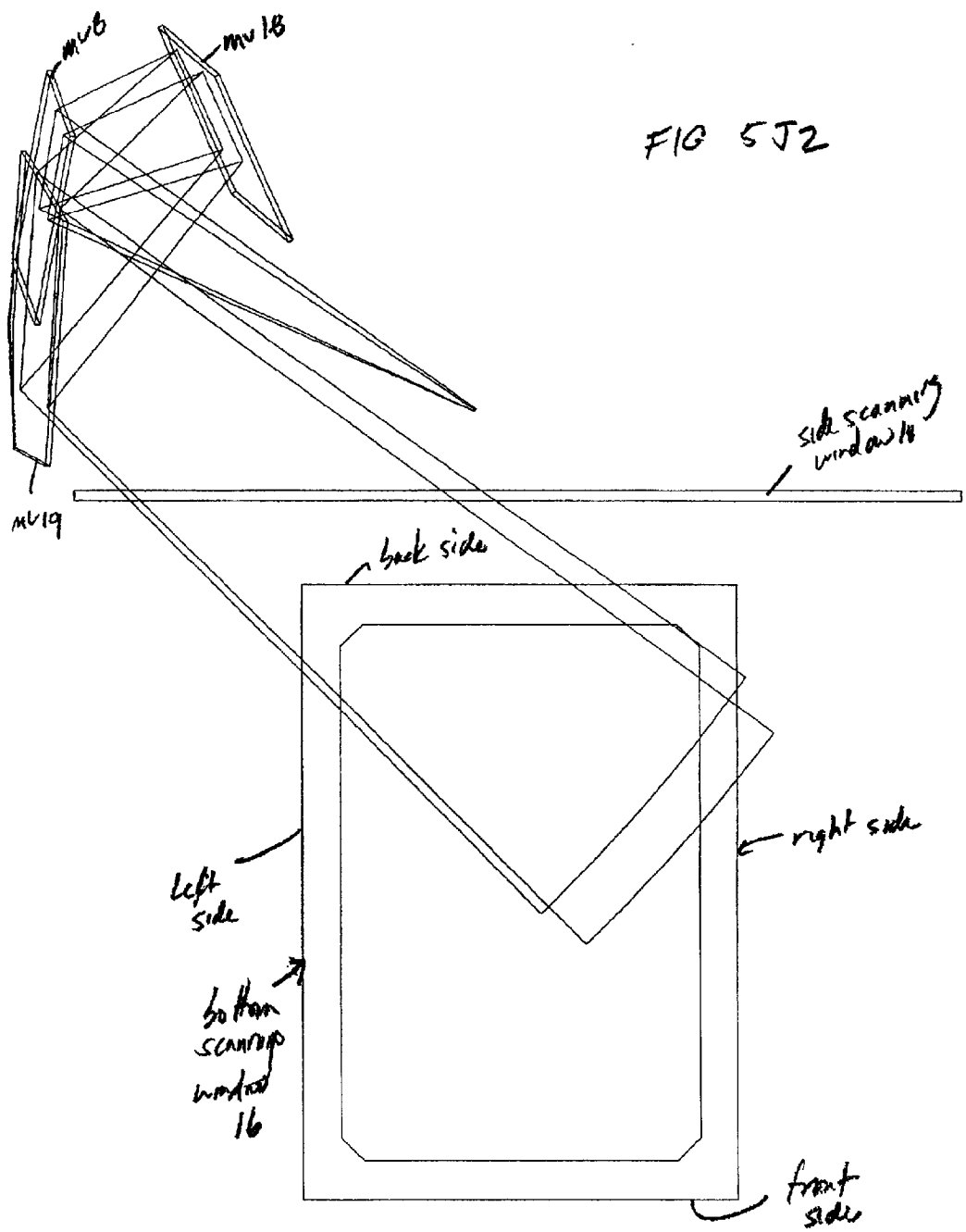

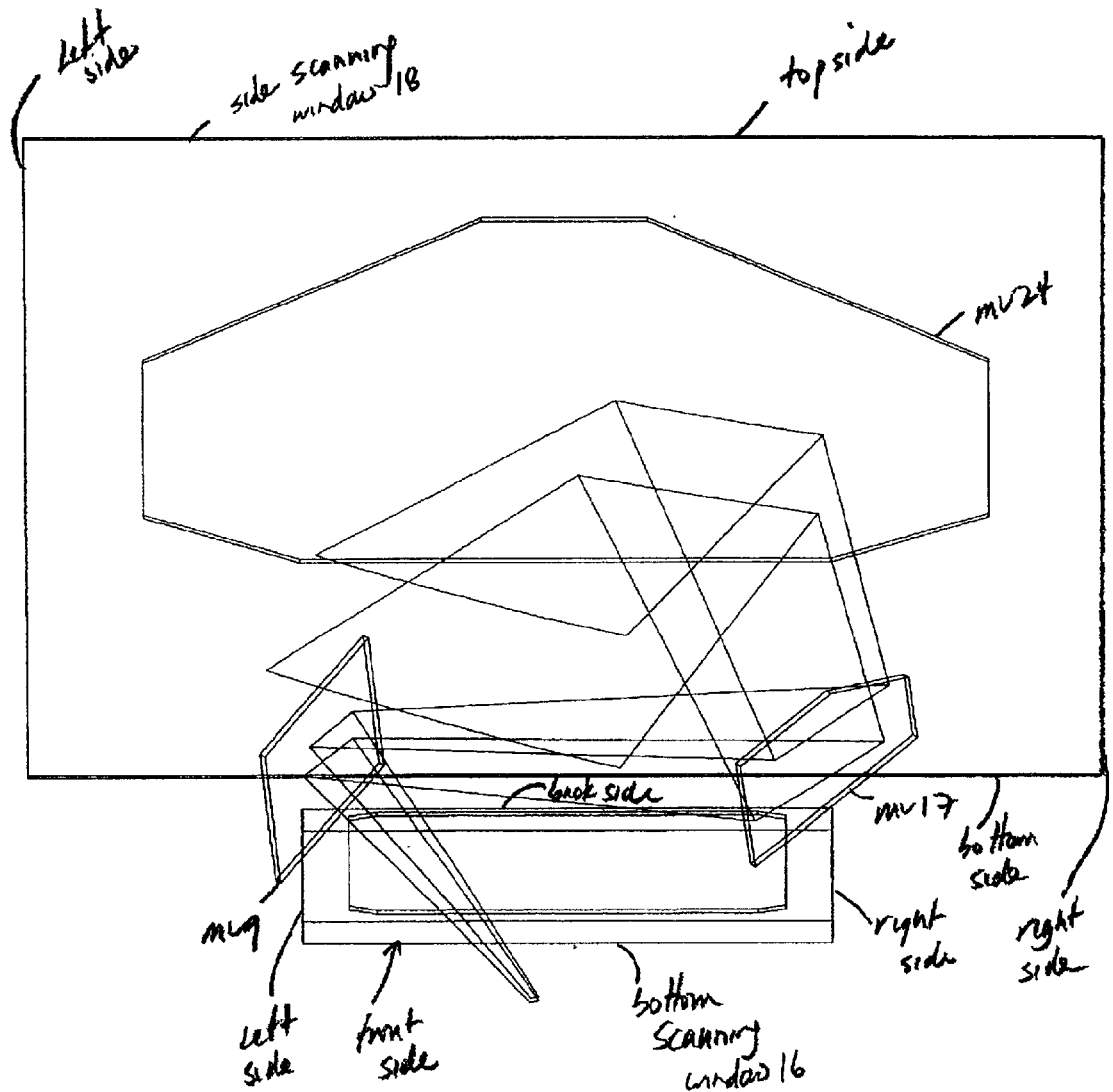
FIG. 5K1

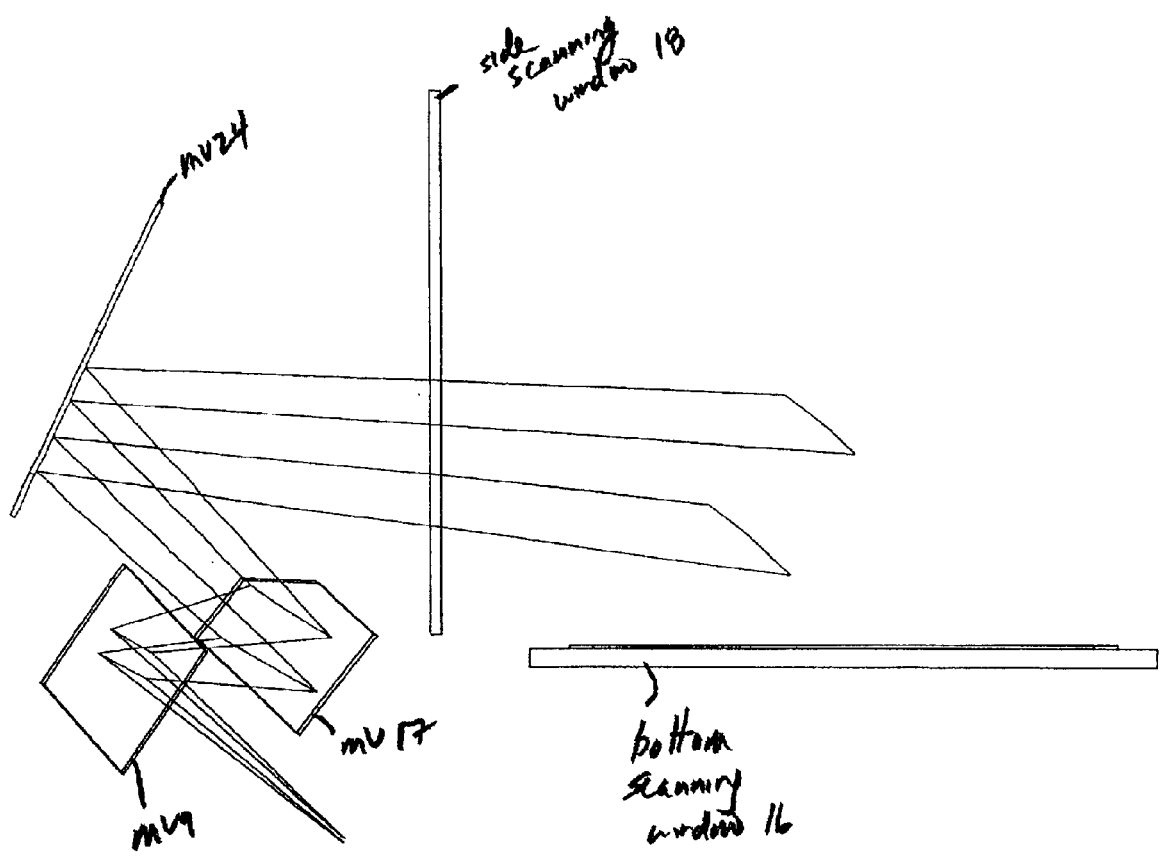

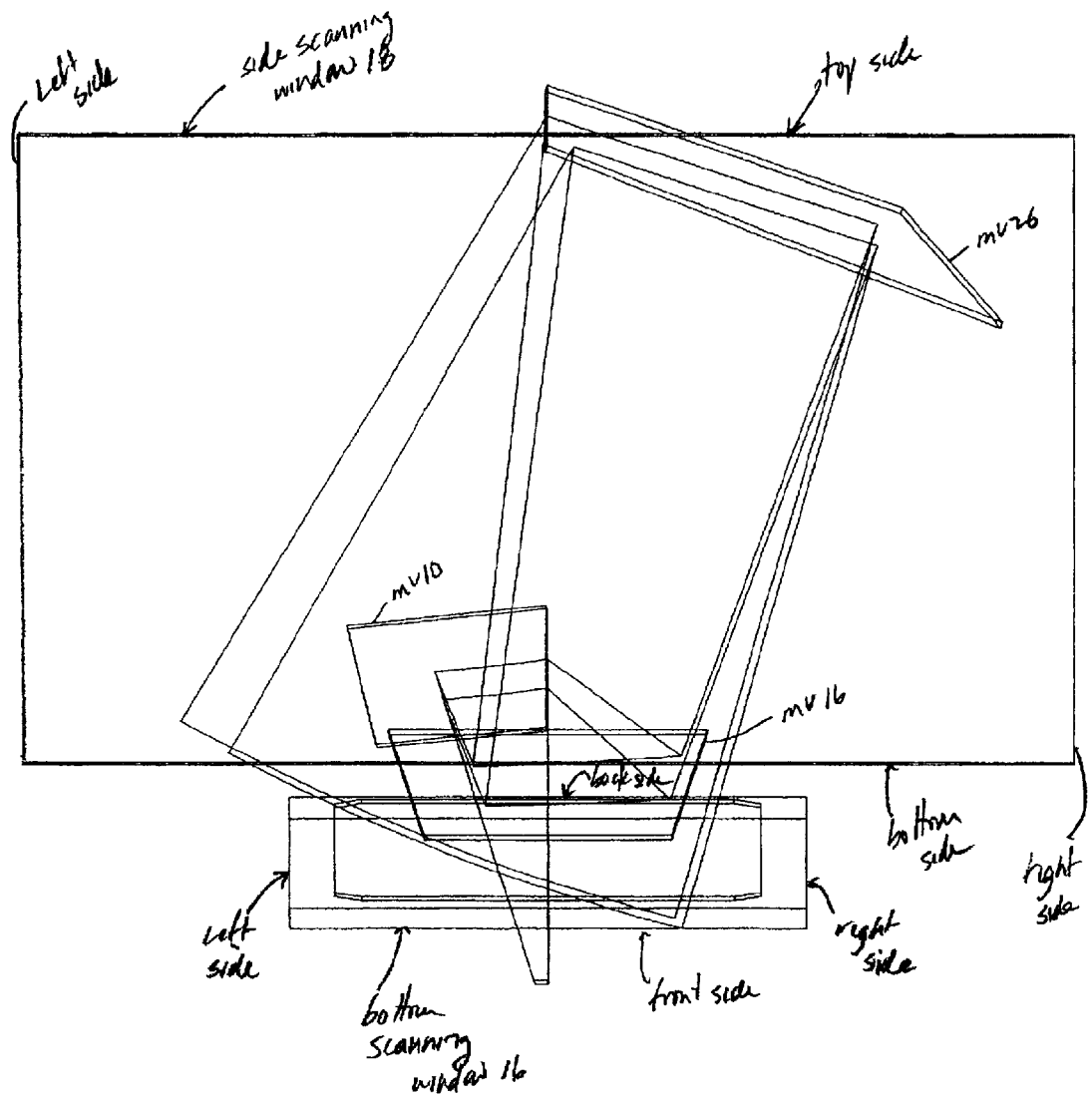
FIG. 5L1

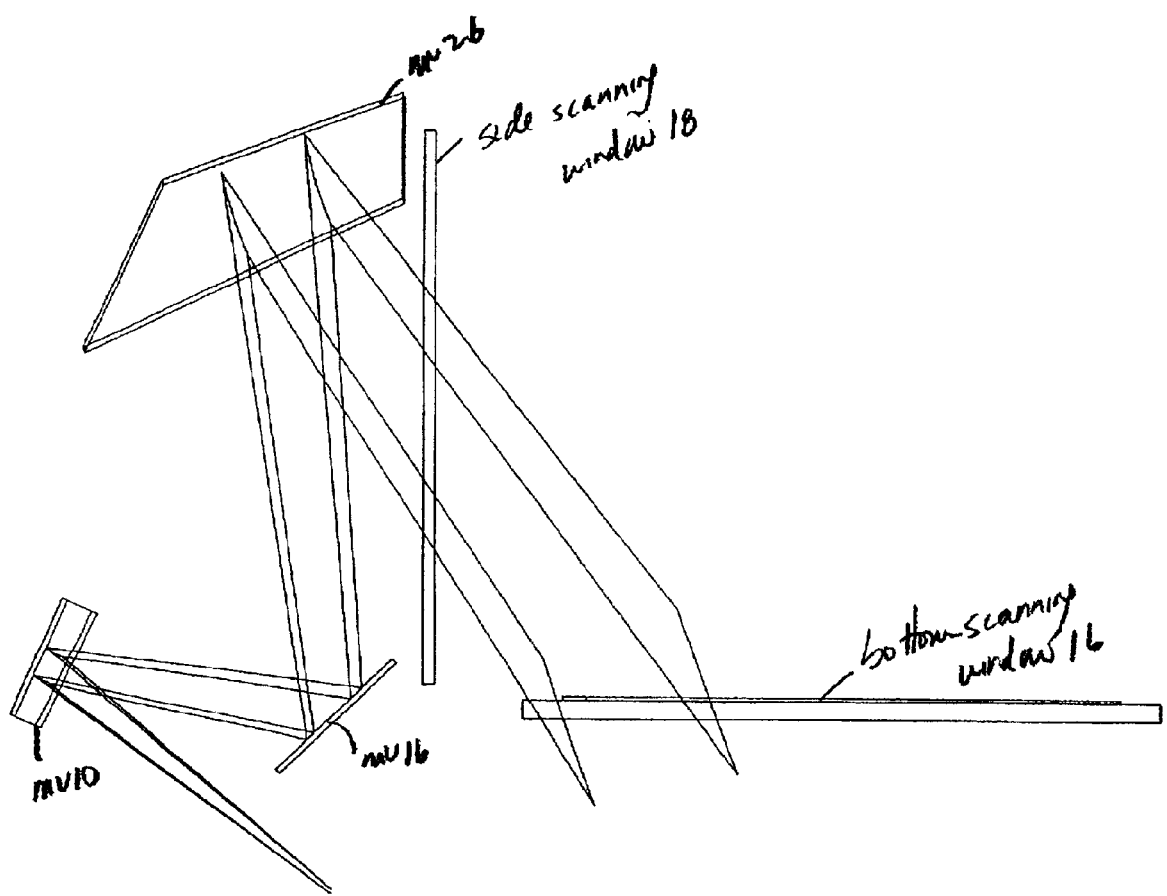

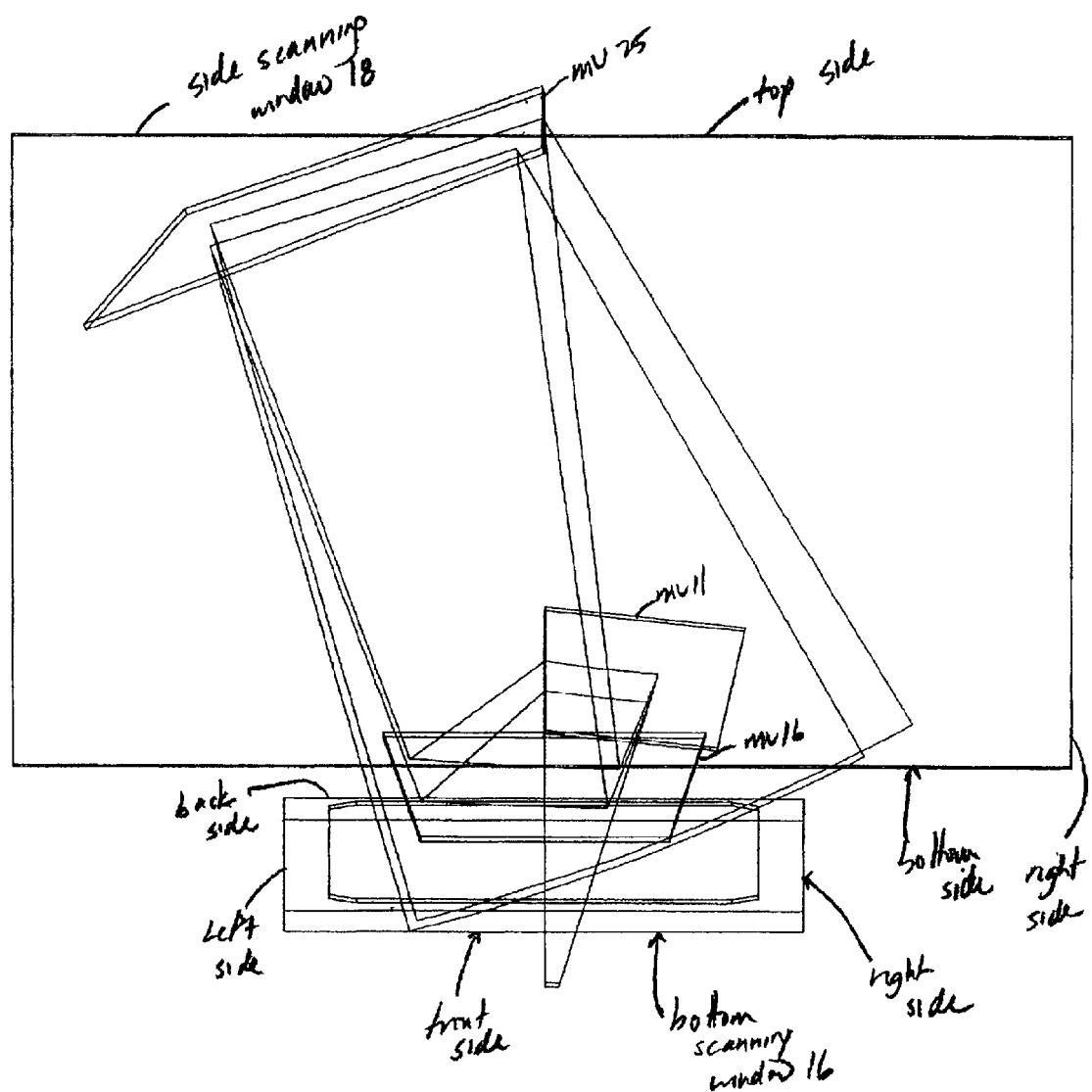
FIG. 5M1

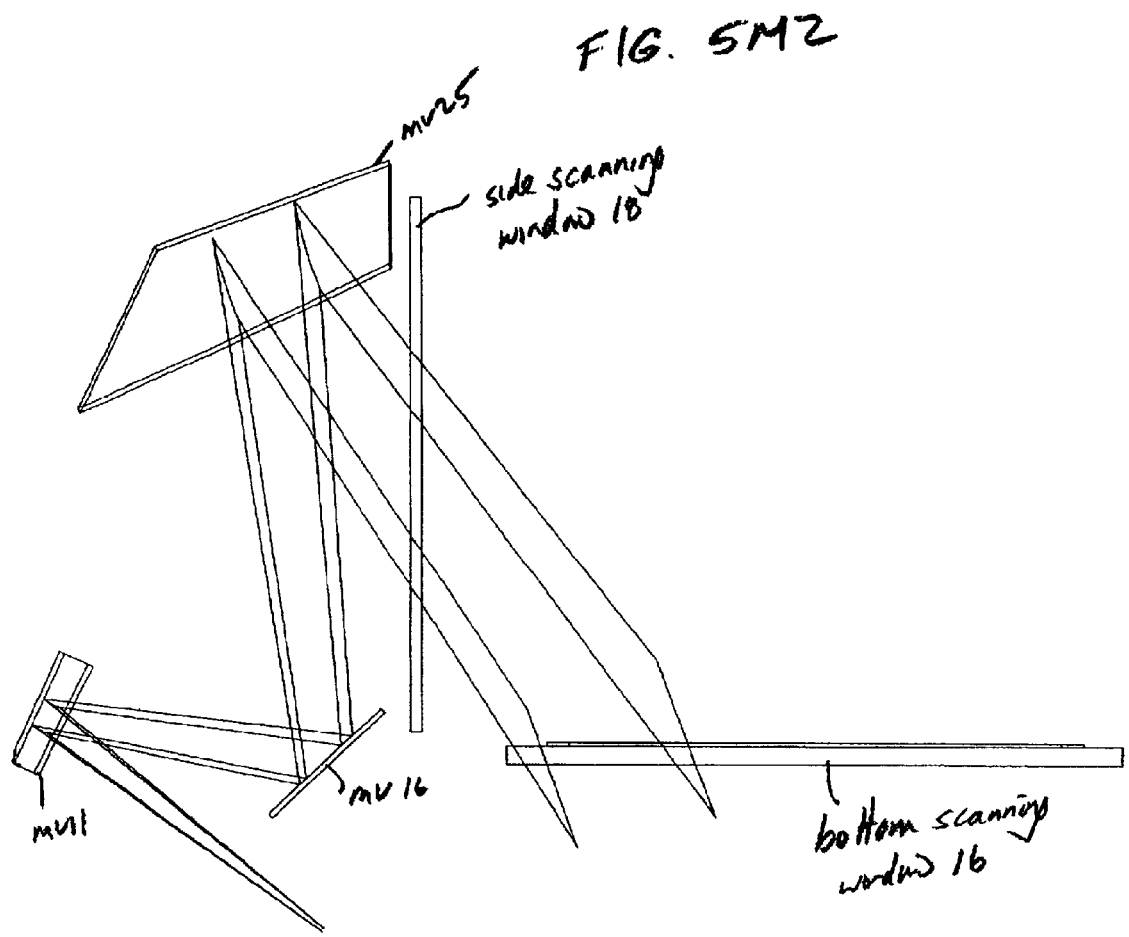

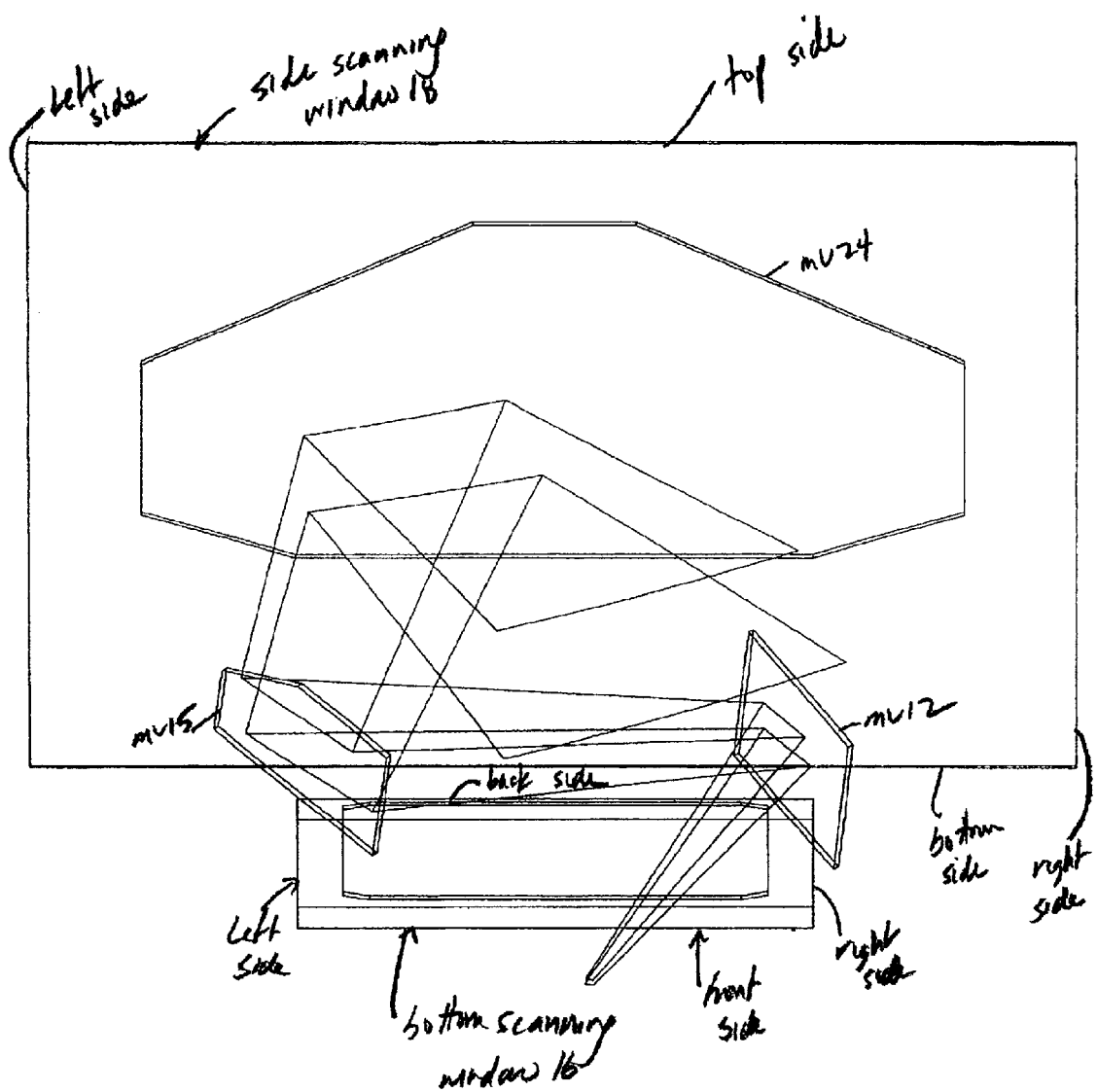
FIG. 5N1

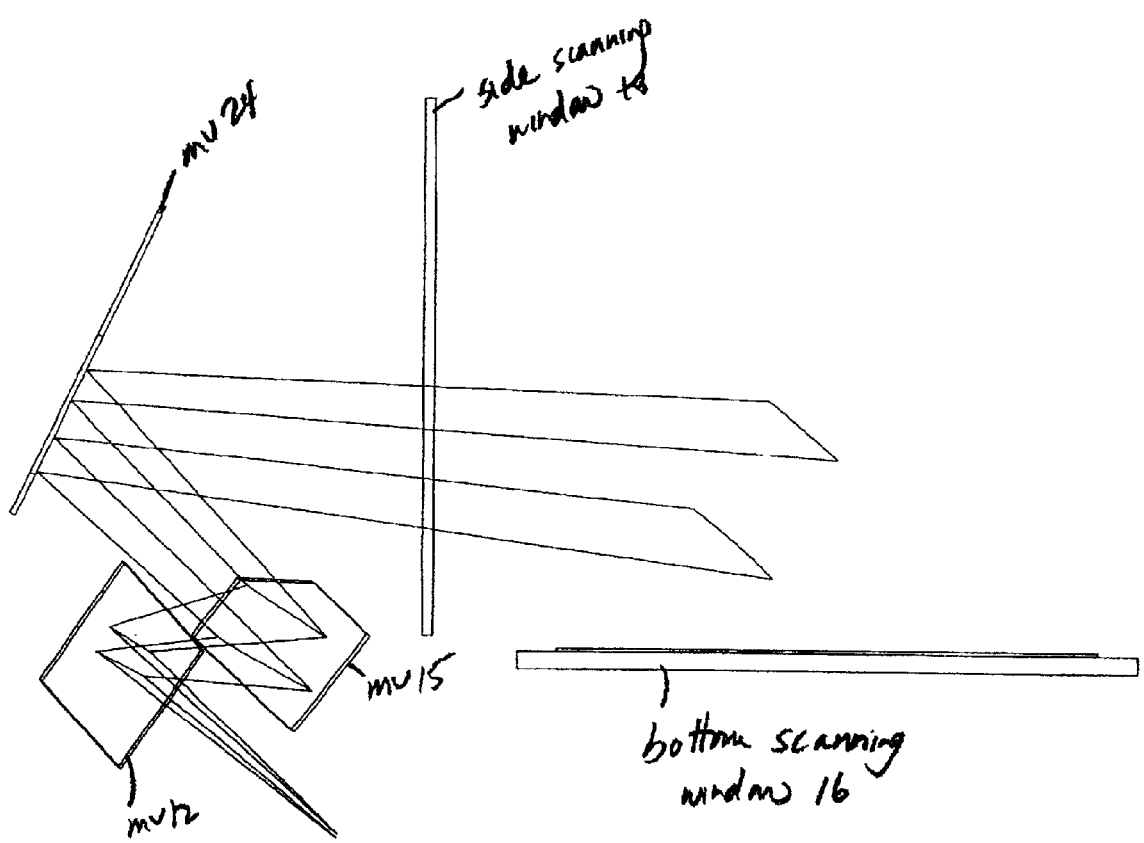

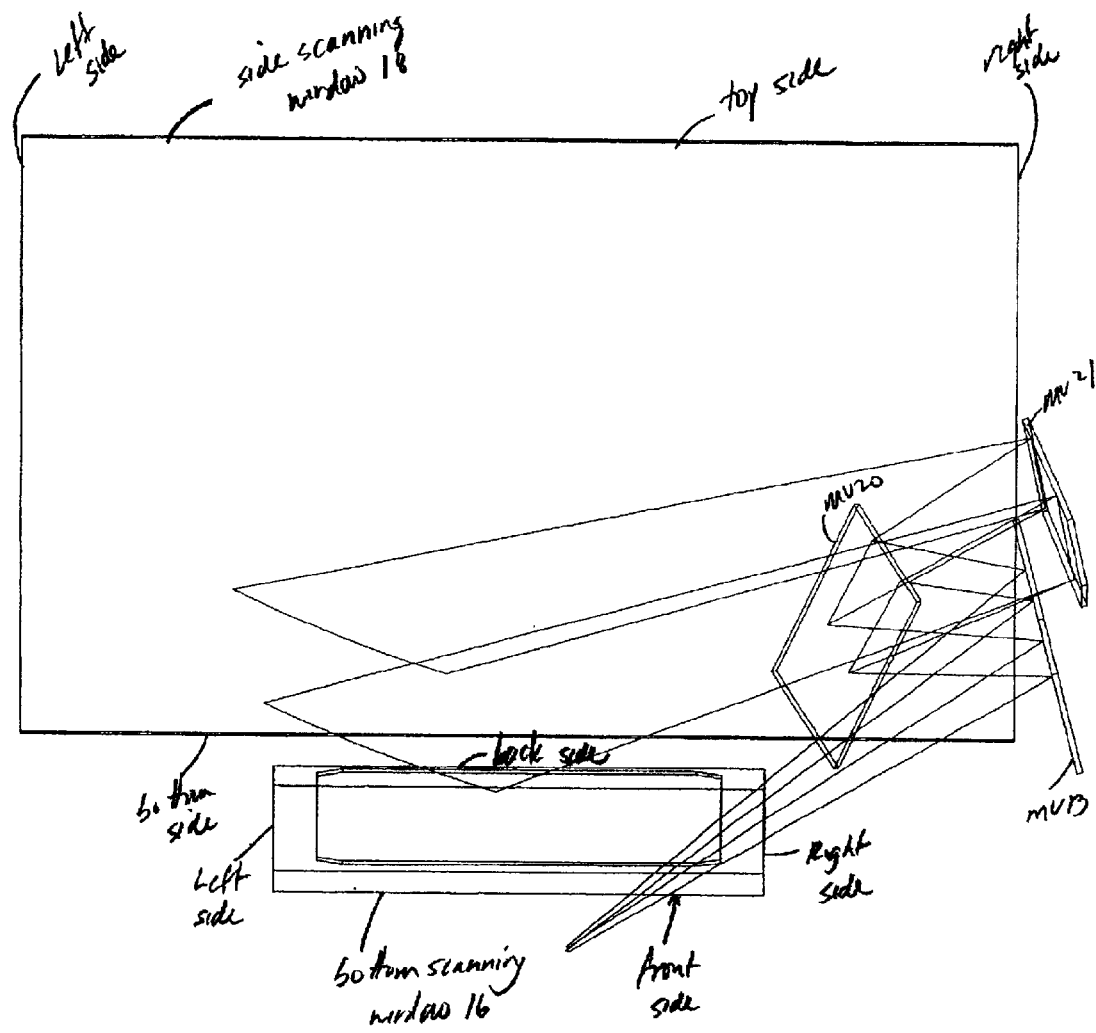

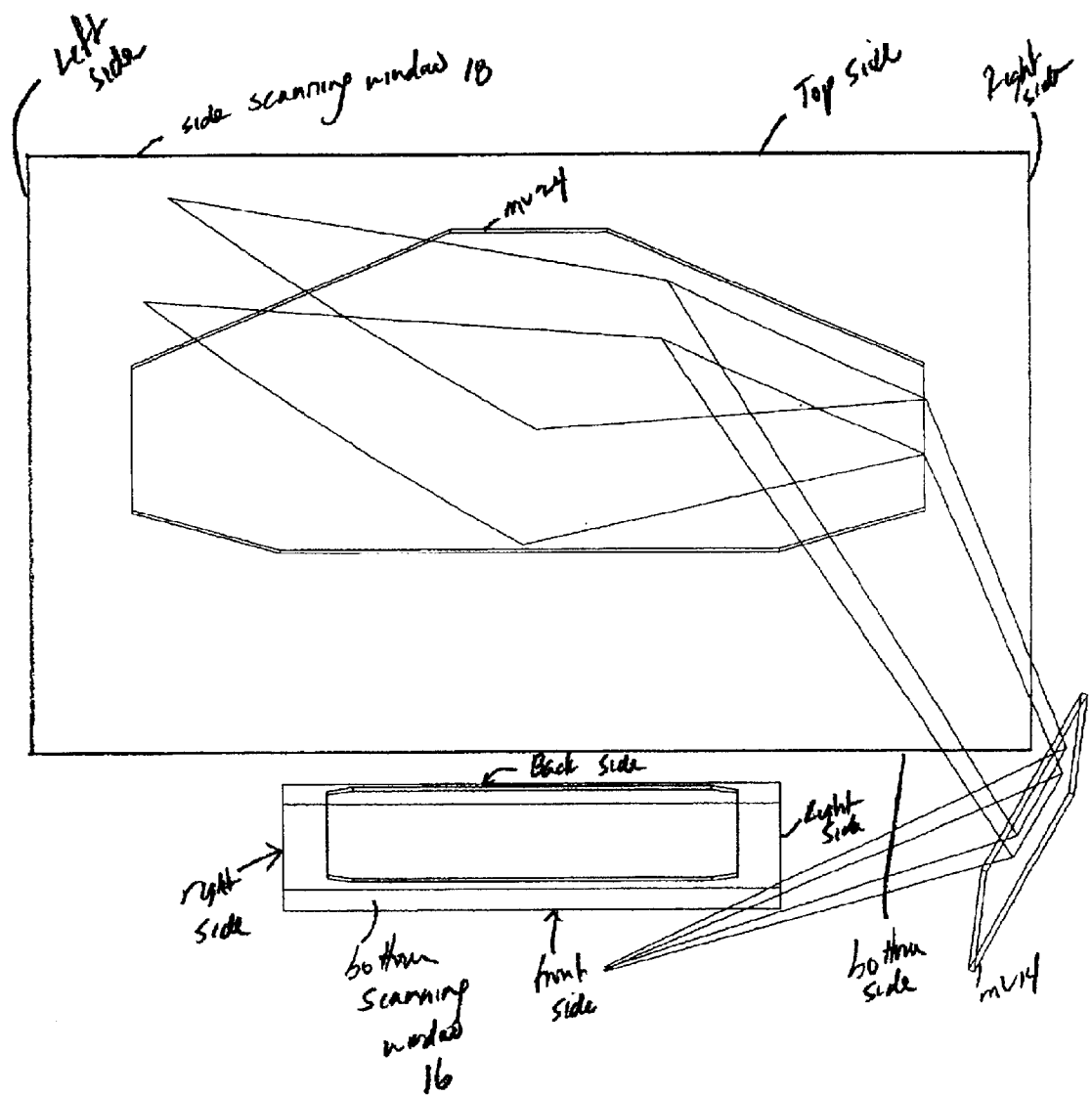
FIG. 5P1

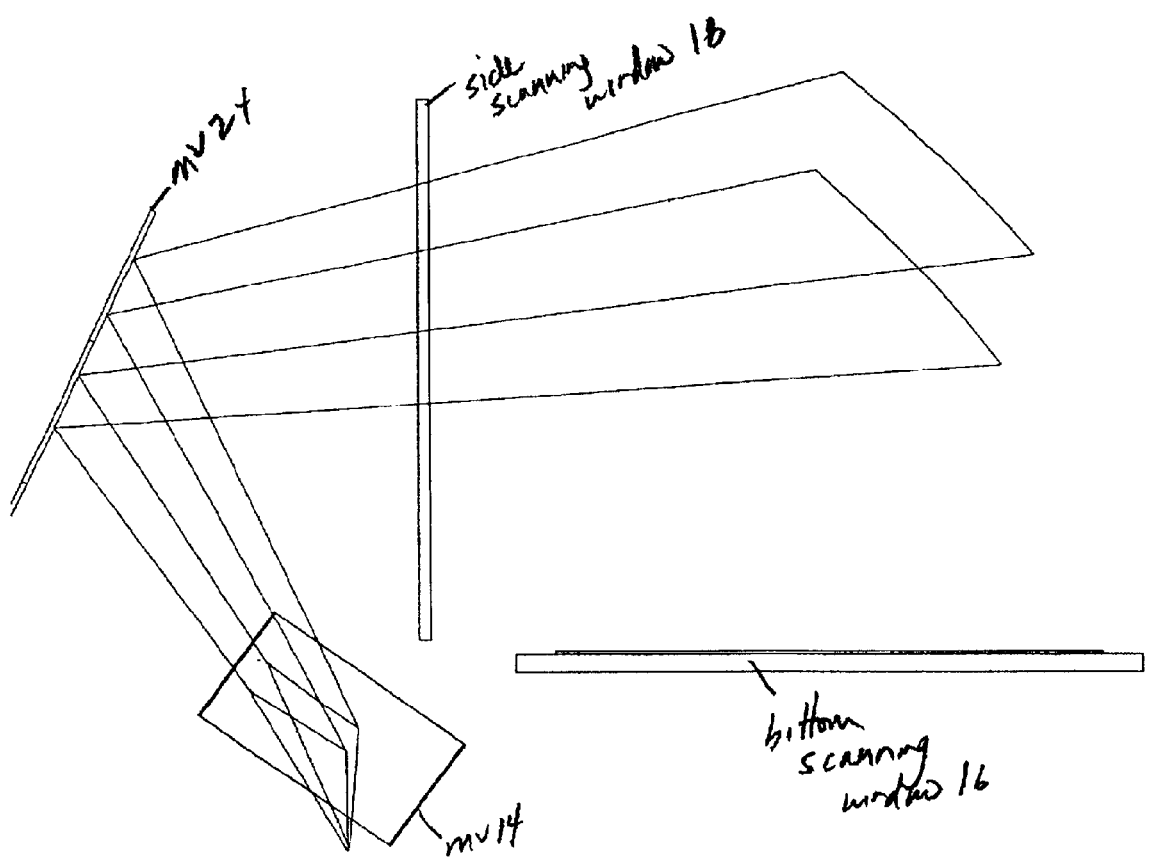

|←— ¼ Revolution of PM1 ——→|←—— ¼ Revolution of PM1 ——→|

| TDM GH1 | TDM GH2 | TDM GH3 | TDM GH4 | TDM GH1 | TDM GH2 | TDM GH3 | TDM GH4 |
|---------|---------|---------|---------|---------|---------|---------|---------|
| TDM GH4 | TDM GH5 | TDM GH6 | TDM GH7 | TDM GH4 | TDM GH5 | TDM GH6 | TDM GH7 |

|←———————————— ½ Revolution of PM2 ————————————→|

| TDM GV1 | TDM GV2 | TDM GV3 | TDM GV4 | TDM GV5 | TDM GV6 | TDM GV7 | TDM GV8 | TDM GV9 | TDM GV10 | TDM GV11 | TDM GV12 | TDM GV13 | TDM GV14 |
|---------|---------|---------|---------|---------|---------|---------|---------|---------|----------|----------|----------|----------|----------|

FIG 6

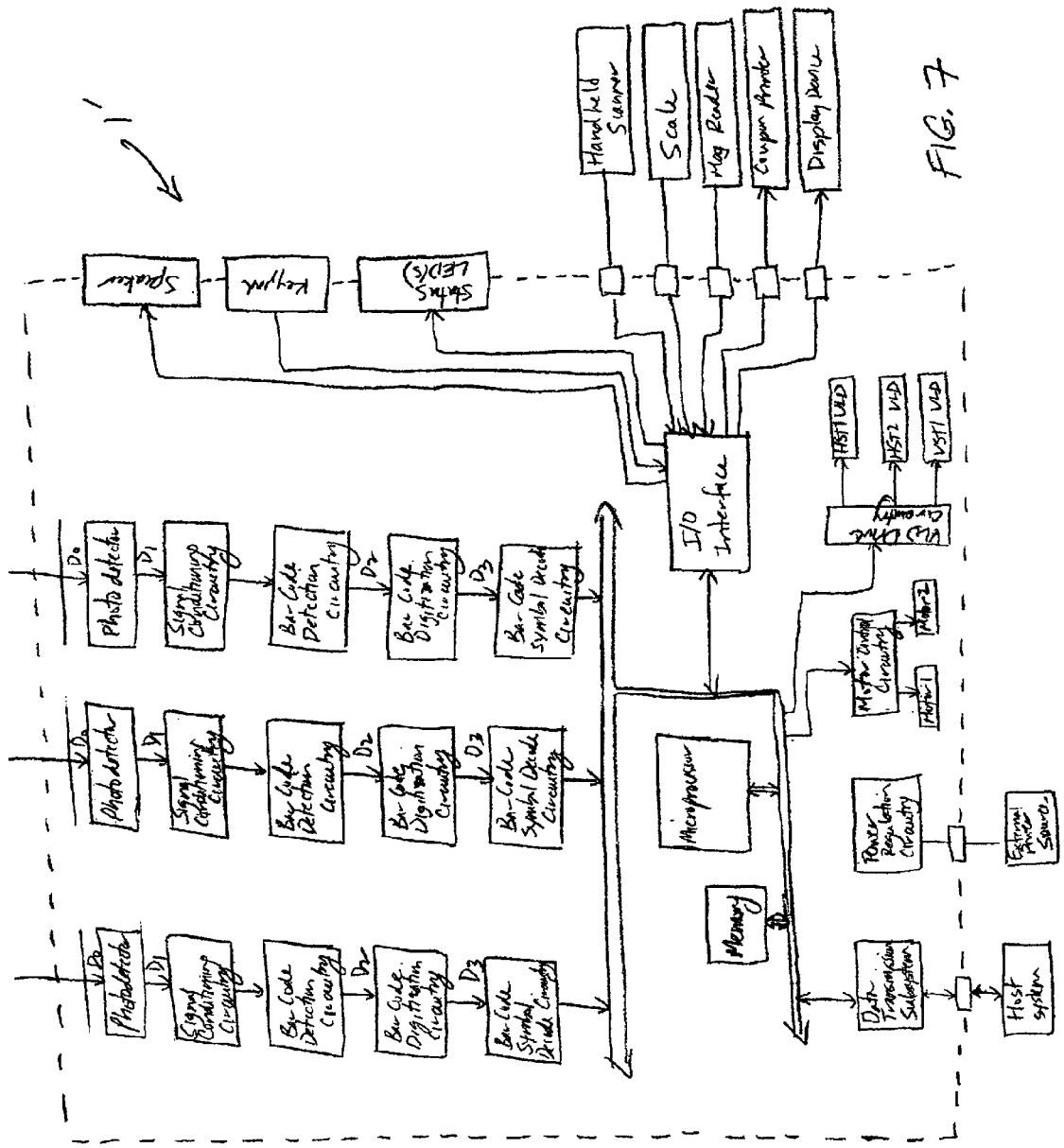

MODULAR OMNIDIRECTIONAL BAR CODE SYMBOL SCANNING SYSTEM WITH AT LEAST ONE SERVICE PORT FOR REMOVABLE INSTALLATION OF SCAN MODULE INSERT

RELATED CASES

The present application is a Continuation-in-Part (CIP) of: U.S. application Ser. No. 10/138,934 filed May 3, 2002; U.S. application Ser. No. 10/053,486 filed Jan. 16, 2002; U.S. application Ser. No. 10/045,577 filed on Jan. 11, 2002 and U.S. application Ser. No. 10/045,605 filed on Jan. 11, 2002. Each said patent application is assigned to and commonly owned by Metrologic Instruments, Inc. of Blackwood, N.J., and is incorporated herein by reference in its entirety.

BACKGROUND OF THE INVENTION

1. Field of Invention

The present invention relates generally to omnidirectional laser scanners capable of reading bar code symbols in point-of-sale (POS) and other demanding scanning environments.

2. Brief Description of the Prior Art

The use of bar code symbols for product and article identification is well known in the art. Presently, various types of bar code symbol scanners have been developed. In general, these bar code symbol readers can be classified into two distinct classes.

The first class of bar code symbol reader simultaneously illuminates all of the bars and spaces of a bar code symbol with light of a specific wavelength(s) in order to capture an image thereof for recognition and decoding purposes. Such scanners are commonly known as CCD scanners because they use CCD image detectors to detect images of the bar code symbols being read.

The second class of bar code symbol reader uses a focused light beam, typically a focused laser beam, to sequentially scan the bars and spaces of a bar code symbol to be read. This type of bar code symbol scanner is commonly called a "flying spot" scanner as the focused laser beam appears as "a spot of light that flies" across the bar code symbol being read. In general, laser bar code symbol scanners are subclassified further by the type of mechanism used to focus and scan the laser beam across bar code symbols.

Such flying spot scanners generally employ at least one laser diode, the light from which is focused and collimated to produce a scanning beam. The scanning beam is directed to a scanning element (such as a rotating polygonal mirror or rotating holographic disk), which redirects the scanning beam across a plurality of stationary beam folding mirrors. Light reflected from a bar code label returns to the stationary beam folding mirrors and scanning element. A light collecting optical element collects this returning light and directs it to a photodetector. The electrical signals generated by the photodetector are processed to detect and decode bar code symbols therein.

The bar code symbols are formed from bars or elements typically rectangular in shape with a variety of possible widths. The specific arrangement of elements defines the character represented according to a set of rules and definitions specified by the code or "symbology" used. The relative size of the bars and spaces is determined by the type of coding used, as is the actual size of the bars and spaces. The number of characters per inch represented by the bar code symbol is referred to as the density of the symbol. To encode a desired sequence of characters, a collection of element arrangements are concatenated together to form the complete bar code symbol, with each character being represented by its own corresponding group of elements. In some symbologies, a unique "start" and "stop" character is used to indicate when the bar code begins and ends. A number of different bar code symbologies exist, including UPC Symbologies, EAN Symbologies, Code 39, Code 128, Code 93, Codabar and Interleaved 2 of 5, etc.

In order to produce a successful scan, an object's bar code symbol must be oriented with respect to a given scanning beam so that the angle therebetween is not so oblique so as to cause an insufficient amount of reflected light to return back to the scanner. Therefore, to achieve a successful scan, the bar code symbol must be positioned sufficiently close to this desired orientation for the given scanning beam.

Thus, to improve the performance of such optical bar code scanners, modern scanners have been developed that employ aggressive scan patterns (i.e., a large number of scanning beams that project into a scan volume at different orientations), which enable such scanners to successfully scan bar code labels over a large number of orientations thereby providing increased scanning throughput. Such modern optical scanners may emit light through a single aperture (such as a horizontal or vertical aperture) or through multiple apertures. Modern optical scanners that emit a large number of scan lines through both a horizontal and vertical aperture are commonly referred to as bioptical scanners. Examples of polygon-based bioptical laser scanning systems are disclosed in U.S. Pat. No. 4,229,588 and U.S. Pat. No. 4,652,732, assigned to NCR, Inc., each incorporated herein by reference in its entirety. In general, bioptical laser scanning systems are generally more aggressive that conventional single scanning window systems scanners in that such systems typically scan multiple scanning beams though the scanning volume and employ a corresponding number of photodetectors for detecting reflection from the multiple scanning beam. For this reason, bioptical scanning systems are often deployed in demanding retail environments, such as supermarkets and high-volume department stores, where high check-out throughput is critical to achieving store profitability and customer satisfaction.

In such modem omnidirectional laser scanning systems, a failed component (for example, failure of a motor that rotates the scanning element, or failure of one or more laser diodes) can be problematic (e.g., lead to a decrease in store profitability and/or customer satisfaction). Yet, the repair of existing omnidirectional scanning systems is a complex, time-consuming undertaking typically requiring a service technician to disassemble the housing (and parts within the housing) to isolate and replace the failed component. Such inefficient scanner repair can also lead to decreased store profitability and/or customer satisfaction (and consequential losses).

Moreover, in the event that a customer requires a different scanner configuration (e.g., for a different scanning application), retrofitting an existing omnidirectional scanning systems is a complex undertaking. Similar to the repair process, typically a service technician disassembles the housing (and parts within the housing) to isolate and replace the components to be reconfigured. Such inefficient scanner reconfiguration repair can lead to increased costs and decreased customer satisfaction.

Similarly, updating a product design to support a different scanner configuration is a complex undertaking involving significant development costs and manufacturing costs.

Thus, there remains a need in the art for improved omnidirectional laser scanning system that can be efficiently and effectively repaired, reconfigured for different scanning applications, and/or effectively configured for different scanning applications at the time of manufacture. Such features will benefit the retailer (lowered costs, better uptime for improved throughput, store profitability and customer satisfaction) and possibly the equipment manufacturer (lowered costs for repair/reconfiguration/configuration and improved customer satisfaction).

OBJECTS AND SUMMARY OF THE PRESENT INVENTION

Accordingly, a primary object of the present invention is to provide a novel omnidirectional laser scanning system which is free of the shortcomings and drawbacks of prior art laser scanning systems and methodologies.

Another object of the present invention is to provide an omnidirectional laser scanning system employing a system housing with at least one service port (e.g., opening) into which is removably installed a self-contained unit that includes components that contribute to the production of the scanning beam projected from the scanning window of the system.

Another object of the present invention is to provide an omnidirectional laser scanning system employing a system housing with at least one service port into which is removably installed a self-contained scan module insert that includes at least the following components: a laser diode, a rotating scanning element, an electric motor that rotates the rotating scanning element, a photodetector, and analog signal processing circuitry that conditions the electrical signal produced by the photodetector.

Another object of the present invention is to provide an omnidirectional laser scanning system employing a scan module insert that further includes any one (or any combination) of the following additional components: one or more light collecting optical elements, one or more beam folding mirrors, analog-to-digital signal conversion circuitry that converts the analog electric signals produced by the analog signal processing circuitry into digital data signals, bar code detection circuitry that forms a digitized representation (e.g., a sequence of binary bit values) of a bar code label being read from signals derived from the output of the analog signal processing circuitry, bar code digitization circuitry that converts the digitized representation of the bar code symbol being read produced by the bar code detection circuitry into a corresponding digital word value, bar code symbol decode circuitry that decodes the digital word value of the bar code label symbol being read produced by the bar code digitization circuitry to generate character data string values associated therewith, interface circuitry for formatting the digitized representation and/or digital word value of the bar code label symbol being read into a specific output format, interface circuitry for converting the character data string values of a bar code label into a format suitable for transmission over a communication link to an external host system, circuitry for communicating the character data string values over a communication link to an external host system, circuitry for storing the character data string values in persistent memory for subsequent communication to an external host system, laser drive circuitry that supplies current to one more laser diodesand controls the output optical power levels of the at the laser diode(s), motor drive circuitry supplies power to the motor that rotates the rotating scanning element, a system controller that performs system control operations, and/or power supply circuitry that provides a regulated supply of electrical power to electrical components of the system.

Another object of the present invention is to provide an omnidirectional laser scanning system employing a scan module insert that further includes two laser diodes and two corresponding photodetectors disposed on opposite sides of the rotating scanning element, in addition to analog signal processing circuitry that conditions (e.g., amplifies and filters) the electrical signal produced by the two photodetectors.

Another object of the present invention is to provide an omnidirectional laser scanning system employing a modular insert that is passed through the service port in the system housing and is fixably disposed such that the exterior surface of the modular insert is flush with the exterior surface of the system housing that is adjacent the service port.

Another object of the present invention is to provide an omnidirectional laser scanning system employing a mating mechanism that enables a modular insert to be fixably mated (and unmated) to the system housing such that the modular insert is disposed within the system housing and that also enables spatial registration of optical components mounted within the modular insert to optical components mounted within the system housing.

Another object of the present invention is to provide an omnidirectional laser scanning system employing electrical interconnect pairs fixably mounted to a modular insert and the system housing, respectively, in a manner that provides for spatial registration and electrical connection between the two interconnects when the modular insert is mated to system housing.

Another object of the present invention is to provide an omnidirectional bioptical laser scanning system employing two scan module inserts that are removably installed through service ports in the system housing, wherein the components of one scan module insert contribute to production of an omnidirectional laser scanning beam projected through one scanning window, while the components of the other scan module insert contribute to production of an omnidirectional laser scanning beam projected through the other scanning window.

Another object of the present invention is to provide an omnidirectional laser scanning system employing multiple scan module inserts that are removably installed through service ports in the system housing, wherein the components of different scan module inserts contribute to production of omnidirectional laser scanning beams projected through different scanning windows of the system.

A further object of the present invention is to provide an improved methodology of repairing and/or reconfiguring an omnidirectional laser scanning system, the method utilizing modular inserts that are removably installed in a service port (e.g., opening) of the system housing.

A further object of the present invention is to provide an improved methodology of configuring an omnidirectional laser scanning system for different scanning applications at the time of manufacture, the methodology utilizing modular inserts that are installed in a service port (e.g., opening) of the system housing.

These and other objects of the present invention will become apparent hereinafter and in the claims to Invention.

BRIEF DESCRIPTION OF THE DRAWINGS

In order to more fully understand the Objects of the Present Invention, the following Detailed Description of the Illustrative Embodiments should be read in conjunction with the accompanying Figure Drawings in which:

FIG. 1C1 depicts cross-section A'—A' of FIG. 1B with the scan module insert 3A' disposed within (e.g., installed within) of the bottom housing portion 5A; this cross-section depicts the interlocking flange structure (with screw holes, posts and screws) embodied within the bottom housing portion 5A' and first scan module insert 3A' that enables the first scan module insert 3A' to be fixably mated (and unmated) to the bottom housing portion 5A' such that the first scan module insert 3A' is disposed within the bottom housing portion 5A'; in addition, this interlocking flange structure enables spatial registration of the optical components mounted within the first scan module insert 3A' to optical components mounted within the multi-part system housing 5'; a similar interlocking flange structure (with screw holes, posts and screws) is embodied within the second scan module insert 3B' and corresponding portion of the bottom housing 5A', which enables the second scan module insert 3B' to be fixably mated (and unmated) to the bottom housing portion 5A' such that the second scan module insert 3B' is disposed within the bottom housing portion 5A'; in addition, this interlocking flange structure enables spatial registration of the optical components mounted within the second scan module insert 3B' to optical components mounted within the multi-part system housing 5'.

FIG. 1C2 is a wire frame model of the scan module inserts 3A' and 3B' disposed within (e.g., installed within) and mated to the bottom housing portion 5A' of the illustrative biotical laser scanning system.

FIG. 2D also depicts the orientation of a horizontal (ladder-type) bar code symbol and vertical (picket-fence type) bar code symbol on exemplary surfaces of the article.

FIG. 2E is a pictorial illustration depicting a normal of a surface and the "flip-normal" of the surface as used herein.

FIG. 2G is a perspective view of a wire frame model of portions of the horizontal section of the illustrative bioptical laser scanning system, including the bottom-scanning window (e.g., horizontal window), first rotating polygonal mirror PM1, and the first and second scanning stations HST1 and HST2 disposed thereabout, wherein each laser scanning station includes a set of laser beam folding mirrors disposed about the first rotating polygon PM1.

FIG. 2M is a perspective view of a wire frame model of portions of the vertical section of the illustrative bioptical laser scanning system, including the side-scanning window 18 (e.g., vertical window), second rotating polygonal mirror PM2, and the third scanning station VST1 disposed thereabout, wherein the third laser scanning station VST1 includes a light collecting/focusing optical element (labeled $LC_{VST1}$) that collects light from a scan region that encompasses the outgoing scanning planes and focuses such collected light onto a photodetector (labeled $PD_{VST1}$), which produces an electrical signal whose amplitude is proportional to the intensity of light focused thereon. The electrical signal produced by the photodetector is supplied to analog/digital signal processing circuitry, associated with the third laser scanning station VST1, that processes analog and digital scan data signals derived there from to perform bar code symbol reading operations. Preferably, the third laser scanning station VST1 includes a laser beam production module (not shown) that generates a laser scanning beam SB3 that is directed to a small light directing mirror disposed in the interior of the light collecting/focusing element $LC_{VST1}$ as shown, which redirects the laser scanning beam SB3 to a point of incidence on the second rotating polygonal mirror PM2.

FIG. 2N1 depicts the angle of each facet of the rotating polygonal mirrors PM1 and PM2 with respect to the rotational axis of the respective rotating polygonal mirrors in the illustrative bioptical laser scanning system described herein.

FIG. 2N2 is a pictorial illustration of the scanning ray pattern produced by the four facets of the first polygonal mirror PM1 in conjunction with the laser beam source provided by the first laser scanning station HST1 in the illustrative bioptical laser scanning system. A similar scanning ray pattern is produced by the four facets of the first polygonal mirror PM1 in conjunction with the laser beam source provided by the second laser scanning station HST2.

FIG. 2N3 is a pictorial illustration of the scanning ray pattern produced by the four facets of the second polygonal mirror PM2 in conjunction with the laser beam source provided by the third laser scanning station VST1 in the illustrative bioptical laser scanning system. The facets of the second polygonal mirror PM2 can be partitioned into two classes: a first class of facets (corresponding to angles $\beta_1$ and $\beta_2$) have High Elevation (HE) angle characteristics, and a second class of facets (corresponding to angles $\beta_3$ and $\beta_4$) have Low Elevation (LE) angle characteristics; high and low elevation angle characteristics are referenced by the plane P1 that contains the incoming laser beam and is normal to the rotational axis of the second polygonal mirror PM2; each facet in the first class of facets (having high beam elevation angle characteristics) produces an outgoing laser beam that is directed above the plane P1 as the facet sweeps across the point of incidence of the third laser scanning station VST1; whereas each facet in the second class of facets (having low beam elevation angle characteristics) produces an outgoing laser beam that is directed below the plane P1 as the facet sweeps across the point of incidence of the third laser scanning station VST1.

FIG. 2O depicts the offset between the pre-specified direction of incidence of the laser beams produced by the laser beam production modules of the laser scanning stations HST1 and HST2 and the rotational axis of the polygonal mirror PM1. Such offset provides for spatial overlap in the scanning pattern of light beams produced from the polygonal mirror PM1 by these laser beam production modules; such spatial overlap can be exploited such that the overlapping rays are incident on at least one common mirror (mh5 in the illustrative bioptical laser scanning system described herein) to provide a dense scanning pattern projecting there from; in the illustrative embodiment, a dense pattern of horizontal planes (groups GH4) is projected from the front side of the bottom window as is graphically depicted in FIGS. 3F1, 3F2 and 4B1 and 4B2.

FIG. 3A illustrates the intersection of the four groups of laser scanning planes (with 20 total scanning planes in the four groups) produced by the first laser scanning station HST1 on the bottom-scanning window 16 in the illustrative bioptical laser scanning system described herein.

FIGS. 3B1 and 3B2 graphically depict a vector-based nomenclature that may be used to define horizontal and vertical scanning planes, respectively, that project through the bottom-scanning window 16.

FIGS. 3C1 and 3C2 is a perspective view and top view, respectively, of a wire frame model that illustrates the first group GH1 of laser beam folding mirrors of the first laser scanning station (HST1), which cooperate with the four scanning facets of the first rotating polygonal mirror PM1 so as to generate four different vertical laser scanning planes that project from the right back corner of the bottom-scanning window 16 diagonally outward and upward above the front left side (and front left corner) of the bottom-scanning window 16 as shown.

FIGS. 3D1 and 3D2 is a front view and top view, respectively, of a wire frame model that illustrates the second group GH2 of laser beam folding mirrors of the first laser scanning station (HST1), which cooperate with the four scanning facets of the first rotating polygonal mirror PM1 so as to generate four different horizontal laser scanning planes that project from the right side of the bottom-scanning window 16 diagonally outward and upward above the left side of the bottom-scanning window 16 as shown.

FIGS. 3E1 and 3E2 is a perspective view and top view, respectively of a wire frame model that illustrates the third group GH3 of laser beam folding mirrors of the first laser scanning station (HST1), which cooperate with the four scanning facets of the first rotating polygonal mirror PM1 so as to generate four different vertical laser scanning planes that project from the right front corner of the bottom-scanning window 16 diagonally outward and upward above the back left side and back left corner of the bottom-scanning window 16 as shown.

FIGS. 3F1 and 3F2 is a front view and side view, respectively, of a wire frame model that illustrates the fourth group GH4 of laser beam folding mirrors of the first laser scanning station (HST1), which cooperate with the four scanning facets of the first rotating polygonal mirror PM1 so as to generate eight different horizontal laser scanning planes that project from the front side of the bottom-scanning window 16 diagonally outward and upward above the back side of the bottom-scanning window 16 as shown; note that the first laser scanning station HST1 utilizes mirrors MH4 and MH5 (and not MH6) of group GH4 to produce eight different scan planes there from.

FIG. 4A illustrates the intersection of the four groups of laser scanning planes (with 20 total scanning planes in the four groups) produced by the second laser scanning station HST2 on the bottom-scanning window 16 of the illustrative bioptical laser scanning system described herein.

FIGS. 4B1 and 4B2 is a front view and side view, respectively, of a wire frame model that illustrates the first group (GH4) of laser beam folding mirrors of the second laser scanning station (HST2), which cooperate with the four scanning facets of the first rotating polygonal mirror PM1 so as to generate eight different horizontal laser scanning planes that project from the front side of the bottom-scanning window 16 diagonally outward and upward above the back side of the bottom-scanning window 16 as shown; note that the second laser scanning station HST2 utilizes mirrors MH5 and MH6 (and not MH4) of group GH4 to produce eight different scan planes there from.

FIGS. 4C1 and 4C2 is a perspective view and top view, respectively, of a wire frame model that illustrates the second group (GH5) of laser beam folding mirrors of the second laser scanning station (HST2), which cooperate with the four scanning facets of the first rotating polygonal mirror PM1 so as to generate four different vertical laser scanning planes that project from the left front corner of the bottom-scanning window 16 diagonally outward and upward above the back right side and back right corner of the bottom-scanning window 16 as shown.

FIGS. 4D1 and 4D2 is a front view and top view, respectively, of a wire frame model that illustrates the third group (GH6) of laser beam folding mirrors of the second laser scanning station (HST2), which cooperate with the four scanning facets of the first rotating polygonal mirror PM1 so as to generate four different horizontal laser scanning planes that project from the left side of the bottom-scanning window 16 diagonally outward and upward above the right side of the bottom-scanning window 16 as shown.

FIGS. 4E1 and 4E2 is a perspective view and top-view, respectively, of a wire frame model that illustrates the fourth group (GH7) of laser beam folding mirrors of the second laser scanning station (HST2), which cooperate with the four scanning facets of the first rotating polygonal mirror PM1 so as to generate four different vertical laser scanning planes that project from the left back corner of the bottom-scanning window 16 diagonally outward and upward above the front right side and front right corner of the bottom-scanning window 16 as shown.

FIG. 4F illustrates the vertical scanning planes that project from the bottom-scanning window 16; including 4 groups (namely, GH1, GH3, GH5 and GH7); groups GH1 and GH5 project from opposing portions (e.g., the back-right and front-left corners of the window 16) of the bottom-scanning window 16, and groups GH3 and GH7 project from opposing portions (e.g., front-right and back-left corners of the window 16) of the bottom-scanning window; note that groups GH1 and GH5 are substantially co-planar (i.e., quasi co-planar) and groups GH3 and GH7 are substantially co-planar (i.e., quasi co-planar), while groups GH1 and GH5 are substantially orthogonal (i.e., quasi-orthogonal) to groups GH3 and GH7, respectively, as shown.

FIGS. 5B1 and 5B2 graphically depict a vector-based nomenclature that may be used to define horizontal and vertical scanning planes, respectively, that project through the side-scanning window 18.

FIGS. 5C1 and 5C2 is a front view and top view, respectively, of a wire frame model that illustrates the first group (GV1) of laser beam folding mirrors of the third laser scanning station (VST1), which cooperate with the two low-elevation (LE) scanning facets of the second rotating polygonal mirror PM2 (corresponding to angles $\beta_3$ and $\beta_4$ of the second polygonal mirror PM2 in FIG. 2N1) so as to generate two different vertical laser scanning planes that project from the left side of the side-scanning window 18 diagonally down and out across the bottom-scanning window 16 above the front right corner of the bottom-scanning window 16 as shown.

FIGS. 5D1 and 5D2 is a perspective view and side view, respectively, of a wire frame model that illustrates the second group (GV2) of laser beam folding mirrors of the third laser scanning station (VST1), which cooperate with the two low-elevation scanning facets of the second rotating polygonal mirror PM2 (corresponding to angles $\beta_3$ and $\beta_4$ of the second polygonal mirror PM2 in FIG. 2N1) so as to generate two different vertical laser scanning planes that project from the top left corner of the side-scanning window 18 downward toward the bottom-scanning window 16 substantially along the left side of the bottom-scanning window 16 as shown.

FIGS. 5E1 and 5E2 is a front view and side view, respectively, of a wire frame model that illustrates the third group (GV3) of laser beam folding mirrors of the third laser scanning station (VST1), which cooperate with the two low-elevation scanning facets of the second rotating polygonal mirror PM2 (corresponding to angles $\beta_3$ and $\beta_4$ of the second polygonal mirror PM2 in FIG. 2N1) so as to generate two different horizontal laser scanning planes that project from the top left quadrant of the side-scanning window 18 diagonally down across the bottom-scanning window 16 as shown.

FIGS. 5F1 and 5F2 is a front view and side view, respectively, of a wire frame model that illustrates the fourth group (GV4) of laser beam folding mirrors of the third laser scanning station (VST1), which cooperate with the two low elevation scanning facets of the second rotating polygonal mirror PM2 (corresponding to angles $\beta_3$ and $\beta_{34}$ of the second polygonal mirror PM2 in FIG. 2N1) so as to generate two different horizontal laser scanning planes that project from the top right quadrant of the side-scanning window 18 diagonally down across the bottom-scanning window 16 as shown.

FIGS. 5G1 and 5G2 is a front view and side view, respectively, of a wire frame model that illustrates the fifth group (GV5) of laser beam folding mirrors of the third laser scanning station (VST1), which cooperate with the two low-elevation scanning facets of the second rotating polygonal mirror PM2 (corresponding to angles $\beta_3$ and $\beta_4$ of the second polygonal mirror PM2 in FIG. 2N1) so as to generate two different vertical laser scanning planes that project from the top right corner of the side-scanning window 18 downward toward the bottom-scanning window 16 substantially along the right side of the bottom-scanning window 16 as shown.

FIGS. 5H1 and 5H2 is a front view and side view, respectively, of a wire frame model that illustrates the sixth group (GV6) of laser beam folding mirrors of the third laser scanning station (VST1), which cooperate with the two low elevation scanning facets of the second rotating polygonal mirror PM2 (corresponding to angles $\beta_3$ and $\beta_4$ of the second polygonal mirror PM2 in FIG. 2N1) so as to generate two different vertical laser scanning planes that project from the right side of the side-scanning window 18 diagonally out across the bottom-scanning window 16 above the front left corner of the bottom-scanning window 16 as shown.

FIGS. 5I1 and 5I2 is a front view and side view, respectively, of a wire frame model that illustrates the seventh group (GV7) of laser beam folding mirrors of the third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2N1) so as to generate two different horizontal laser scanning planes that project from the top left quadrant of the side-scanning window 18 outwardly across the bottom-scanning window 16 (substantially parallel to the bottom-scanning window 16) as shown.

FIGS. 5J1 and 5J2 is a front view and top view, respectively, of a wire frame model that illustrates the eighth group (GV8) of laser beam folding mirrors of the third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2N1) so as to generate two different horizontal laser scanning planes that project from the left side of the side-scanning window 18 outwardly across the bottom-scanning window 16 (substantially parallel to the bottom-scanning window 16) as shown; in the illustrative embodiment, the characteristic direction of propagation of such scanning planes has a non-vertical component whose orientation relative to the normal of the side-scanning window 18 is greater than 35 degrees.

FIGS. 5K1 and 5K2 is a front view and side view, respectively, of a wire frame model that illustrates the ninth group (GV9) of laser beam folding mirrors of the third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2N1) so as to generate two different horizontal laser scanning planes that project from the central portion of the side-scanning window 18 outwardly and downward across the bottom-scanning window 16 as shown.

FIGS. 5L1 and 5L2 is a front view and side view, respectively, of a wire frame model, that 10 illustrates the tenth group (GV10) of laser beam folding mirrors of the third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2N1) so as to generate two different horizontal laser scanning planes that project from the central portion of the side-scanning window 18 outwardly and sharply downward across the bottom-scanning window 16 as shown.

FIGS. 5M1 and 5M2 is a front view and side view, respectively, of a wire frame model that illustrates the eleventh group (GV11) of laser beam folding mirrors of the third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2N1) so as to generate two different horizontal laser scanning planes that project from the central portion of the side-scanning window 18 outwardly and sharply downward across the bottom-scanning window 16 as shown.

FIGS. 5N1 and 5N2 is a front view and side view, respectively, of a wire frame model that illustrates the twelfth group (GV12) of laser beam folding mirrors of the third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2N1) so as to generate two different horizontal laser scanning planes that project from the central portion of the side-scanning window 18 outwardly across the bottom-scanning window 16 (substantially parallel to the bottom-scanning window 16) as shown.

FIGS. 5O1 and 5O2 is a front view and top view, respectively, of a wire frame model that illustrates the thirteenth group (GV13) of laser beam folding mirrors of the third laser scanning station (VST1), which cooperate with the two high elevation scanning facets of the second rotating polygonal mirror (corresponding to angles $\beta_1$ and $\beta_2$ of the second polygonal mirror PM2 in FIG. 2N1) so as to generate two different horizontal laser scanning planes that project from the right side of the side-scanning window 18 outwardly across the bottom-scanning window 16 (substantially parallel to the bottom-scanning window 16) as shown; in the illustrative embodiment, the characteristic direction of propagation of such scanning planes has a non-vertical component whose orientation relative to the normal of the side-scanning window 18 is greater than 35 degrees.

FIGS. 5P1 and 5P2 is a front view and side view, respectively, of a wire frame model that illustrates the fourteenth group (GV14) of laser beam folding mirrors of the third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2N1) so as to generate two different horizontal laser scanning planes that project from the top right quadrant of the side-scanning window 18 outwardly across the bottom-scanning window 16 (substantially parallel to the bottom-scanning window 16) as shown.

FIG. 6 is an exemplary timing scheme for controlling the illustrative bioptical laser scanner to cyclically generate a complex omnidirectional laser scanning pattern from both the bottom and side-scanning windows 16 and 18 thereof during the revolutions of the scanning polygonal mirrors PM1 and PM2; in this exemplary timing scheme, four sets of scan plane groups (4*[GH1 . . . GH7]) are produced by stations HST1 and HST2 during each revolution of the polygonal mirror PM1; two sets of scan plane groups (2*[GV1 . . . GV14]) are produced by station VST1 during a single revolution of the polygonal mirror PM2; this complex omnidirectional scanning pattern is graphically illustrated in FIGS. 3A through 5P2, which consists of 68 different laser scanning planes which cooperate in order to generate a plurality of quasi-orthogonal laser scanning patterns within the 3-D scanning volume of the system, thereby enabling true omnidirectional scanning of bar code symbols.

FIG. 7 is a functional block diagram of an illustrative embodiment of the electrical subsystem of the illustrative bioptical laser scanning system in accordance with the present invention, including: photodetectors (e.g. a silicon photocell) for detection of optical scan data signals generated by the respective laser scanning stations; signal conditioning circuitry for conditioning (e.g., preamplification and/or filtering out unwanted noise in) the electrical signals output by the photodetectors; bar code symbol detection circuitry that forms a digitized representation (e.g., a sequence of binary bit values) of a bar code label being read from signals derived from the output of the signal conditioning circuitry; bar code digitization circuitry that converts the digitized representation of the bar code symbol being read into a corresponding digital word value; bar code symbol decode circuitry that decodes the digital word value of the bar code symbol being read to generate character data string values associated therewith; a programmed microprocessor with a system bus and associated program and data storage memory, for controlling the system operation of the bioptical laser scanner and performing other auxiliary functions and for receiving bar code symbol character data (provided by the bar code symbol decoding circuitry); a data transmission subsystem for interfacing with and transmitting symbol character data and other information to host computer system (e.g. central computer, cash register, etc.) over a communication link therebetween; and an input/output interface for providing drive signals to an audio-transducer and/or LED-based visual indicators used to signal successful symbol reading operations to users and the like, for providing user input via interaction with a keypad, and for interfacing with a plurality of accessory devices (such as an external handheld scanner, a display device, a weigh scale, a magnetic card reader and/or a coupon printer as shown); VLD drive circuitry that controls the power supplied to the VLD modules (HST1 VLD, HST2 VLD or VST1 VLD); and motor control circuitry that controls the power supplied to the electric motors (motor 1, motor 2) that rotate the scanning polygonal mirrors PM1 and PM2.

DETAILED DESCRIPTION OF THE ILLUSTRATIVE EMBODIMENTS OF THE PRESENT INVENTION

Referring to the figures in the accompanying Drawings, the various illustrative embodiments of the modular omnidirectional laser scanner of the present invention will be described in great detail.

Figure 1A:
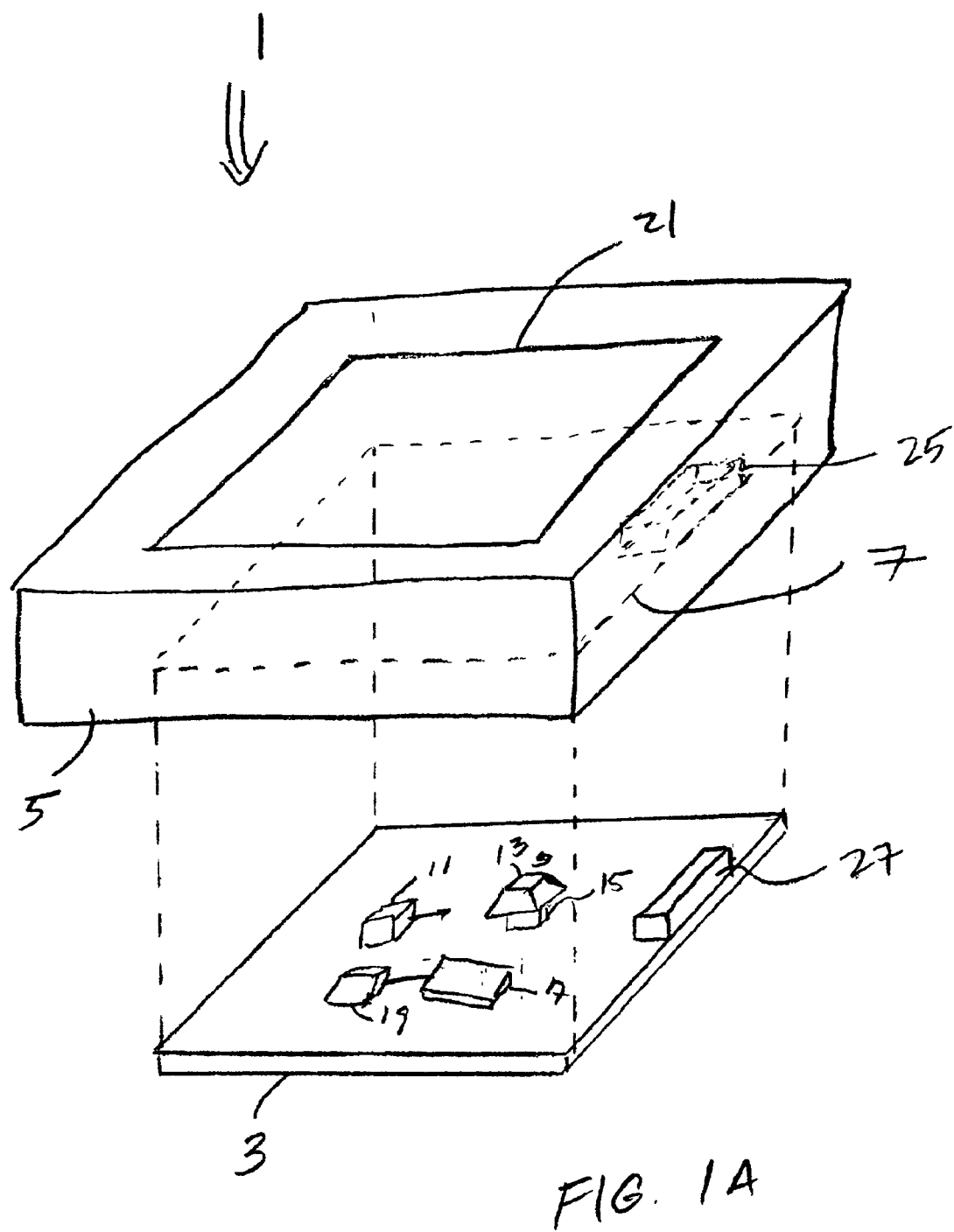
FIG. 1A is an exploded view of a modular omnidirectional laser-based bar code symbol scanning system in accordance with the present invention, which includes at least one scan module insert that is removably disposed (e.g., removably installed) within a system housing (or portion thereof) through a service port (e.g., opening) in the system housing (or portion thereof). The scan module insert is a self-contained unit including at least the following components (in addition to mechanical support structures for such components): at least one laser diode, a rotating scanning element, an electric motor that rotates the rotating scanning element, one or more photodetectors, and analog signal processing circuitry that conditions (e.g., amplifies and/or filters out unwanted noise in) the electrical signal produced by the one or more photodetectors. The scan module insert can optionally include additional components including one or more light collecting optical elements, one or more beam folding mirrors, circuitry for detecting and decoding bar code symbols scanned by the system, etc.

As illustrated in FIG. 1A, a modular omnidirectional laser-based bar code symbol scanning system 1 in accordance with the present invention includes at least one scan module insert 3 that is removably disposed (e.g., removably installed) within a system housing 5 (or portion thereof) through a service port 7 (e.g., opening) in the system housing 5 (or portion thereof). The scan module insert 3 is a self-contained unit including at least the following components (in addition to mechanical support structures for such components):

i) at least one laser diode 11 (one shown) that produces laser light;
ii) a rotating scanning element 13 (such as a polygonal mirror as shown, or multifaceted holographic disk) that redirects laser light incident thereon to produce one or more scanning laser beams;
iii) an electric motor 15 that rotates the rotating scanning element;
iv) one or more photodetectors 17 (e.g., silicon photocells) that detect light incident thereon and produce an electrical signal whose amplitude is proportional to the intensity of such detected light; and
v) analog signal processing circuitry 19 that conditions (e.g., amplifies and/or filters out unwanted noise in) the electrical signal produced by the one or more photodetectors.

Optional components (not shown) that may be contained in the scan module insert 3 include the following:

vi) light collecting optical elements (e.g., lenses and/or mirror structures that are positioned either in-line or off-axis from the scanning beams) which collects the returning light (i.e., light from the scanning beam which has been reflected and/or scattered by a bar code label being read) and focus such returning light onto the one or more photodetectors;
vii) one or more beam folding mirrors that redirect the scanning laser beam (produced by the rotating scanning element) through a window in the system housing such that the scanning laser beam scans a scanning region external thereto; in addition, the one or more beam folding mirror redirect the returning light back toward the rotating scanning element from which it originated.
viii) analog-to-digital signal conversion circuitry that converts the analog electric signals produced by the analog signal processing circuitry (or electrical signals derived there from) into digital data signals;
ix) bar code symbol detection circuitry (analog and/or digital circuitry) that forms a digitized representation (e.g., a sequence of binary bit values) of a bar code label being read from signals derived from the output of the analog signal processing circuitry;
x) bar code digitization circuitry (digital circuitry) that converts the digitized representation of the bar code symbol being read into a corresponding digital word value;
xi) bar code symbol decode circuitry (digital circuitry) that decodes the digital word value of the bar code label symbol being read to generate character data string values associated therewith;
xii) interface circuitry for formatting the digitized representation or digital word value of the bar code label symbol into a specific output format (i.e., undecoded or wand emulation format);
xiii) interface circuitry for converting the character data string values of a bar code label into a format suitable for transmission of a communication link to an external host system (e.g., POS system);
xiv) circuitry for communicating the character data string values over a communication link to an external host system;
xv) circuitry for storing the character data string values in persistent memory for subsequent communication to an external host system;
xvi) laser drive circuitry that supplies current to the laser diode(s) and controls the output optical power levels of the laser diode(s);
xvii) motor drive circuitry supplies power to the motor that rotates the rotating scanning element;
xviii) a system controller that performs system control operations; and/or xix) power supply circuitry, operably coupled to an external power supply (such as an AC outlet) or internal power supply (such as a battery), that provides a regulated supply of electrical power to electrical components of the scanning system.

The system housing 5 (which may be a multi-part housing as described below with respect to FIG. 1B) includes at least one scanning window 21 from which an omnidirectional scanning laser beam pattern in projected during operation of the scanning system 1. In addition, the system housing 5 may optionally house one or more of the components listed above in vi) through xix).

In the preferred embodiment of the present invention, the scan module insert 3 is passed through the service port 7 of the system housing 5 (or portion thereof) and is fixably disposed therein such that the exterior surface of the scan module insert is flush with the exterior surface of the system housing (or portion thereof). Alternate configurations are contemplated. For example, only a part of the scan module insert 3 may pass through the service port 7 of the system housing 5 (or portion thereof) and be fixably disposed therein. In this configuration, part of the scan module insert 3 may be disposed outside the system housing 5. In another exemplary configuration, the entire scan module insert 3 may pass through the service port 7 of the system housing 5 (or portion thereof) and be fixably disposed therein such that the scan module insert 3 is disposed within the interior space of the system housing 5 (or portion thereof). In this case, a removable cover (not shown) may be used to cover the scan module insert 3 such that the exterior surface of the system housing 5 (or portion thereof) is flush.

Moreover, in the preferred embodiment of the present invention, a mating mechanism (for example, an interlocking flange structure with screw holes, posts and screws as described below with respect to FIGS. 1C1 and 1C2) is provided that enables the scan module insert 3 to be fixably mated (and unmated) to the system housing 5 (or portion thereof) such that the scan module insert 3 is disposed within the system housing 5 (or portion thereof), and that also enables spatial registration of the optical components mounted within the scan module insert 3 to optical components mounted within the system housing 5 (or portion thereof).

Moreover, in the preferred embodiment of the present invention, a first electrical interconnect 25 (e.g., first connector) is integral to the system housing 5 (or portion thereof) and is operably coupled to electric components integral to the system housing 5 (or portion thereof). A second electrical interconnect 27 (e.g., second connector) is integral to the scan module insert 3 and is operably coupled to electrical components integral to the scan module insert 3 (e.g., laser diode(s), electric motor, photodetector, analog processing circuitry, etc.). The first and second electrical interconnects 25, 27 are releasably coupled together to provide electric connection between the electrical components operably coupled thereto. Preferably, the first electrical interconnect 25 (e.g., first connector) and second electrical interconnect 27 (e.g., second connector) are fixably mounted to the system housing 5 and scan module insert 3, respectively, in a manner that provides for spatial registration and electrical connection between the two interconnects when the scan module insert 3 is mated to system housing 5 (or portion thereof) Alternatively, either one (or both) of the first electrical interconnect 25 and second electrical interconnect 27 may be flexibly mounted (for example, via a ribbon cable or other cable means) to the system housing 5 and the scan module insert 3, respectively, to provide for flexible electrical connection between the system housing 5 (or portion thereof) and the scan module insert 3. In alternate configurations, multiple electrical connector pairs may be used to operably couple the electric components integral to the system housing 5 (or portion thereof) to the electrical components integral to the scan module insert 3.

Advantageously, the modular architecture of the omnidirectional laser scanner of the present invention enables quick access to the scan module insert for efficient repair/reconfiguration of the electro-mechanical and electrical components integral thereto. More specifically, the omnidirectional laser scanner of the present invention (with a given scan module insert installed there) can be readily reconfigured or repaired by providing a second scan module insert (that is the same or different configuration than the given scan module insert), removing the given scan module insert via the service port (which may involve unscrewing the mating screws for the given scan module insert and unmating the electrical connectors between the given scan module insert and the system housing), and installing the second scan module insert via the service port (which may involve mating the electrical connectors between the second scan module insert and the system housing and screwing the mating screws for the second scan module insert). Such efficient scanner repair/reconfiguration limits scanner downtime, which can lead to increased customer satisfaction and increased store profitability The different scan module insert configurations can include different optical characteristics (varying scan patterns that are particular tailored to the needs of one or more customers, different VLD wavelengths, different beam dispersion characteristics of the scanning beam, different size and/or shape of the scan region collected by light collection optical element(s), etc.), different electrical characteristics (varying signal processing parameters (e.g., varying gain factors, varying bandpass frequencies), varying signal processing methodologies/mechanisms, varying bar code detection methodologies/mechanisms, varying bar code decoding methodologies/mechanisms, varying data transmission methodologies/mechanisms (e.g., support different communication protocols), varying I/O interface options, etc.).

In addition, the modular architecture of omnidirectional laser scanner of the present invention enables flexible and efficient configuration of omnidirectional laser scanner at the time of manufacture. More specifically, the omnidirectional laser scanner of the present invention can be readily configured at the time of manufacture by providing an inventory of scan module inserts with different configurations therein. During the manufacture of the laser scanning system, one or more of the scan module inserts in selected from the inventory (preferably based upon criteria that matches the configuration of the selected scan module insert(s) to the intended scanning application of the system), and the selected scan module insert(s) is (are) installed into the system housing through the corresponding service port(s) in the system housing (which may involve mating the electrical connectors between the selected scan module insert and the system housing and screwing the mating screws for the selected scan module insert). Such efficient scanner configuration leads to decreased development costs and manufacturing costs of the scanner.

The different scan module insert configurations in the inventory can include different optical characteristics (varying scan patterns that are particular tailored to the needs of one or more customers, different VLD wavelengths, different beam dispersion characteristics of the scanning beam, different size and/or shape of the scan region collected by light collection optical element(s), etc.), different electrical characteristics (varying signal processing parameters (e.g., varying gain factors, varying bandpass frequencies), varying signal processing methodologies/mechanisms, varying bar code detection methodologies/mechanisms, varying bar code decoding methodologies/mechanisms, varying data transmission methodologies/mechanisms (e.g., support different communication protocols), varying I/O interface options, etc.).

The modular architecture of the omnidirectional scanning system 1 of the present invention is well suited for a point of sale (POS) presentation scanner (where a label to be scanned is moved through the scanning region for data acquisition); however such features can be used in other bar code reading and imaging systems, including handheld scanners and other POS scanners in addition to hold-under scanners and other industrial scanners.

Point-of-sale (POS) scanners are typically designed to be used at a retail establishment to determine the price of an item being purchased. POS scanners are generally smaller than industrial scanner models, with more artistic and ergonomic case designs. Small size, low weight, resistance to damage from accident drops and user comfort, are all major design factors for the POS scanner. POS scanners include hand-held scanners, hands-free presentation scanners and combination-type scanners supporting both hands-on and hands-free modes of operation. These scanner categories will be described in greater detail below.

As described above, hand-held scanners are designed to be picked up by the operator and aimed at the label to be scanned. In addition, hand-held scanners have many uses outside POS applications such as inventory management and portable data acquisition and object identification.

Hands-free presentation scanners are designed to remain stationary and have the item to be scanned picked up and passed in front of the scanning device. Presentation scanners can be mounted on counters looking horizontally, embedded flush with the counter looking vertically, or partially embedded in the counter looking vertically, but having a "tower" portion which rises out above the counter and looks horizontally to accomplish multiple-sided scanning. If necessary, presentation scanners that are mounted in a counter surface can also include a scale to measure weights of items.

Some POS scanners can be used as handheld units or mounted in stands to serve as presentation scanners, depending on which is more convenient for the operator based on the item that must be scanned.

An industrial scanner is a scanner that has been designed for use in a warehouse or shipping application where large numbers of packages must be scanned in rapid succession. Industrial scanners include conveyor-type scanners (which scan packages as they move by on a conveyor belt) and hold-under scanners (which scan packages that are picked up and held underneath it). The package is then manually routed or otherwise handled, perhaps based on the result of the scanning operation. Hold-under scanners are generally mounted so that its viewing optics are oriented in downward direction, like a library bar code scanner.

Figure 1B:
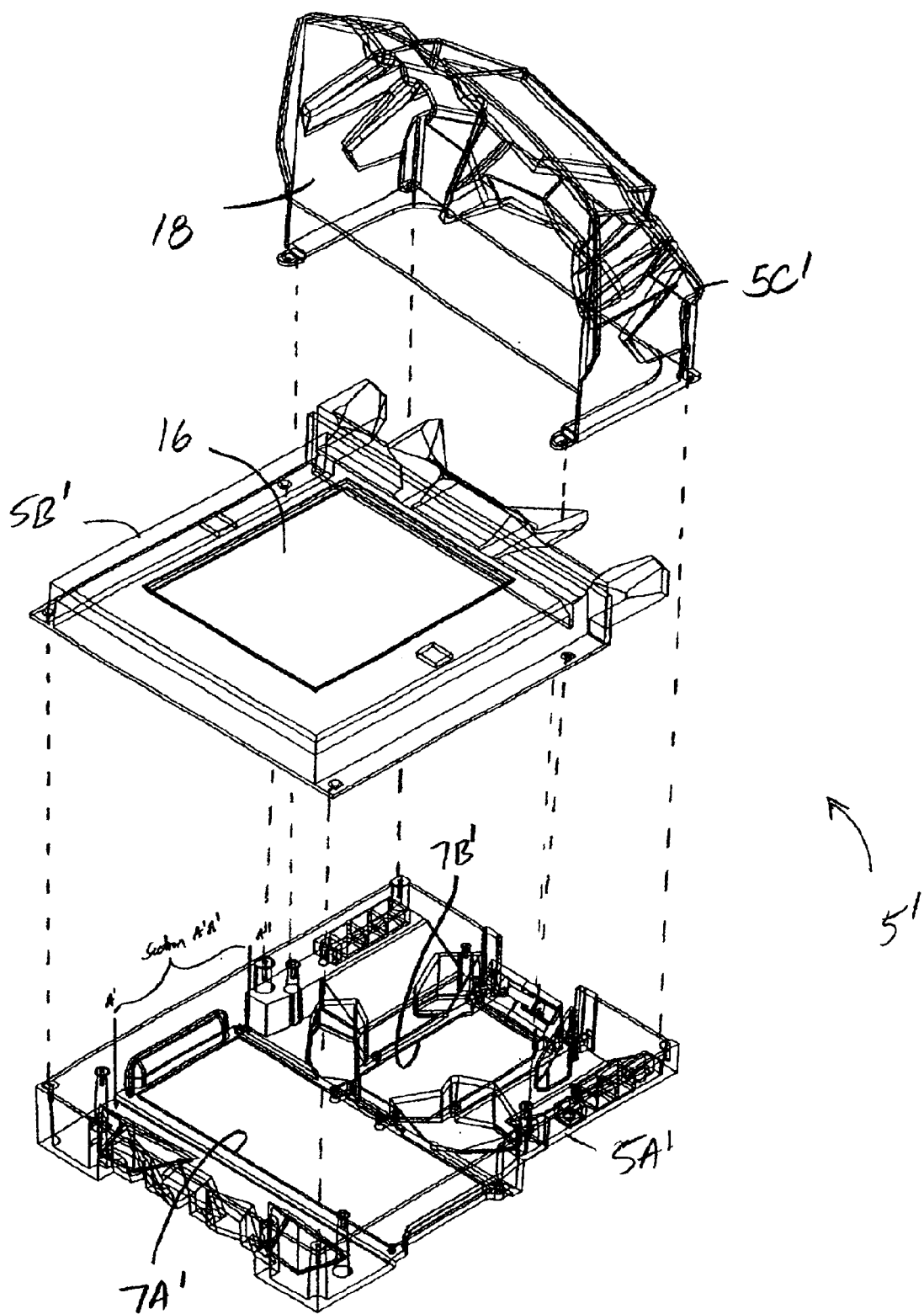
FIG. 1B is a wire-frame model of the system housing 5' of an illustrative bioptical laser scanning system in accordance with the present invention; the system housing 5' has multiple parts (a bottom portion 5A', a top portion 5B' and a hood portion 5C') that are preferably mated together with screws and posts as shown; the top portion 5B' includes a first scanning window 16 (referred to below as the "bottom scanning window"), while the hood portion 5C' includes a second scanning window 18 (referred to below as "side scanning window"), which is preferably oriented substantially orthogonal to the bottom scanning window as shown. The bottom housing portion 5A' includes two service ports 7A' and 7B' through which corresponding scan module inserts 3A' and 3B' are removably installed. The first scan module insert 3A', which is illustrated in FIGS. 1D and 1E, includes components that contribute to the production of an omnidirectional laser beam scanning pattern that is projected through the bottom scanning window 16 as described herein; while the scan module insert 3B', which is illustrated in FIGS. 1F and 1G, includes components that contribute to the production of an omnidirectional laser beam scanning pattern that is projected through the side scanning window 18 as described herein.

An illustrative omnidirectional bioptical scanning system (presentation-type) in accordance with the present invention is illustrated in FIGS. 1B through 7. FIG. 1B illustrates the housing 5' of the illustrative bioptical scanning system, which has multiple parts (a bottom portion 5A', a top portion 5B' and a hood portion 5C') that are preferably mated together with screws and posts as shown. The top portion 5B' includes a first scanning window 16 (referred to below as the "bottom scanning window"), while the hood portion 5C' includes a second scanning window 18 (referred to below as "side scanning window") which is preferably oriented substantially orthogonal to the bottom scanning window 16 as shown. When the scanning system is installed within a counter-top surface, as shown in FIG. 2D, the top portion 5B' (and the bottom scanning window 16 integral thereto is oriented horizontally, whereas the hood portion 5C' (and the side scanning window 18 integral thereto) is oriented vertically with respect to the POS station. Thus throughout the Specification and Claims hereof, the terms "bottom scanning window" and "horizontal window" may be used interchangeably but refer to the same structure; likewise, the terms "side scanning window" and "vertical window" may be used interchangeably but refer to the same structure.

In the illustrative embodiment, the bottom portion 5A' of the system housing 5 includes two service ports 7A' and 7B' through which corresponding scan module inserts 3A' and 3B' are removably installed. The first scan module insert 3A', which is illustrated in FIGS. 1D and 1E, includes components that contribute to the production of an omnidirectional laser beam scanning pattern that is projected through the bottom scanning window 16; while the scan module insert 3B', which is illustrated in FIGS. 1F and 1G, includes components that contribute to the production of an omnidirectional laser beam scanning pattern that is projected through the side scanning window 18.

Figure 1D:
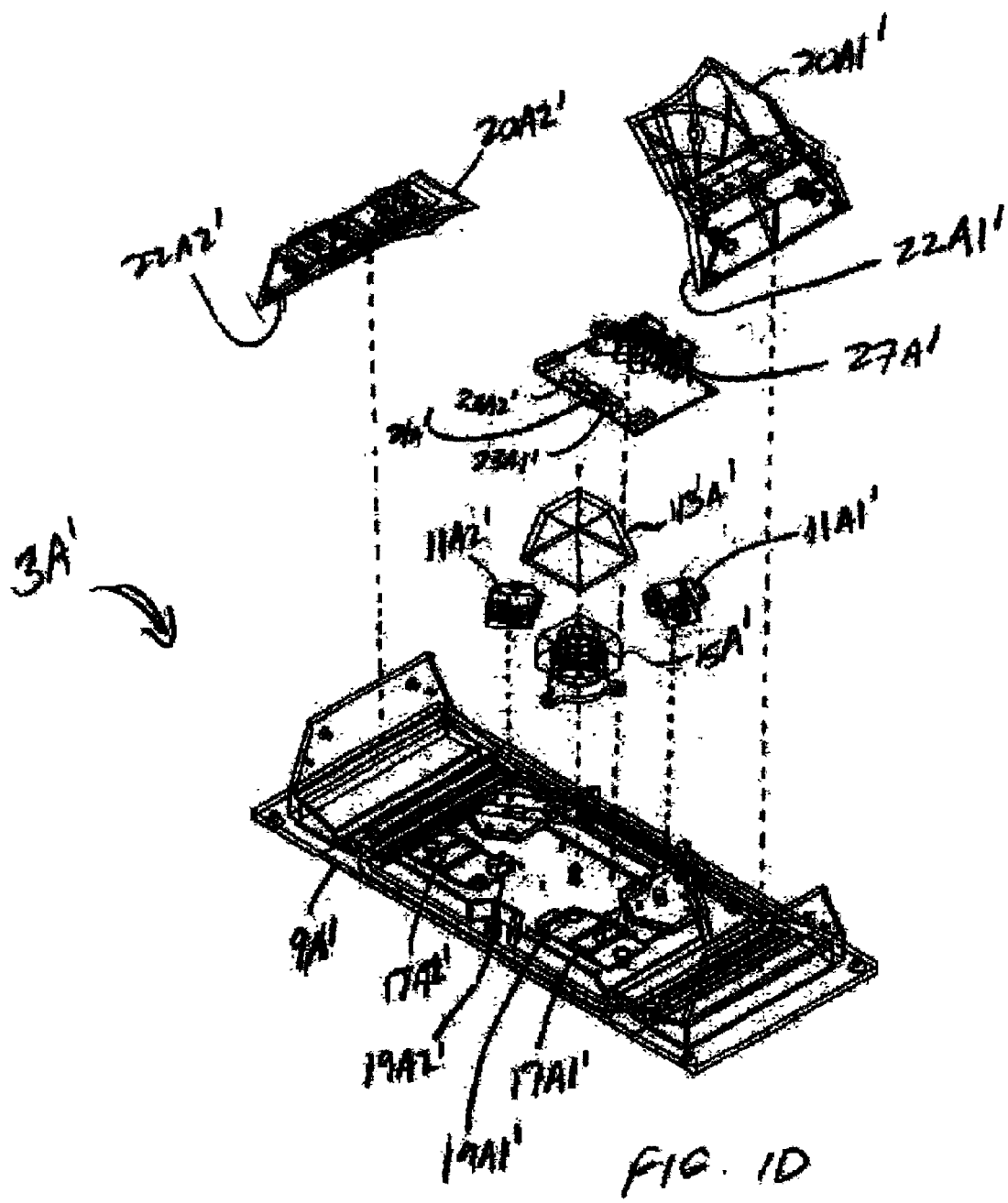
FIG. 1D is a partially exploded view of a wire-frame model of the components of the first scan module insert 3A' of the illustrative bioptical laser scanning system.
Figure 1E:
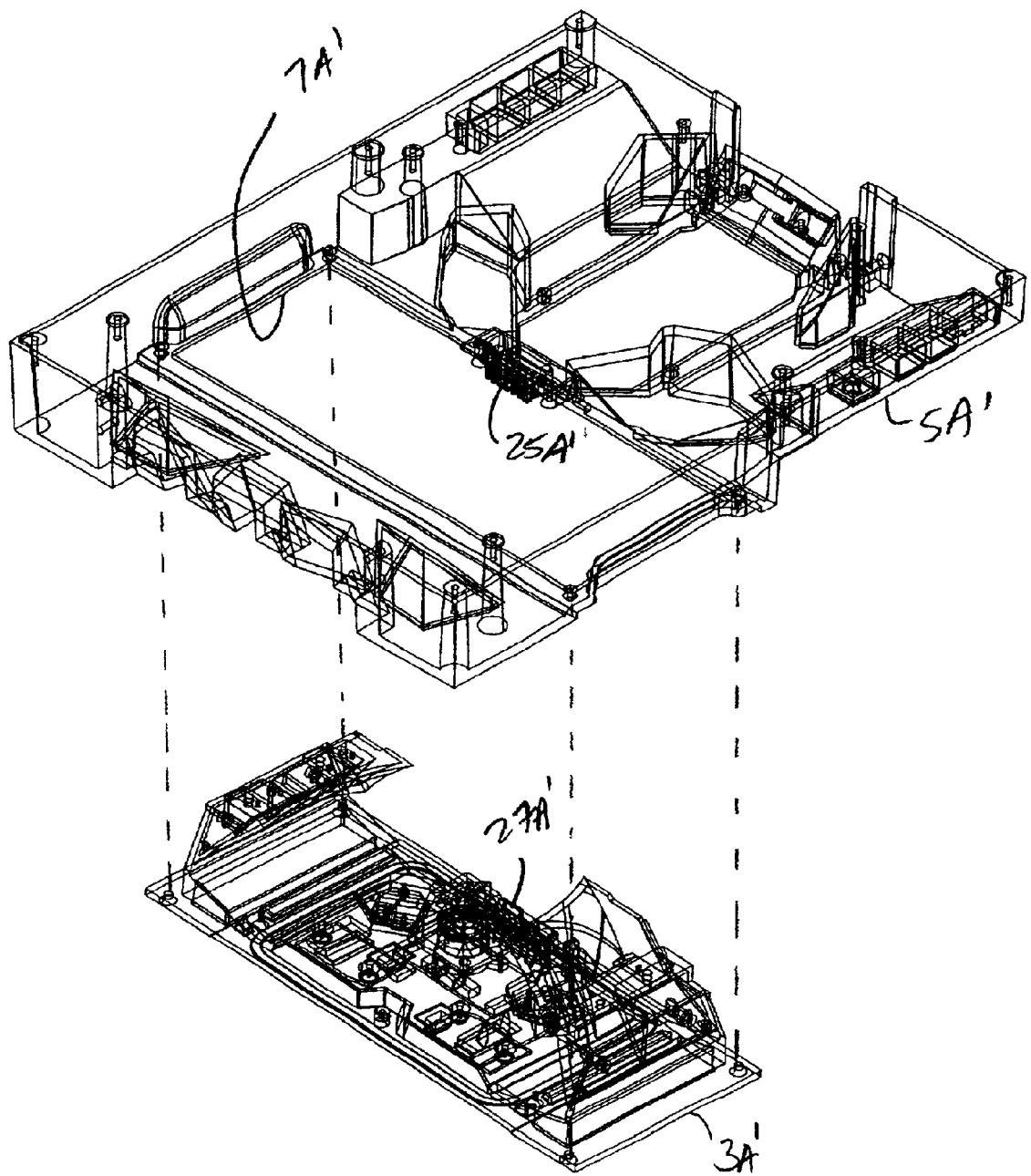
FIG. 1E is an exploded view that illustrates the removable installation of the first scan module insert 3A' through the service port 7A' of the bottom housing portion 5A' of the illustrative bioptical laser scanning system.
Figure 1F:
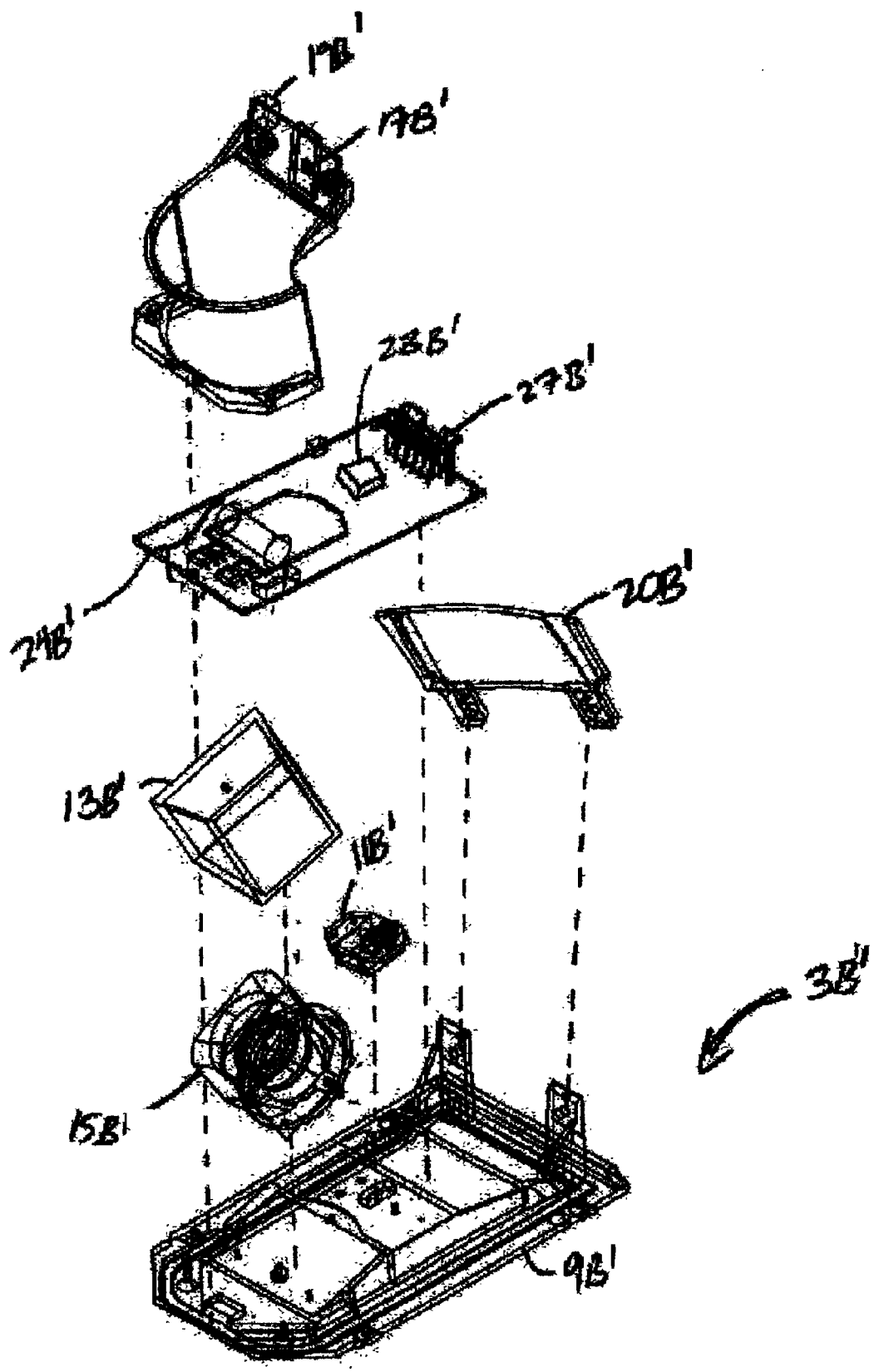
FIG. 1F is an exploded view of a wire-frame model of the components of the second scan module insert 3B' of the illustrative bioptical laser scanning system.
Figure 1G:
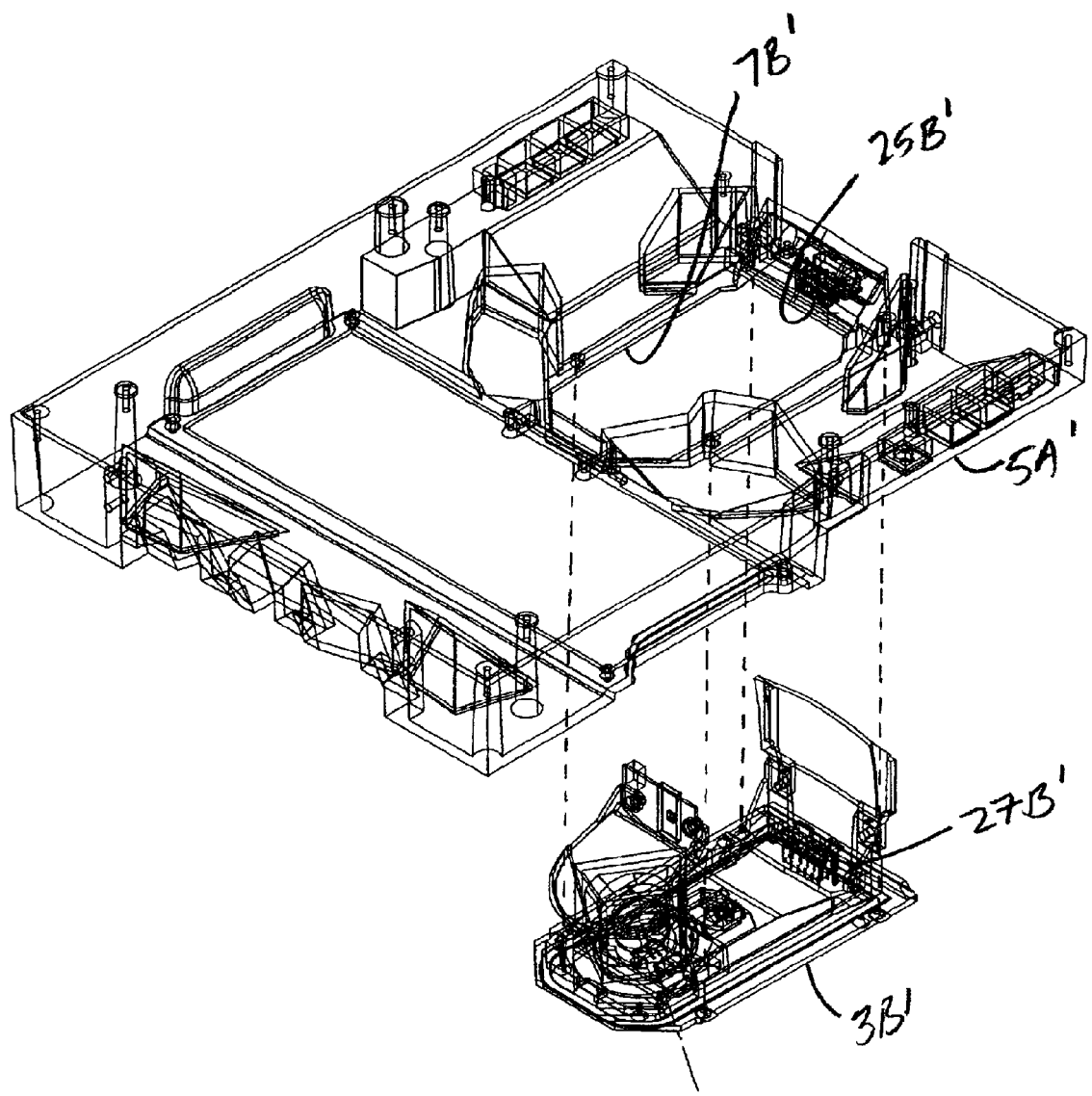
FIG. 1G is an exploded view that illustrates the removable installation of the second scan module insert 3B' through the service port 7B' of the bottom housing portion 5A' of the illustrative bioptical laser scanning system.
Figure 2A:
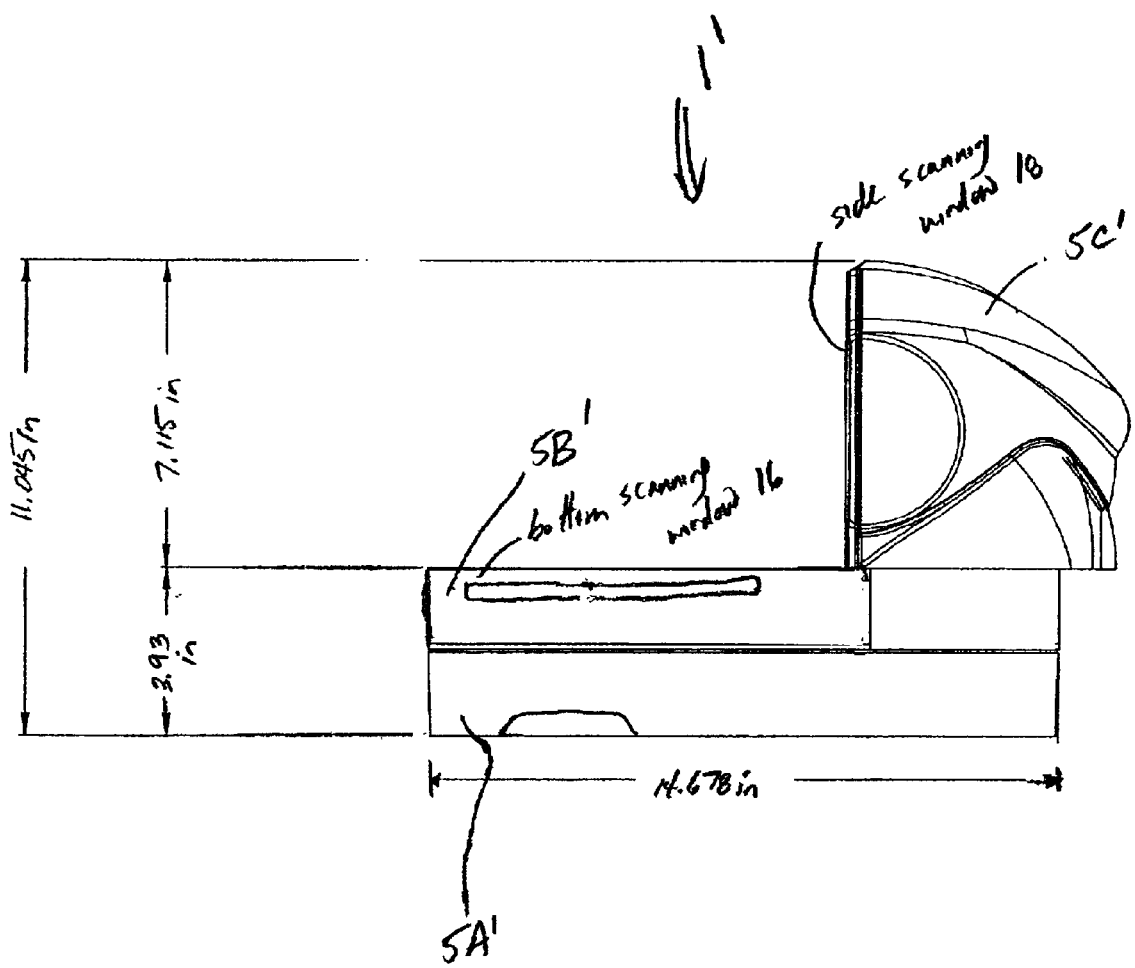
FIG. 2A is a side view of the illustrative bioptical laser scanning system of FIGS. 1B–1G in accordance with the present invention, showing bottom-scanning and side-scanning windows formed with its compact scanner housing.
Figure 2B:
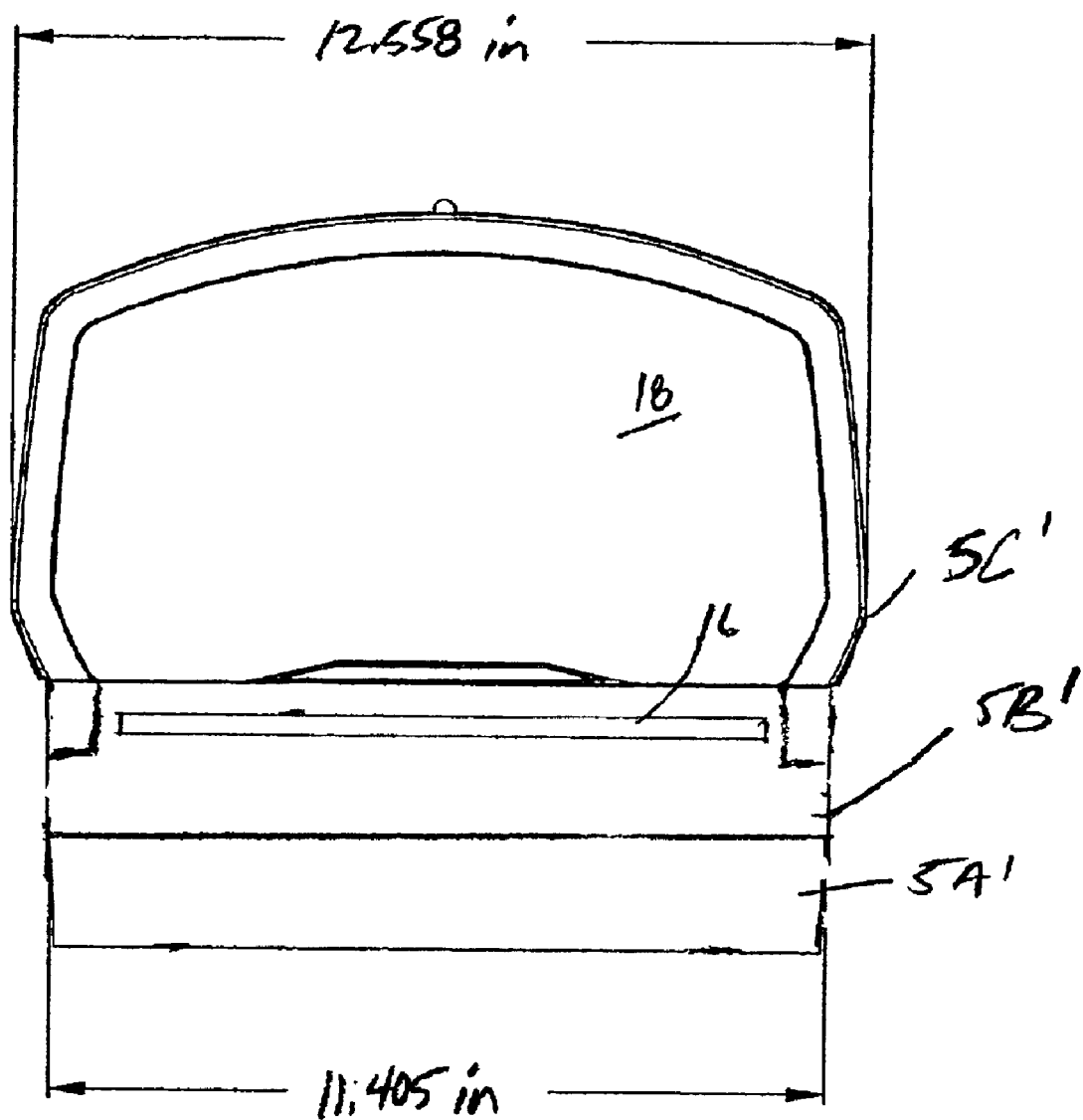
FIG. 2B is a front view of the illustrative bioptical laser scanning system of FIG. 2A.
Figure 2C:
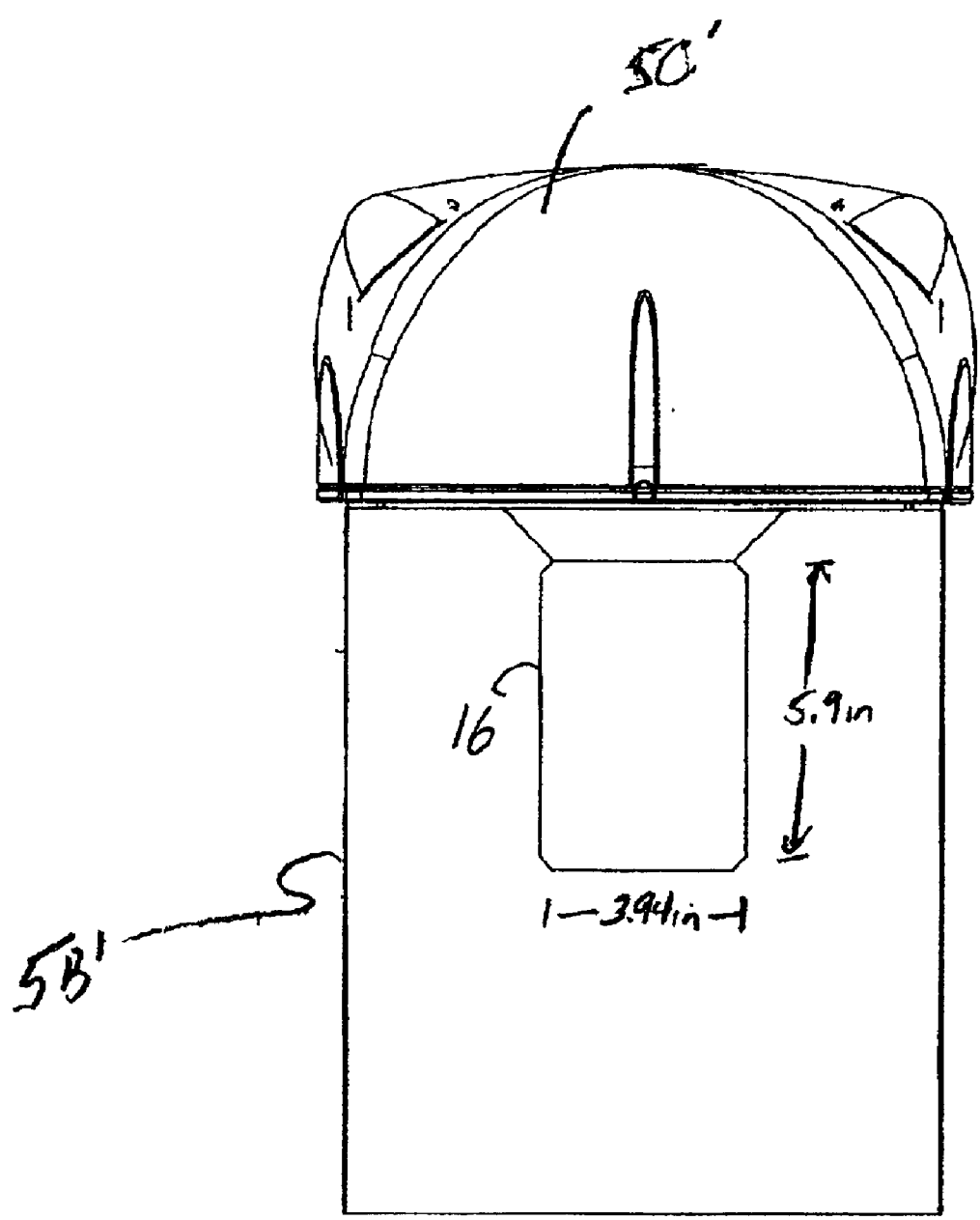
FIG. 2C is a top view of the illustrative bioptical laser scanning system of FIGS. 2A and 2B.
Figure 2D:
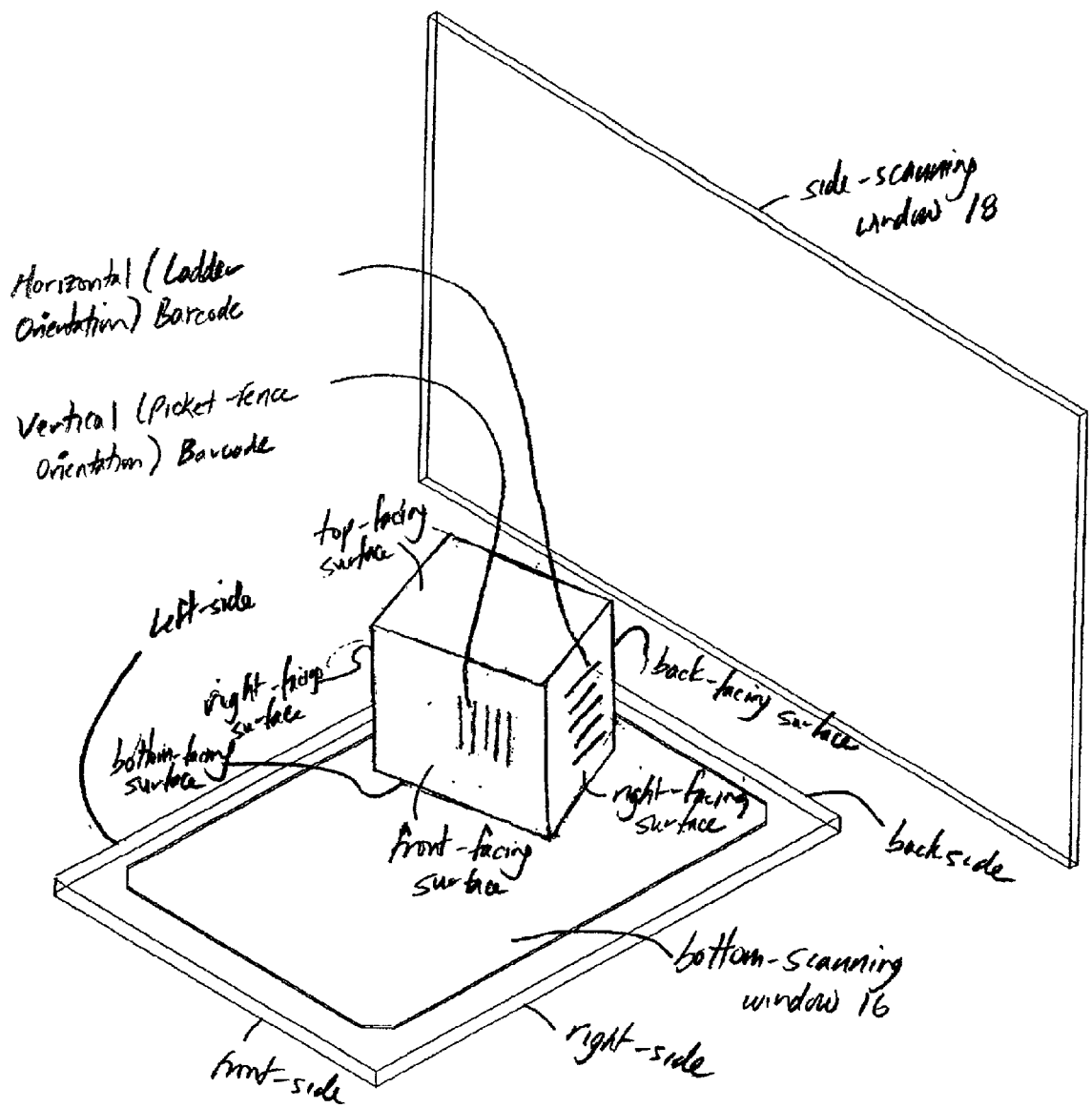
FIG. 2D is a pictorial illustration depicting bottom-facing, top-facing, back-facing, front-facing, left-facing and right-facing surfaces of a rectangular shaped article oriented within the scanning volume (disposed between the bottom-scanning and side-scanning windows) of the illustrative bioptical laser scanning system in accordance with the present invention.
Figure 2F:
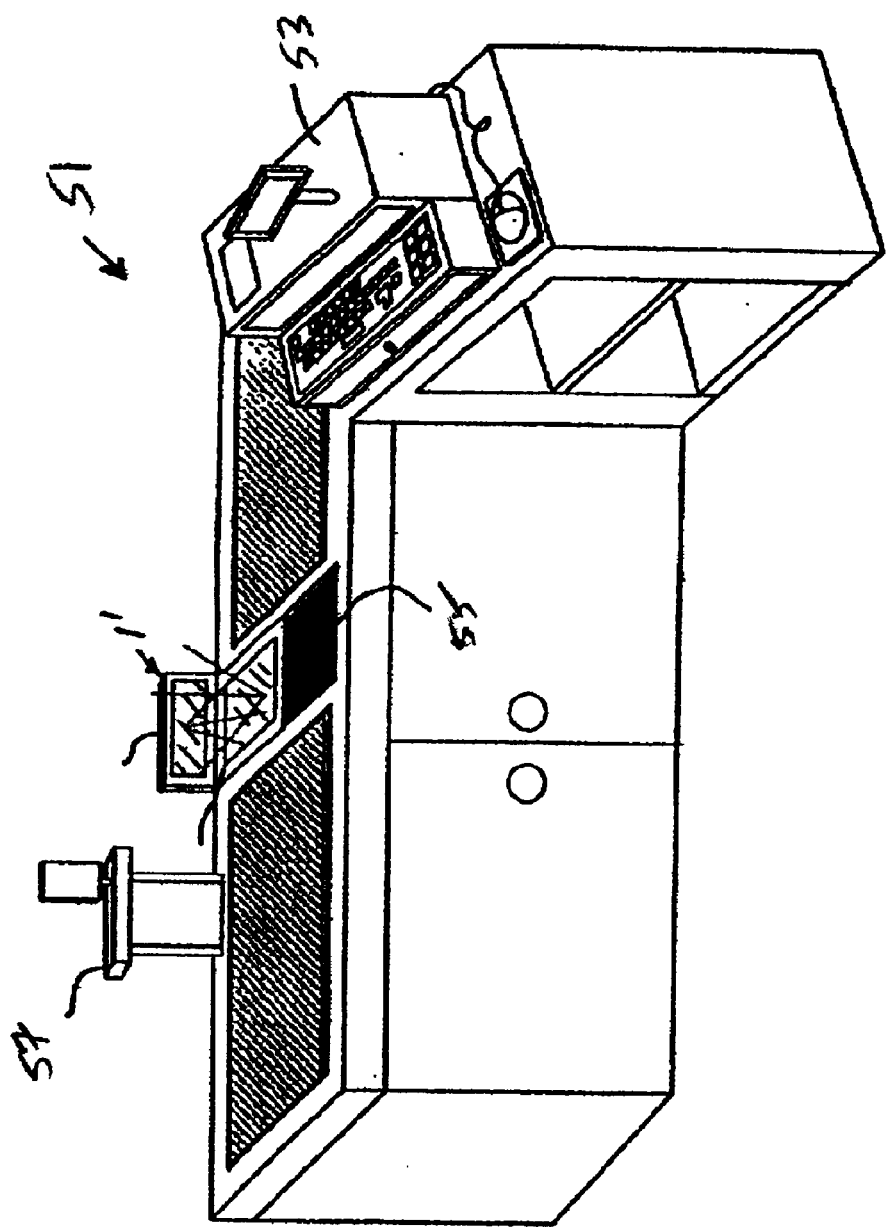
FIG. 2F is a perspective view of the illustrative bioptical laser scanning system according to the present invention shown installed in a Point-Of-Sale (POS) retail environment.
Figure 26:
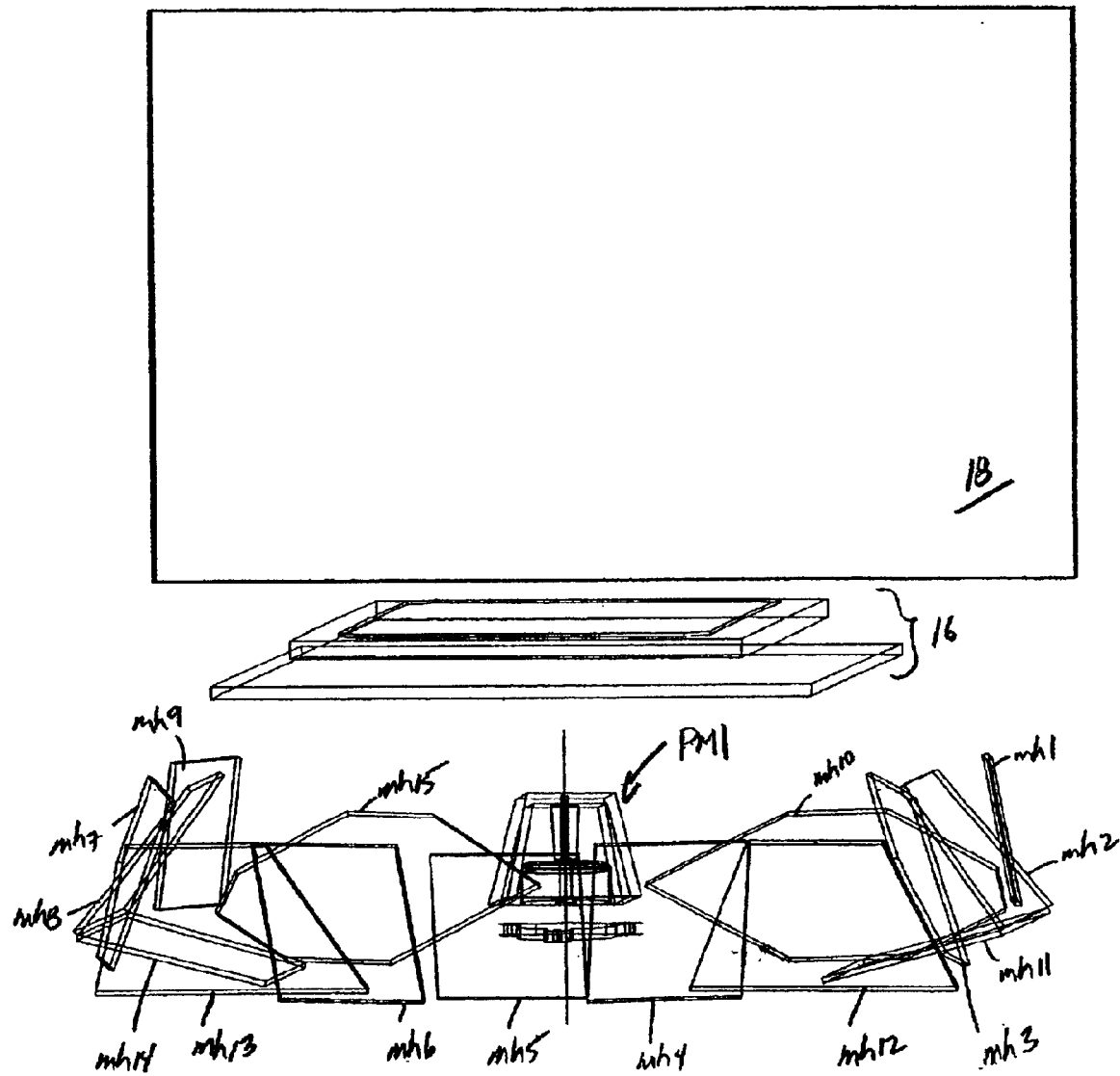
Figure 2H:
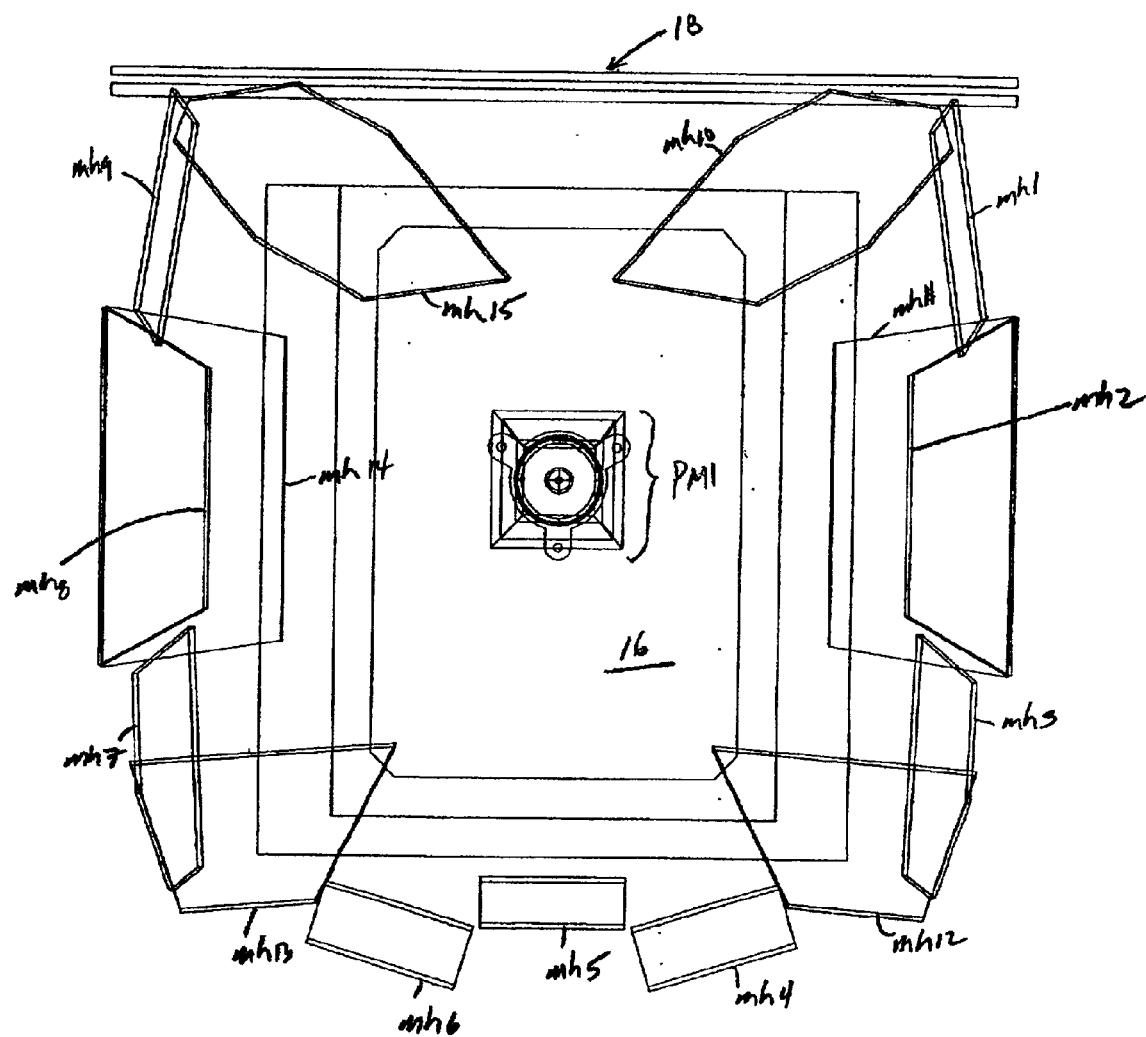
FIG. 2H is a top view of the wire frame model of FIG. 2G.

FIG. 1D is a partially exploded view of the components of the first scan module insert 3A'. FIG. 1E is an exploded view that illustrates the removable installation of the first scan module insert 3A' through the service port 7A' of the bottom housing portion 5A'. As shown in FIGS. 1D and 1E, the first scan module insert 3A' is a self-contained unit that includes the following components (in addition to mechanical support structures for such components) mounted on a rigid substrate/optical bench 9A':

i) two visible laser diodes (part of laser beam production modules 11A1' and 11A2' as shown) that produce visible laser light during scanning operations; such laser beam production modules 11A1' and 11A2' are part of the first and second laser scanning stations HST1 and HST2 as described below.

ii) a rotating polygonal mirror 13A' (which is referred to below as PM1, which is part of the HST1 and HST2) that redirects the two laser scanning beams incident thereon (which are produced by laser beam production modules 11A1' and 11A2', respectively) to produce two scanning laser beams during scanning operations;

iii) a DC electric motor 15A' that rotates the rotating polygonal mirror 13A' during scanning operations;

iv) two photodetectors 17A1' and 17A2' (which are referred to below as $PD_{HST1}$ and $PD_{HST2}$) that detect light incident thereon and produce an electrical signal whose amplitude is proportional to the intensity of such detected light during scanning operations;

v) analog signal processing circuitry 19A1' and 19A2' that conditions (e.g., amplifies and/or filters out unwanted noise in) the electrical signal produced by the corresponding photodetectors 17A1' and 17A2' during scanning operations;

vi) light collecting optical elements 20A1' and 20A2' (e.g., mirror structures) that collect returning light from the two scanning beams (i.e., light from the scanning beam which has been reflected and/or scattered by a bar code label being read) and focus such returning light onto the two photodetectors 17A1' and 17A2', respectively, during scanning operations; the light collecting optical element 20A1' is referred to below as $LC_{HST1}$, while the light collecting optical element 20A2' is referred to below as $LC_{HST2}$;

vii) beam folding mirrors 22A1' and 22A2' that redirect the scanning laser beams (produced by the rotating polygonal mirror 13A') through the bottom scanning window 16 in the top housing portion 5B' during scanning operations such that the scanning laser beam scans a scanning region external thereto; in addition, the beam folding mirrors 22A1' and 22A2' redirect the returning light back toward the rotating polygonal element 13A' from which it originated (where it is redirected to the light collection optical elements 20A1" and 20A2' for collection and focusing on the corresponding photodetectors 17A1' and 17A2'); the beam folding mirror 22A1' comprises mirrors mh2 and mh11 as best shown in FIG. 2H and described below in more detail, whereas the beam folding mirror 22A2' comprises mirrors mh8 and mh14 as best shown in FIG. 2H and described below in more detail;

xviii) laser drive circuitry 23A1', 23A2' that supplies current to the laser diodes of the laser beam production modules 11A1', 11A2', and controls the output optical power levels of the laser diodes; and ix) motor drive circuitry 24A' that supplies power to the motor 15A'.

Optional components that may be contained in the scan module insert 3' in alternative embodiments include the following:

x) additional beam folding mirrors (e.g., one or more of the beam folding mirrors best shown in FIG. 2H and described below in detail) that redirect the scanning laser beams (produced by the rotating polygonal mirror 13A') through the bottom scanning window 16 in the top housing portion 5B' during scanning operations such that the scanning laser beam scans a scanning region external thereto. In addition, such beam folding mirror(s) redirect the returning light back toward the rotating polygonal element 13A' from which it originated (where it is redirected to the light collection optical elements 20A1" and 20A2' for collection and focusing on the corresponding photodetectors 17A1' and 17A2').

xi) analog-to-digital signal conversion circuitry that converts the analog electric signals produced by the analog signal processing circuitry 19A1', 19A2' (or electrical signals derived there from) into digital data signals;

xii) bar code symbol detection circuitry (analog and/or digital circuitry) that forms a digitized representation (e.g., a sequence of binary bit values) of a bar code label being read from signals derived from the output of the analog signal processing circuitry 19A1', 19A2';

xiii) bar code digitization circuitry (digital circuitry) that converts the digitized representation of the bar code symbol being read into a corresponding digital word value;

xiv) bar code symbol decode circuitry (digital circuitry) that decodes the digital word value of the bar code label symbol being read to generate character data string values associated therewith;

xv) interface circuitry for formatting the digitized representation or digital word value of the bar code label symbol into a specific output format (i.e., undecoded or wand emulation format);

xvi) interface circuitry for converting the character data string values of a bar code label into a format suitable for transmission of a communication link to an external host system (e.g., POS system);

xvii) circuitry for communicating the character data string values over a communication link to an external host system;

xviii) circuitry for storing the character data string values in persistent memory for subsequent communication to an external host system;

xix) a system controller that performs system control operations; and/or xx) power supply circuitry, operably coupled to an external power supply (such as an AC outlet) or internal power supply (such as a battery), that provides a regulated supply of electrical power to electrical components of the scanning system.

The details of many of the optional circuit elements set forth above are described below with respect to the system block diagram of FIG. 7.

In the illustrative bioptical scanner, a first electrical interconnect 25A' (e.g., first connector) as best shown in FIG. 1E is integral to the bottom housing portion 5A' and is operably coupled to electric components integral to the housing 5' (for example, bar code symbol detection circuitry, power supply circuitry, system controller as described herein). A second electrical interconnect 27A' (e.g., second connector) as best shown in FIGS. 1D and 1E is integral to the first scan module insert 3A' and is operably coupled to electrical components integral to the first scan module insert 3A' (e.g., laser diode(s), electric motor, analog processing circuitry, laser drive circuitry, motor control circuitry). The first and second electrical interconnects 25A', 27A' are releasably coupled together to provide electric connection between the electrical components operably coupled thereto. Preferably, the first electrical interconnect 25A' (e.g., first connector) and second electrical interconnect 27A' (e.g., second connector) are fixably mounted to the bottom housing portion 5A' and first scan module insert 3A', respectively, in a manner that provides for spatial registration and electrical connection between the two interconnects when the first scan module insert 3A' is mated to bottom housing portion 5A'. Alternatively, either one (or both) of the first electrical interconnect 25A' and second electrical interconnect 27A' may be flexibly mounted (for example, via a ribbon cable or other cable means) to the bottom housing portion 5A' and the first scan module insert 3A', respectively, to provide for flexible electrical connection between the bottom housing portion 5A' and the first scan module insert 3A'. In alternate configurations, multiple electrical connector pairs may be used to operably couple the electric components integral to the multi-part system housing 5' to the electrical components integral to the first scan module insert 3A'.

Moreover, in the illustrative bioptical scanner, the bottom housing portion 5A' and the first scan module insert 3A' have an interlocking flange structure with screw holes, posts and screws employed therein, as best shown in FIG. 1C1, to thereby enable the first scan module insert 3A' to be fixably mated (and unmated) to the bottom housing portion 5A' such that the first scan module insert 3A' is disposed within the bottom housing portion 5A' as shown in FIG. 1C2. In addition, this interlocking flange structure enables spatial registration of the optical components mounted within the first scan module insert 3A' (e.g., polygonal mirror 13A', light collecting elements 20A1', 20A2' and beam folding mirrors 22A1' and 22A2') to optical components mounted within the multi-part system housing 5' (e.g., additional beam folding mirrors best shown in FIG. 2H and described below in detail).

As is evident from FIG. 1E, the first scan module insert 3A' is preferably passed through the service port 7A' of the bottom housing portion 5A' and is fixably disposed therein such that the exterior surface of the first scan module insert 3A' is flush with the exterior surface of the bottom housing portion 5A'. Alternate configurations are contemplated. For example, only a part of the first scan module insert 3A' may pass through the service port 7A' of the bottom housing portion 5A' and be fixably disposed therein. In this configuration, part of the first scan module insert 3A' may be disposed outside the bottom housing portion 5A'. In another exemplary configuration, the entire first scan module insert 3A' may pass through the service port 7A' of the bottom housing portion 5A' and be fixably disposed therein such that the first scan module insert 3A' is disposed within the interior space of the system housing 5'. In this case, a removable cove may be used to cover the first scan module insert 3A' such that the exterior surface of the bottom housing portion 5A' is flush.

FIG. 1F is an exploded view of the components of the second scan module insert 3B'. FIG. 1G is an exploded view that illustrates the removable installation of the second can module insert 3B' through the service port 7B' of the bottom housing portion 5A'. As shown in FIGS. 1F and 1G, the second scan module insert 3B' is a self-contained unit that includes the following components (in addition to mechanical support structures for such components) mounted on a rigid substrate/optical bench 9B':

i) a visible laser diode (part of laser beam production modules 11B' as shown) that produce visible laser light during scanning operations; such laser beam production module 11B' is part of the third laser scanning station VST1 as described below.

ii) a rotating polygonal mirror 13B' (which is referred to below as PM2, which is part of the VST1) that redirects the laser scanning beam incident thereon (which is produced by laser beam production module 11B') to produce a scanning laser beam during scanning operations;

iii) a DC electric motor 15B' that rotates the rotating polygonal mirror 13B' during scanning operations;

iv) a photodetector 17B' (which is referred to below as $PD_{VST1}$) that detects light incident thereon and produce an electrical signal whose amplitude is proportional to the intensity of such detected light during scanning operations;

v) analog signal processing circuitry 19B' that conditions (e.g., amplifies and/or filters out unwanted noise in) the electrical signal produced by the photodetector 17B' during scanning operations;

vi) light collecting optical element 20B' (e.g., mirror structure) that collects returning light from the scanning beam (i.e., light from the scanning beam which has been reflected and/or scattered by a bar code label being read) and focus such returning light onto the photodetector 17B' during scanning operations; the light collecting optical element 20B' is referred to below as $LC_{VST1}$;

xvii) laser drive circuitry 23B' that supplies current to the laser diode in laser beam production module 11B' and controls the output optical power levels of the laser diode; and xviii) motor drive circuitry 24B' that supplies power to motor 15B'.

Optional components that may be contained in the scan module insert 3' in alternative embodiments include the following:

ix) beam folding mirrors (e.g., one or more of the beam folding mirrors best shown in FIGS. 2K and 2L and described below in detail) that redirect the scanning laser beam (produced by the rotating polygonal mirror 13B') through the side scanning window 18 in the hood housing portion 5C' during scanning operations such that the scanning laser beam scans a scanning region external thereto. In addition, such beam folding mirror(s) redirect the returning light back toward the rotating polygonal element 13B' from which it originated (where it is redirected to the light collection optical elements 20B' for collection and focusing on the corresponding photodetector 17B').

x) analog-to-digital signal conversion circuitry that converts the analog electric signals produced by the analog signal processing circuitry 19B' (or electrical signals derived there from) into digital data signals;

xi) bar code symbol detection circuitry (analog and/or digital circuitry) that forms a digitized representation (e.g., a sequence of binary bit values) of a bar code label being read from signals derived from the output of the analog signal processing circuitry 19B';

xii) bar code digitization circuitry (digital circuitry) that converts the digitized representation of the bar code symbol being read into a corresponding digital word value;

xiii) bar code symbol decode circuitry (digital circuitry) that decodes the digital word value of the bar code label symbol being read to generate character data string values associated therewith;

xiv) interface circuitry for formatting the digitized representation or digital word value of the bar code label symbol into a specific output format (i.e., undecoded or wand emulation format);

xv) circuitry for communicating the character data string values over a communication link to an external host system;

xvi) circuitry for storing the character data string values in persistent memory for subsequent communication to an external host system;

xvii) a system controller that performs system control operations; and/or xviii) power supply circuitry, operably coupled to an external power supply (such as an AC outlet) or internal power supply (such as a battery), that provides a regulated supply of electrical power to electrical components of the scanning system.

The details of many of the optional circuit elements set forth above are described below with respect to the system block diagram of FIG. 7.

In the illustrative bioptical scanner, an electrical interconnect 25B' (e.g., electrical connector) as best shown in FIG. 1G is integral to the bottom housing portion 5A' and is operably coupled to electric components integral to the housing 5' (for example, bar code symbol detection circuitry, power supply circuitry, system controller as described herein). An electrical interconnect 27B' (e.g., electrical connector) as best shown in FIGS. 1D and 1E is integral to the second scan module insert 3B' and is operably coupled to electrical components integral to the second scan module insert 3B' (e.g., laser diode, electric motor, analog processing circuitry, laser drive circuitry, motor control circuitry).

The electrical interconnects 25B', 27B' are releasably coupled together to provide electric connection between the electrical components operably coupled thereto. Preferably, the electrical interconnect 25B' and electrical interconnect 27B' are fixably mounted to the bottom housing portion 5A' and second scan module insert 3B', respectively, in a manner that provides for spatial registration and electrical connection between the two interconnects when the second scan module insert 3B' is mated to bottom housing portion 5A'. Alternatively, either one (or both) of the electrical interconnect 25B' and 27B' may be flexibly mounted (for example, via a ribbon cable or other cable means) to the bottom housing portion 5A' and the second scan module insert 3B', respectively, to provide for flexible electrical connection between the bottom housing portion 5A' and the second scan module insert 3B'. In alternate configurations, multiple electrical connector pairs may be used to operably couple the electric components integral to the multi-part system housing 5' to the electrical components integral to the second scan module insert 3B'.

Moreover, in the illustrative bioptical scanner, the bottom housing portion 5A' and the second scan module insert 3B' have an interlocking flange structure with screw holes, posts and screws employed therein, analogous to that shown in FIG. 1C1. Such structure enables the second scan module insert 3B' to be fixably mated (and unmated) to the bottom housing portion 5A' such that the second scan module insert 3B' is disposed within the bottom housing portion 5A' as shown in FIG. 1C2. In addition, this interlocking flange structure enables spatial registration of the optical components mounted within the second scan module insert 3B' (e.g., polygonal mirror 13M' and light collecting element 20B') to optical components mounted within the multi-part system housing 5' (e.g., beam folding mirrors best shown in FIGS. 2K and 2L and described below in detail).

As is evident from FIG. 1G, the second scan module insert 3B' is preferably passed through the service port 7B' of the bottom housing portion 5A' and is fixably disposed therein such that the exterior surface of the second scan module insert 3B' is flush with the exterior surface of the bottom housing portion 5A'. Alternate configurations are contemplated. For example, only a part of the second scan module insert 3B' may pass through the service port 7B' of the bottom housing portion 5A' and be fixably disposed therein. In this configuration, part of the second scan module insert 3B' may be disposed outside the bottom housing portion 5A'. In another exemplary configuration, the entire second scan module insert 3B' may pass through the service port 7B' of the bottom housing portion 5A' and be fixably disposed therein such that the second scan module insert 3B' is disposed within the interior space of the system housing 5'. In this case, a removable cove may be used to cover the second scan module insert 3B' such that the exterior surface of the bottom housing portion 5A' is flush.

As shown in FIGS. 2A–2C, the bottom housing portion 5A' and top housing portion 5B' together (which includes the bottom scanning window 16) have width, length and height dimensions of approximately 11.405, 14.678 and 3.93 inches, respectively, whereas the hood housing portion 5C' (which includes the side scanning window 18) has width and height dimensions of 12.558 inches and 7.115 inches, respectively. The total height of the scanner housing 5' is approximately 11.044 inches. In addition, the bottom-scanning window 16 has width and length dimensions of approximately 3.94 inches (100 mm) and 5.9 inches (150 mm), respectively, to provide a window with a square area of approximately 15,000 square mm. And, the side-scanning window 18 has width and height dimensions of approximately 9.8 inches (248 mm) and 5.9 inches (150 mm), respectively, to provide a window with a square area of approximately 37,200 square mm. As will be described in greater detail below, the bioptical laser scanning mechanism housed within this housing produces an omnidirectional laser scanning pattern within the three-dimensional volume above the bottom-scanning window 16 and in front of the side-scanning window 18.

The omnidirectional scanning pattern is capable of reading picket-fence type bar code symbols on bottom-facing surfaces (i.e., a surface whose normal is directed toward the bottom-scanning window 16 of the scanner), top-facing surfaces (i.e., a surface whose "flip-normal" is directed toward the bottom-scanning window 16 of the scanner), back-facing surfaces (i.e., a surface whose normal is directed toward the side-scanning window 18 of the scanner), front-facing surfaces (i.e., a surface whose "flip-normal" is directed toward the side-scanning window 18 of the scanner), left-facing surfaces (i.e., a surface whose normal is directed toward or above the left side of the scanner), and right-facing surfaces (i.e., a surface whose normal is directed toward or above the right side of the scanner). A "flip-normal" as used above is a direction co-linear to the normal of a surface yet opposite in direction to this normal as shown in FIG. 2E. An example of such bottom-facing, top-facing, back-facing, front-facing surfaces, left-facing surfaces, and right-facing surfaces of a rectangular shaped article oriented in the scan volume of the bioptical laser scanning system 1' disposed between bottom-scanning and side-scanning windows 16, 18 of the system is illustrated in FIG. 2D.

The illustrative bioptical laser scanning system 1' can be used in a diverse variety of bar code symbol scanning applications. For example, the bioptical laser scanner 1' can be installed within the countertop of a point-of-sale (POS) station as shown in FIG. 2F. In this application, it is advantageous to integrate a weight scale with the laser scanning mechanism. Such a device is described in detail in U.S. patent application Ser. No. 10/045,577, incorporated by reference above in its entirety. As shown in FIG. 2F, the bioptical laser scanner 1' can be installed within the countertop of a point-of-sale (POS) station 51, having a computer-based cash register 53, a weigh-scale 55 mounted within the counter adjacent the laser scanner 1' (or integral to the scanner), and an automated transaction terminal (ATM) 57 supported upon a courtesy stand in a conventional manner.

As shown in FIGS. 2G through 2M, the illustrative bioptical scanning system 1' includes two sections: a first section (sometimes referred to as the horizontal section) disposed within the bottom housing portion 5A' and top housing portion 5B' and a second section (sometimes referred to as the vertical section) substantially disposed within the bottom housing portion 5A' and the hood housing portion 5C'. It should be noted that in the illustrative embodiment, parts of the vertical section are disposed within the back of the bottom housing portion 5A' as will become evident from the figures and accompanying description that follows. Also note that horizontal section includes components mounted on the first scan module insert 3A' as set forth above, while the vertical section includes components mounted on the second scan module insert 3B' as set forth above.

As shown in FIGS. 2G through 2J (and in tables I and II below), the first section includes a first rotating polygonal mirror PM1, and first and second scanning stations (indicated by HST1 and HST2, respectively) disposed thereabout. The first and second laser scanning stations HST1 and HST2 each include a laser beam production module (not shown), a set of laser beam folding mirrors, a light collecting/focusing mirror; and a photodetector. The first and second laser scanning stations HST1 and HST2 are disposed opposite one another about the first rotating polygonal mirror PM1. Each laser scanning station generates a laser scanning beam (shown as SB1 and SB2 in FIGS. 2L and 2M) that is directed to a different point of incidence on the first rotating polygonal mirror PM1. The incident laser beams (produced by the first and second laser scanning stations HST1 and HST2) are reflected by each facet (of the first polygonal mirror PM1) at varying angles as the first polygonal mirror PM1 rotates to produce two scanning beams (SB1 and SB2) whose direction varies over the rotation cycle of the first polygonal mirror PM1. The first and second laser scanning stations HST1 and HST2 include groups of laser beam folder mirrors arranged about the first polygonal mirror PM1 so as to redirect the two scanning beams SB1 and SB2 to thereby generate and project different groups of laser scanning planes through the bottom-scanning window 16 in the top housing portion 5B'.

TABLE I

Mirror Positions - Horizontal Section (mm):

| | Vertex | X | Y | Z |
|---|---|---|---|---|
| mh1 | 1 | 115.25 | 18.87 | 3.06 |
| | 2 | 109.09 | 9.19 | 42.85 |
| | 3 | 99.81 | 69.42 | 40.73 |
| | 4 | 105.97 | 79.10 | 0.94 |
| | 5 | | | |
| | 6 | | | |
| | 7 | | | |
| | 8 | | | |
| mh2 | 1 | 123.91 | −78.90 | 2.61 |
| | 2 | 95.43 | −62.89 | 39.73 |
| | 3 | 95.43 | 3.57 | 39.73 |
| | 4 | 123.91 | 19.57 | 2.61 |
| | 5 | | | |
| | 6 | | | |
| | 7 | | | |
| | 8 | | | |
| mh3 | 1 | 103.74 | −140.29 | 25.40 |
| | 2 | 96.02 | −133.84 | 47.43 |
| | 3 | 99.04 | −68.09 | 37.13 |
| | 4 | 114.48 | −80.98 | −6.92 |
| | 5 | 112.97 | −113.85 | −1.78 |
| | 6 | | | |
| | 7 | | | |
| | 8 | | | |
| mh4 | 1 | 62.08 | −136.87 | −11.25 |
| | 2 | 66.99 | −152.92 | 31.34 |
| | 3 | 26.71 | −165.23 | 31.34 |
| | 4 | 21.80 | −149.19 | −11.25 |
| | 5 | | | |
| | 6 | | | |
| | 7 | | | |
| | 8 | | | |
| mh5 | 1 | −20.00 | −135.31 | −11.19 |
| | 2 | −20.00 | −148.24 | 27.91 |
| | 3 | 20.00 | −148.24 | 27.91 |
| | 4 | 20.00 | −135.31 | −11.19 |
| | 5 | | | |
| | 6 | | | |
| | 7 | | | |
| | 8 | | | |
| mh6 | 1 | −62.08 | −136.87 | −11.25 |
| | 2 | −66.99 | −152.92 | 31.34 |
| | 3 | −26.71 | −165.23 | 31.34 |
| | 4 | −21.80 | −149.19 | −11.25 |
| | 5 | | | |
| | 6 | | | |
| | 7 | | | |
| | 8 | | | |
| mh7 | 1 | −96.02 | −133.84 | 47.43 |
| | 2 | −99.04 | −68.09 | 37.13 |
| | 3 | −114.48 | −80.98 | −6.92 |
| | 4 | −112.97 | −113.85 | −1.78 |
| | 5 | −103.74 | −140.29 | 25.40 |
| | 6 | | | |
| | 7 | | | |
| | 8 | | | |
| mh8 | 1 | −123.91 | −78.90 | 2.61 |
| | 2 | −95.43 | −62.89 | 39.73 |
| | 3 | −95.43 | 3.57 | 39.73 |
| | 4 | −123.91 | 19.57 | 2.61 |
| | 5 | | | |
| | 6 | | | |
| | 7 | | | |
| | 8 | | | |
| mh9 | 1 | −115.25 | 18.87 | 3.06 |
| | 2 | −109.09 | 9.19 | 42.85 |
| | 3 | −99.81 | 69.42 | 40.73 |
| | 4 | −105.97 | 79.10 | 0.94 |
| | 5 | | | |
| | 6 | | | |
| | 7 | | | |
| | 8 | | | |
| mh10 | 1 | 53.69 | 23.10 | −11.94 |
| | 2 | 14.23 | 28.69 | 8.47 |
| | 3 | 47.54 | 67.87 | 24.47 |
| | 4 | 72.59 | 81.43 | 24.47 |
| | 5 | 102.20 | 77.24 | 9.16 |
| | 6 | 106.06 | 65.68 | −1.17 |
| | 7 | 83.67 | 39.33 | −11.94 |
| | 8 | | | |
| mh11 | 1 | 123.91 | −79.28 | 2.61 |
| | 2 | 75.02 | −71.42 | −10.49 |
| | 3 | 75.02 | 11.97 | −10.49 |
| | 4 | 123.91 | 19.83 | 2.61 |
| | 5 | | | |
| | 6 | | | |
| | 7 | | | |
| | 8 | | | |
| mh12 | 1 | 116.06 | −105.01 | −10.87 |
| | 2 | 43.62 | −99.13 | −10.90 |
| | 3 | 65.09 | −142.38 | 30.61 |
| | 4 | 101.96 | −145.37 | 30.63 |
| | 5 | | | |
| | 6 | | | |
| | 7 | | | |
| | 8 | | | |
| mh13 | 1 | −101.96 | −145.37 | 30.63 |
| | 2 | −65.09 | −142.38 | 30.61 |
| | 3 | −43.62 | −99.13 | −10.90 |
| | 4 | −116.06 | −105.01 | −10.87 |
| | 5 | | | |
| | 6 | | | |
| | 7 | | | |
| | 8 | | | |
| mh14 | 1 | −75.02 | 11.97 | −10.49 |
| | 2 | −75.02 | −71.42 | −10.49 |
| | 3 | −123.91 | −79.28 | 2.61 |
| | 4 | −123.91 | 19.83 | 2.61 |
| | 5 | | | |
| | 6 | | | |
| | 7 | | | |
| | 8 | | | |
| mh15 | 1 | −54.15 | 22.24 | −10.80 |
| | 2 | −84.14 | 38.47 | −10.80 |
| | 3 | −106.53 | 64.81 | −0.04 |
| | 4 | −102.66 | 76.38 | 10.30 |
| | 5 | −73.05 | 80.57 | 25.61 |
| | 6 | −48.00 | 67.01 | 25.61 |
| | 7 | −14.70 | 27.83 | 9.60 |
| | 8 | | | |

TABLE II

Scan Line Groups - Horizontal Section

| Group Identifier | Mirrors in Group | Scanning Station/Scan Lines | Type |
|---|---|---|---|
| gh1 | mh1, mh10 | HST1/4 | vertical |
| gh2 | mh2, mh11 | HST1/4 | horizontal |
| gh3 | mh3, mh12 | HST1/4 | vertical |
| gh4 | mh4 | HST1/4 | horizontal |
|  | mh5 | HST1, HST2/8 |  |
|  | mh6 | HST2/4 |  |
| gh5 | mh7, mh13 | HST2/4 | vertical |
| gh6 | mh8, mh14 | HST2/4 | horizontal |
| gh7 | mh9, mh15 | HST2/4 | vertical |

Figure 2I:
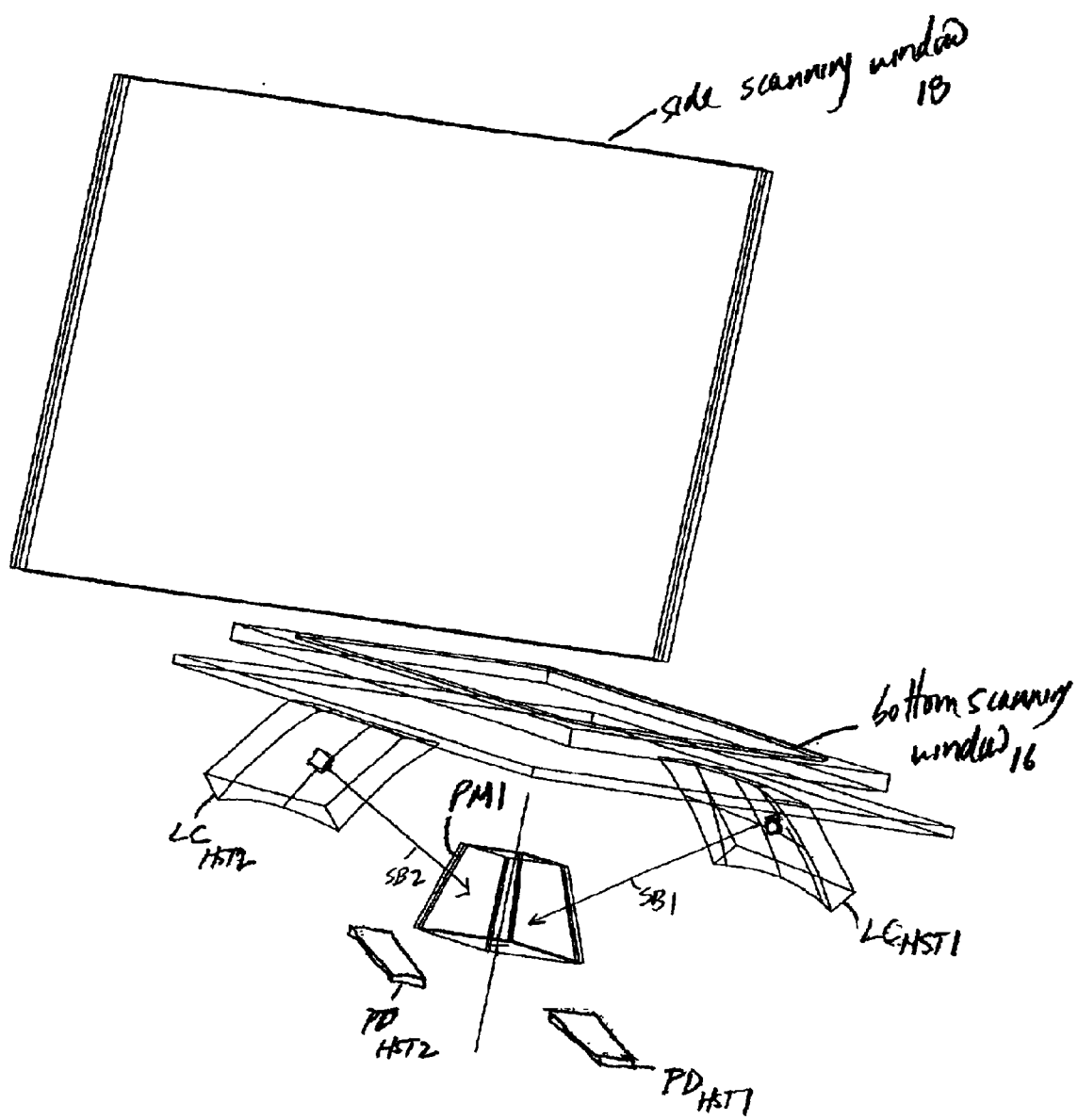
FIG. 2I is a perspective view of a wire frame model of portions of the horizontal section of the illustrative bioptical laser scanning system, including the bottom-scanning window 16 (e.g., horizontal window), first rotating polygonal mirror PM1, and the first and second scanning stations HST1 and HST2 disposed thereabout, wherein each laser scanning station includes a light collecting/focusing optical element (labeled $LC_{HST1}$ and $LC_{HST2}$) that collects light from a scan region that encompasses the outgoing scanning planes and focuses such collected light onto a photodetector (labeled $PD_{HST1}$ and $PD_{HST2}$), which produces an electrical signal whose amplitude is proportional to the intensity of light focused thereon. The electrical signal produced by the photodetector is supplied to analog/digital signal processing circuitry, associated with the first and second laser scanning station HST1 and HST2, that process analog and digital scan data signals derived there from to perform bar code symbol reading operations. Preferably, the first and second laser scanning stations HST1 and HST2 each include a laser beam production module (not shown) that generates a laser scanning beam (labeled SB1 and SB2) that is directed to a small light directing mirror disposed in the interior of the light collecting/focusing element $LC_{HST1}$ and $LC_{HST2}$, respectively, as shown, which redirects the laser scanning beams SB1 and SB2 to corresponding points of incidence on the first rotating polygonal mirror PM1.
Figure 2J:
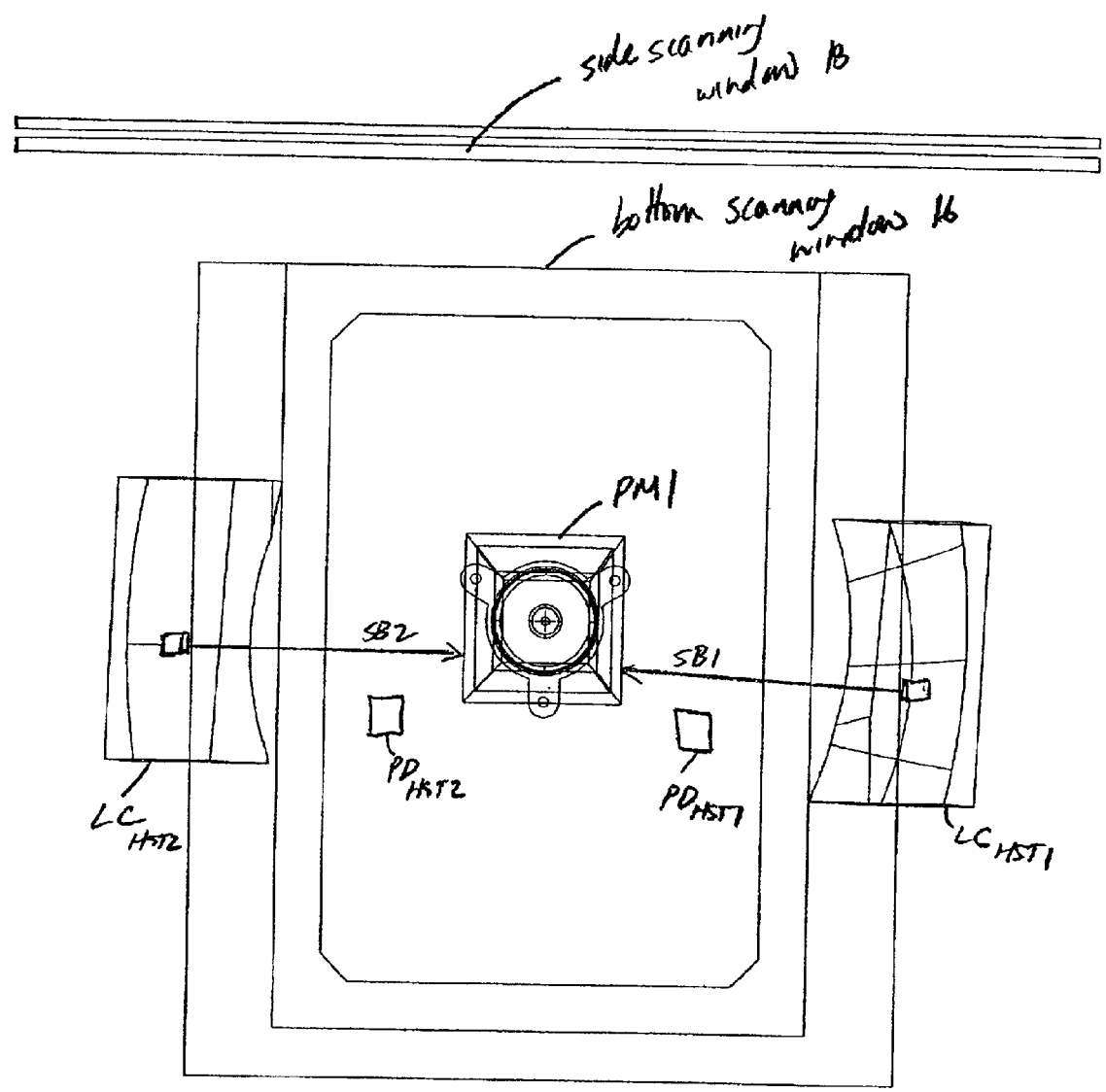
FIG. 2J is a top view of the wire frame model of FIG. 2I.

In addition, as shown in FIGS. 2I and 2J, the first and second laser scanning stations HST1 and HST2 each include a light collecting/focusing optical element, e.g. parabolic light collecting mirror or parabolic surface emulating volume reflection hologram (labeled $LC_{HST1}$ and $LC_{HST2}$), that collects light from a scan region that encompasses the outgoing scanning planes (produced by the first and second laser scanning stations HST1 and HST2) and focuses such collected light onto a photodetector (labeled $PD_{HST1}$ and $PD_{HST2}$), which produces an electrical signal whose amplitude is proportional to the intensity of light focused thereon. The electrical signal produced by the photodetector is supplied to analog/digital signal processing circuitry, associated with the first and second laser scanning station HST1 and HST2, that process analog and digital scan data signals derived there from to perform bar code symbol reading operations as described herein. Preferably, the first and second laser scanning stations HST1 and HST2 each include a laser beam production module (not shown) that generates a laser scanning beam (labeled SB1 and SB2) that is directed (preferably by a small light directing mirror disposed in the interior of the light collecting/focusing element $LC_{HST1}$ and $LC_{HST2}$, respectively, as shown in FIGS. 2I and 2J), to a point of incidence on the first rotating polygonal mirror PM1.

Figure 2K:
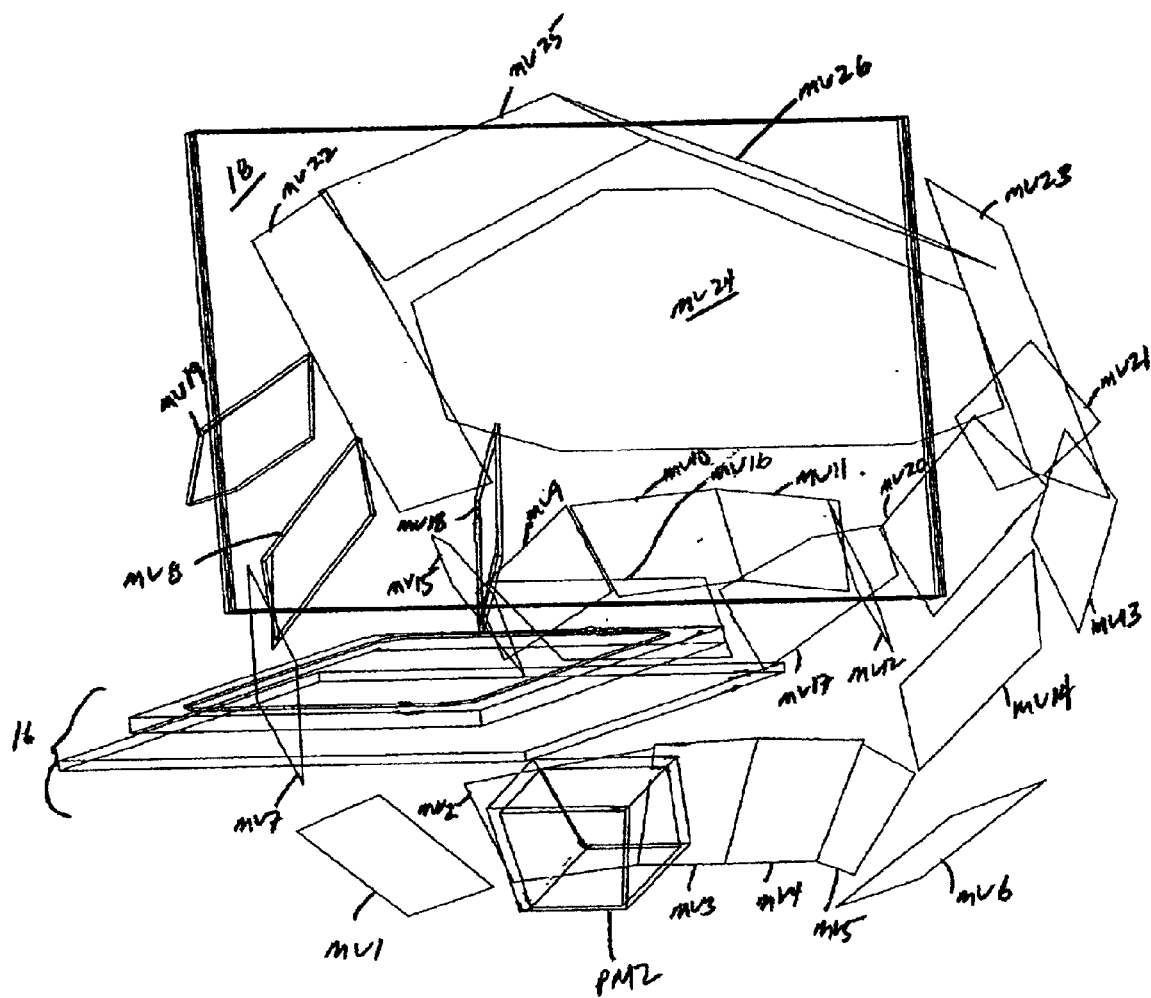
FIG. 2K is a perspective view of a wire frame model of portions of the vertical section of the illustrative bioptical laser scanning system, including the side-scanning window (e.g., vertical window), second rotating polygonal mirror PM2, and the third scanning station VST1 disposed thereabout; the third laser scanning station includes a set of laser beam folding mirrors disposed about the second rotating polygon PM2.
Figure 2L:
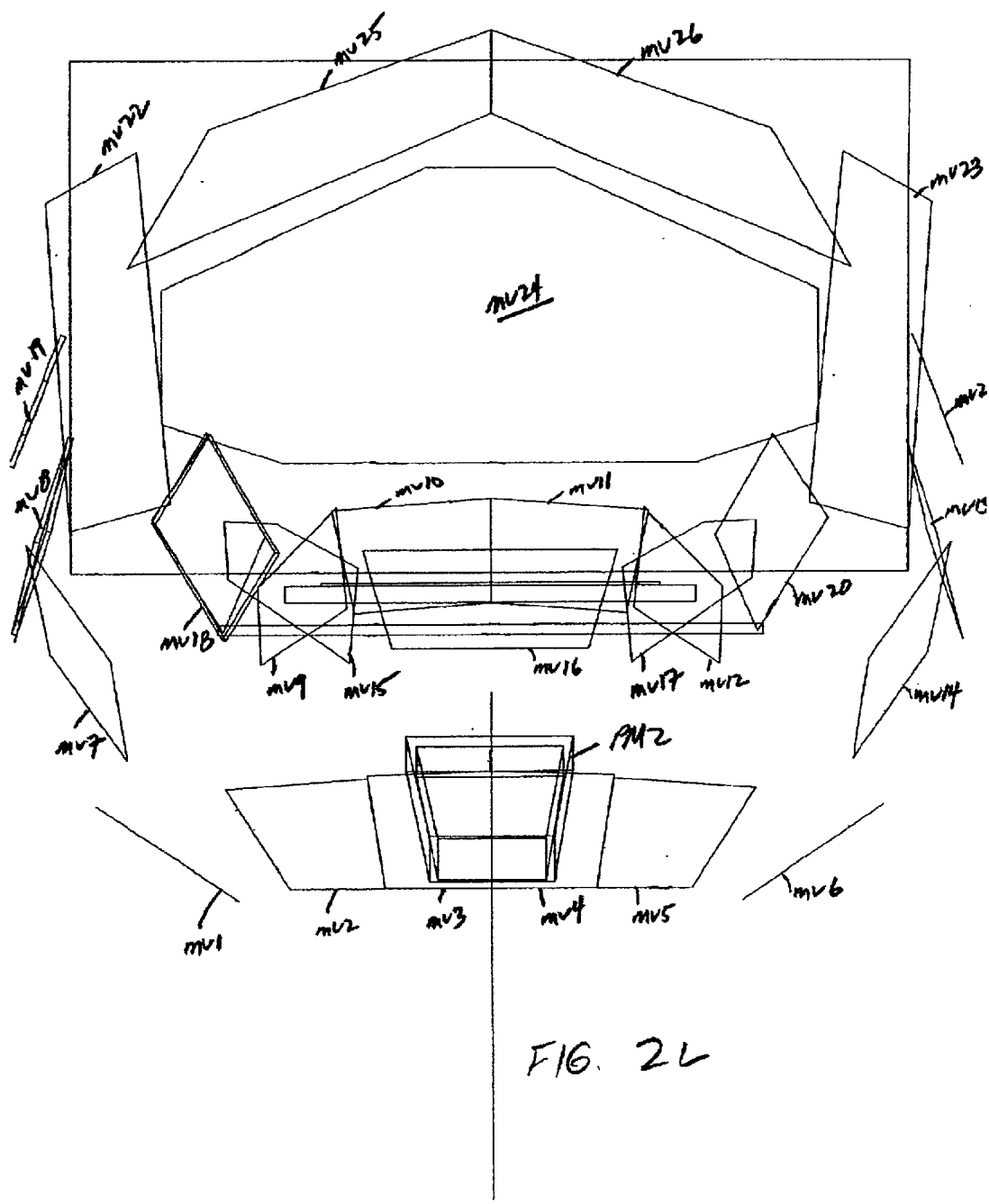
FIG. 2L is a front view of the wire frame model of FIG. 2K.
Figure 20:
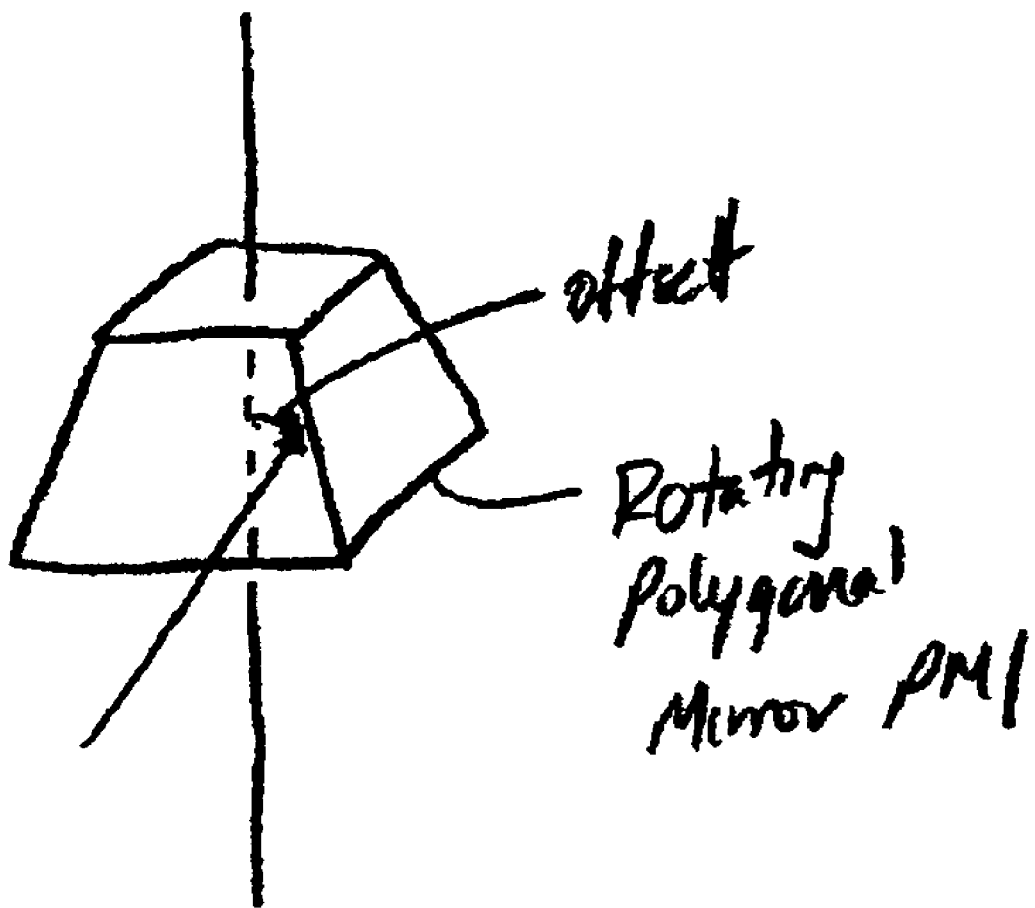

As shown in FIGS. 2K and 2L and in tables III and IV below, the second section includes a second rotating polygonal mirror PM2 and a third scanning station (denoted VST1) that includes a laser beam production module (not shown), a set of laser beam folding mirrors, a light collecting/focusing mirror, and a photodetector. The third laser scanning station VST1 generates a laser scanning beam (labeled as SB3 in FIG. 2M) that is directed to a point of incidence on the second rotating polygonal mirror PM2. The incident laser beam is reflected by each facet (of the second polygonal mirror PM2) at varying angles as the second polygonal mirror PM2 rotates to produce a scanning beam whose direction varies over the rotation cycle of the second polygonal mirror PM2. The third laser scanning station VST1 includes a set of laser beam folder mirrors arranged about the second rotating polygonal mirror PM2 so as to redirect the scanning beam to thereby generate and project different groups of laser scanning planes through the side-scanning window 18.

TABLE III

Mirror Positions - Vertical Section (mm):

| | Vertex | X | Y | Z |
|---|---|---|---|---|
| mv1 | 1 | −74.79 | 88.94 | −10.38 |
| | 2 | −114.09 | 88.94 | 16.17 |
| | 3 | −114.09 | 154.82 | 16.17 |
| | 4 | −74.79 | 154.82 | −10.38 |
| | 5 | | | |
| | 6 | | | |
| | 7 | | | |
| | 8 | | | |
| mv2 | 1 | −61.12 | 131.03 | −6.76 |
| | 2 | −77.92 | 146.42 | 25.78 |
| | 3 | −43.75 | 183.72 | 25.78 |
| | 4 | −33.41 | 174.24 | 5.74 |
| | 5 | −31.44 | 163.43 | −6.76 |
| | 6 | | | |
| | 7 | | | |
| | 8 | | | |
| mv3 | 1 | −29.78 | 160.24 | −1.35 |
| | 2 | −34.38 | 185.43 | 27.65 |
| | 3 | −0.04 | 184.24 | 27.65 |
| | 4 | −0.04 | 159.21 | −1.35 |
| | 5 | | | |
| | 6 | | | |
| | 7 | | | |
| | 8 | | | |
| mv4 | 1 | 0.04 | 159.21 | −1.35 |
| | 2 | 0.04 | 184.24 | 27.65 |
| | 3 | 34.38 | 185.43 | 27.65 |
| | 4 | 29.78 | 160.24 | −1.35 |
| | 5 | | | |
| | 6 | | | |
| | 7 | | | |
| | 8 | | | |
| mv5 | 1 | 61.12 | 131.03 | −6.76 |
| | 2 | 31.44 | 163.43 | −6.76 |
| | 3 | 33.41 | 174.24 | 5.74 |
| | 4 | 43.75 | 183.72 | 25.78 |
| | 5 | 77.92 | 146.42 | 25.78 |
| | 6 | | | |
| | 7 | | | |
| | 8 | | | |
| mv6 | 1 | 74.79 | 88.94 | −10.38 |
| | 2 | 74.79 | 154.82 | −10.38 |
| | 3 | 114.09 | 154.82 | 16.17 |
| | 4 | 114.09 | 88.94 | 16.17 |
| | 5 | | | |
| | 6 | | | |
| | 7 | | | |
| | 8 | | | |
| mv7 | 1 | −107.52 | 89.35 | 30.99 |
| | 2 | −110.94 | 68.34 | 59.03 |
| | 3 | −136.32 | 120.65 | 95.14 |
| | 4 | −132.90 | 141.66 | 67.10 |
| | 5 | | | |
| | 6 | | | |
| | 7 | | | |
| | 8 | | | |
| mv8 | 1 | −129.50 | 196.36 | 99.91 |
| | 2 | −139.66 | 144.56 | 68.88 |
| | 3 | −133.18 | 126.69 | 96.58 |
| | 4 | −123.02 | 178.48 | 127.62 |
| | 5 | | | |
| | 6 | | | |
| | 7 | | | |
| | 8 | | | |
| mv9 | 1 | −42.26 | 185.73 | 73.40 |
| | 2 | −65.99 | 163.92 | 49.03 |
| | 3 | −69.45 | 141.18 | 82.25 |
| | 4 | −45.72 | 162.99 | 106.62 |
| | 5 | | | |
| | 6 | | | |
| | 7 | | | |
| | 8 | | | |
| mv10 | 1 | 0.00 | 190.18 | 78.00 |
| | 2 | −40.33 | 183.35 | 74.96 |
| | 3 | −46.98 | 168.27 | 105.79 |

TABLE III-continued

Mirror Positions - Vertical Section (mm):

| | Vertex | X | Y | Z |
|---|---|---|---|---|
| | 4 | 0.00 | 176.23 | 109.33 |
| | 5 | | | |
| | 6 | | | |
| | 7 | | | |
| | 8 | | | |
| mv11 | 1 | 0.00 | 176.23 | 109.33 |
| | 2 | 46.98 | 168.27 | 105.79 |
| | 3 | 40.33 | 183.35 | 74.96 |
| | 4 | 0.00 | 190.18 | 78.00 |
| | 5 | | | |
| | 6 | | | |
| | 7 | | | |
| | 8 | | | |
| mv12 | 1 | 42.26 | 185.73 | 73.40 |
| | 2 | 45.72 | 162.99 | 106.62 |
| | 3 | 69.45 | 141.18 | 82.25 |
| | 4 | 65.99 | 163.92 | 49.03 |
| | 5 | | | |
| | 6 | | | |
| | 7 | | | |
| | 8 | | | |
| mv13 | 1 | 139.66 | 144.56 | 68.88 |
| | 2 | 129.50 | 196.36 | 99.91 |
| | 3 | 123.02 | 178.48 | 127.62 |
| | 4 | 133.18 | 126.69 | 96.58 |
| | 5 | | | |
| | 6 | | | |
| | 7 | | | |
| | 8 | | | |
| mv14 | 1 | 132.90 | 141.66 | 67.10 |
| | 2 | 136.32 | 120.65 | 95.14 |
| | 3 | 110.94 | 68.34 | 59.03 |
| | 4 | 107.52 | 89.35 | 30.99 |
| | 5 | | | |
| | 6 | | | |
| | 7 | | | |
| | 8 | | | |
| mv15 | 1 | −59.72 | 111.27 | 102.01 |
| | 2 | −38.96 | 95.77 | 87.32 |
| | 3 | −42.25 | 116.98 | 60.28 |
| | 4 | −79.46 | 144.76 | 86.61 |
| | 5 | −77.49 | 132.11 | 102.74 |
| | 6 | | | |
| | 7 | | | |
| | 8 | | | |
| mv16 | 1 | 37.73 | 88.59 | 93.83 |
| | 2 | 29.22 | 119.90 | 64.12 |
| | 3 | −29.22 | 119.90 | 64.12 |
| | 4 | −37.73 | 88.59 | 93.83 |
| | 5 | | | |
| | 6 | | | |
| | 7 | | | |
| | 8 | | | |
| mv17 | 1 | 42.25 | 116.98 | 60.28 |
| | 2 | 38.96 | 95.77 | 87.32 |
| | 3 | 59.72 | 111.27 | 102.01 |
| | 4 | 79.46 | 144.76 | 86.61 |
| | 5 | 42.25 | 116.98 | 60.28 |
| | 6 | | | |
| | 7 | | | |
| | 8 | | | |
| mv18 | 1 | −63.87 | 149.13 | 93.46 |
| | 2 | −79.68 | 162.64 | 67.06 |
| | 3 | −100.06 | 208.14 | 102.55 |
| | 4 | −84.26 | 194.63 | 128.95 |
| | 5 | | | |
| | 6 | | | |
| | 7 | | | |
| | 8 | | | |
| mv19 | 1 | −140.43 | 92.77 | 119.03 |
| | 2 | −140.43 | 126.87 | 119.12 |
| | 3 | −136.72 | 174.44 | 128.44 |
| | 4 | −125.11 | 154.96 | 157.07 |
| | 5 | −130.41 | 87.14 | 143.79 |
| | 6 | | | |
| | 7 | | | |
| | 8 | | | |
| mv20 | 1 | 63.87 | 149.13 | 93.46 |
| | 2 | 79.68 | 162.64 | 67.06 |
| | 3 | 100.06 | 208.14 | 102.55 |
| | 4 | 84.26 | 194.63 | 128.95 |
| | 5 | | | |
| | 6 | | | |
| | 7 | | | |
| | 8 | | | |
| mv21 | 1 | 130.41 | 87.14 | 143.79 |
| | 2 | 125.11 | 154.96 | 157.07 |
| | 3 | 136.72 | 174.44 | 128.44 |
| | 4 | 140.43 | 126.87 | 119.12 |
| | 5 | 140.43 | 92.77 | 119.03 |
| | 6 | | | |
| | 7 | | | |
| | 8 | | | |
| mv22 | 1 | −134.07 | 126.69 | 200.27 |
| | 2 | −103.99 | 134.04 | 208.61 |
| | 3 | −94.62 | 209.63 | 108.20 |
| | 4 | −124.70 | 202.28 | 99.86 |
| | 5 | | | |
| | 6 | | | |
| | 7 | | | |
| | 8 | | | |
| mv23 | 1 | 94.62 | 209.63 | 108.20 |
| | 2 | 103.99 | 134.04 | 208.61 |
| | 3 | 134.07 | 126.69 | 200.27 |
| | 4 | 124.70 | 202.28 | 99.86 |
| | 5 | | | |
| | 6 | | | |
| | 7 | | | |
| | 8 | | | |
| mv24 | 1 | −61.13 | 193.21 | 119.96 |
| | 2 | −97.12 | 187.87 | 131.32 |
| | 3 | −97.12 | 169.38 | 170.59 |
| | 4 | −19.20 | 152.51 | 206.45 |
| | 5 | 19.20 | 152.51 | 206.45 |
| | 6 | 97.12 | 169.38 | 170.59 |
| | 7 | 97.12 | 187.87 | 131.32 |
| | 8 | 61.13 | 193.21 | 119.96 |
| mv25 | 1 | −106.74 | 171.66 | 177.19 |
| | 2 | −83.23 | 85.77 | 217.46 |
| | 3 | 0.00 | 85.77 | 246.33 |
| | 4 | 0.00 | 150.54 | 222.12 |
| | 5 | | | |
| | 6 | | | |
| | 7 | | | |
| | 8 | | | |
| mv26 | 1 | 0.00 | 150.54 | 222.12 |
| | 2 | 0.00 | 150.54 | 222.12 |
| | 3 | 83.23 | 85.77 | 217.46 |
| | 4 | 106.74 | 171.66 | 177.19 |
| | 5 | | | |
| | 6 | | | |
| | 7 | | | |
| | 8 | | | |

TABLE IV

Scan Line Groups - Vertical Section

| Group Identifier | Mirrors in Group | Scanning Station/ Scan Lines | Type |
|---|---|---|---|
| gv1 | mv1, mv22 | VST1/4 | vertical left |
| gv2 | mv2, mv26 | VST1/4 | top-down vertical |
| gv3 | mv3, mv25 | VST1/4 | top-down horizontal |
| gv4 | mv4, mv26 | VST1/4 | top-down horizontal |
| gv5 | mv5, mv25 | VST1/4 | top-down vertical |
| gv6 | mv6, mv23 | VST1/4 | vertical right |

TABLE IV-continued

Scan Line Groups - Vertical Section

| Group Identifier | Mirrors in Group | Scanning Station/ Scan Lines | Type |
|---|---|---|---|
| gv7 | mv7, mv24 | VST1/4 | high horizontal left |
| gv8 | mv8, mv18, mv19 | VST1/4 | side horizontal left |
| gv9 | mv9, mv17, mv24 | VST1/4 | low horizontal left |
| gv10 | mv10, mv16, mv26 | VST1/4 | top-down horizontal |
| gv11 | mv11, mv16, mv25 | VST1/4 | top-down horizontal |
| gv12 | mv12, mv15, mv24 | VST1/4 | low horizontal right |
| gv13 | mv13, mv20, mv21 | VST1/4 | side horizontal right |
| gv14 | mv14, mv24 | VST1/4 | high horizontal right |

In addition, as shown in FIG. 2M, the third laser scanning station VST1 includes a light collecting/focusing optical element, e.g. parabolic light collecting mirror or parabolic surface emulating volume reflection hologram (labeled $LC_{VST1}$), that collects light from a scan region that encompasses the outgoing scanning planes (produced by the third laser scanning station VST1) and focuses such collected light onto a photodetector (labeled $PD_{VST1}$), which produces an electrical signal whose amplitude is proportional to the intensity of light focused thereon. The electrical signal produced by the photodetector is supplied to analog/digital signal processing circuitry, associated with the third laser scanning station VST1, that process analog and digital scan data signals derived there from to perform bar code symbol reading operations as described herein. Preferably, the third laser scanning station VST1 includes a laser beam production module (not shown) that generates a laser scanning beam SB3 that is directed to a small light directing mirror disposed in the interior of the light collecting/focusing element $LC_{VST1}$, which redirects the laser scanning beam SB3 to a point of incidence on the second rotating polygonal mirror PM2.

In the illustrative embodiment, the first polygonal mirror PM1 includes 4 facets that are used in conjunction with the two independent laser beam sources provided by the first and second laser scanning stations HST1 and HST2 so as project from the bottom-scanning window 16 an omnidirectional laser scanning pattern consisting of 40 laser scanning planes that are cyclically generated as the first polygonal mirror PM1 rotates. Moreover, the second polygonal mirror PM2 includes 4 facets that are used in conjunction with the independent laser beam source provided by the third laser scanning station VST1 so as to project from the side-scanning window an omnidirectional laser scanning pattern consisting of 28 laser scanning planes cyclically generated as the second polygonal mirror PM2 rotates. Thus, the bioptical laser scanning system of the illustrative embodiment project from the bottom and side-scanning windows 16, 18 an omnidirectional laser scanning pattern consisting of 68 laser scanning planes cyclically generated as the first and second polygonal mirrors PM1 and PM2 rotate. It is understood, however, these number may vary from embodiment to embodiment of the present invention and thus shall not form a limitation thereof.

FIG. 2N1 depicts the angle of each facet of the rotating polygonal mirrors PM1 and PM2 with respect to the rotational axis of the respective rotating polygonal mirrors in this illustrative embodiment. The scanning ray pattern produced by the four facets (as specified in FIG. 2N1) of the first polygonal mirror PM1 in conjunction with the laser beam source provided by the first laser scanning station HST1 is shown in FIG. 2N2. A similar scanning ray pattern is produced by the four facets of the first polygonal mirror PM1 in conjunction with the laser beam source provided by the second laser scanning station HST2. In the illustrative embodiment of the present invention, the second rotating polygonal mirror PM2 has two different types of facets based on beam elevation angle characteristics of the facet. The scanning ray pattern produced by the four facets of the second polygonal mirror PM2 in conjunction with the laser beam source provided by the third laser scanning station VST1 is shown in FIG. 2N3. The facets of the second polygonal mirror PM2 can be partitioned into two classes: a first class of facets (corresponding to angles $\beta_1$ and $\beta_2$) have High Elevation (HE) angle characteristics, and a second class of facets (corresponding to angles $\beta_3$ and $\beta_4$) have Low Elevation (LE) angle characteristics. As shown in FIG. 2N3, high and low elevation angle characteristics are referenced by the plane P1 that contains the incoming laser beam and is normal to the rotational axis of the second polygonal mirror PM2. Each facet in the first class of facets (having high beam elevation angle characteristics) produces an outgoing laser beam that is directed above the plane P1 as the facet sweeps across the point of incidence of the third laser scanning station VST1. Whereas each facet in the second class of facets (having low beam elevation angle characteristics) produces an outgoing laser beam that is directed below the plane P1 as the facet sweeps across the point of incidence of the third laser scanning station VST1. As will become apparent hereinafter, the use of scanning facets having such diverse elevation angle characteristics enables an efficient design and construction of the second section of the bioptical laser scanning—the plurality of beam folding mirrors used therein can be compactly arranged within a minimized region of volumetric space. Such efficient space saving designs are advantageous in space-constricted POS-type scanning applications.

In the illustrative embodiment of the present invention, the first laser scanning station (HST1) includes four groups of laser beam folding mirrors (GH1, GH2, GH3, and GH4 as depicted in Table II above) which are arranged about the first rotating polygonal mirror PM1, and cooperate with the four scanning facets of the first rotating polygonal mirror PM1 so as to generate and project four different groups of laser scanning planes (with 20 total scanning planes in the four groups) through the bottom-scanning window 16, as graphically illustrated in FIGS. 3A–3F2. Note that the first laser scanning station HST1 utilizes mirrors MH4 and MH5 (and not MH6) of group GH4 to produce 8 different scan planes there from. The second laser scanning station (HST2) includes four groups of laser beam folding mirrors (GH4, GH5, GH6 and GH7 as depicted in Table II) which are arranged about the first rotating polygonal mirror PM1, and cooperate with the four scanning facets of the first rotating polygonal mirror so as to generate and project four different groups of laser scanning planes (with 20 total scanning planes in the four groups) through the bottom-scanning window 16, as graphically illustrated in FIGS. 4A–4F. Note that the second laser scanning station HST2 utilizes mirrors MH5 and MH6 (and not MH4) of group GH4 to produce 8 different scan planes there from. Finally, the third laser scanning station (VST1) includes fourteen groups of laser beam folding mirrors (GV1, GV2 . . . GV14 as depicted in Table IV above) which are arranged about the second rotating polygonal mirror PM2, and cooperate with the four scanning facets of the second rotating polygonal mirror PM2 so as to generate and project fourteen different groups of laser scanning planes (with 28 total scanning planes in the fourteen groups) through the side-scanning window 18, as graphically illustrated in FIGS. 5A–5P2.

For purposes of illustration and conciseness of description, each laser beam folding mirror in each mirror group as depicted in the second column of Tables II and IV, respectively, is referred to in the sequential order that the outgoing laser beam reflects off the mirrors during the laser scanning plane generation process (e.g., the first mirror in the column causes an outgoing laser beam to undergo its first reflection after exiting a facet of the rotating polygonal mirror, the second mirror in the column causes the outgoing laser beam to undergo its second reflection, etc.).

First Laser Scanning Station HST1

As shown in FIGS. 2G, 2H and 3A–3F2, the first laser scanning station (HST1) includes four groups of laser beam folding mirrors (GH1, GH2, GH3 and GH4) which are arranged about the first rotating polygonal mirror PM1, and cooperate with the four scanning facets of the first rotating polygonal mirror PM1 so as to generate and project four different groups of laser scanning planes (with 20 total scanning planes in the four groups) through the bottom-scanning window 16. The intersection of the four groups of laser scanning planes (with 20 total scanning planes in the four groups) on the bottom-scanning window 16 is shown in FIG. 3A. The twenty laser scanning planes (of these four groups projected through the bottom-scanning window 16) can be classified as either vertical scanning planes or horizontal scanning planes, which can be defined as follows.

As shown in FIGS. 3B1 and 3B2, a scanning plane has a characteristic direction of propagation $D_p$ and a normal direction $SP_N$, which define a direction O that is orthogonal thereto (e.g., $O=D_p \times SP_N$). For the sake of description, the characteristic direction of propagation $D_p$ of a scanning plane can be defined as the mean propagation direction for a plurality of rays that make up the scanning plane. A horizontal scanning plane is a scanning plane wherein the angle φ between the direction O and the plane defined by the bottom-scanning window 16 is in the range between 0 and 45 degrees (and preferably in the range between 0 and 20 degrees, and more preferably in the range between 0 and 10 degrees). An exemplary horizontal scanning plane is shown in FIG. 3B1. A vertical scanning plane is a scanning plane wherein the angle φ between the direction O and the plane defined by the bottom-scanning window 16 is in the range between 45 and 90 degrees (and preferably in the range between 70 and 90 degrees, and more preferably in the range between 80 and 90 degrees). An exemplary vertical scanning plane is shown in FIG. 3B2.

FIGS. 3C1 and 3C2 illustrate the first group GH1 of laser beam folding mirrors of the first laser scanning station (HST1), which cooperate with the four scanning facets of the first rotating polygonal mirror PM1 so as to generate four different vertical laser scanning planes that project from the right back corner of the bottom-scanning window 16 diagonally outward and upward above the front left side (and front left corner) of the bottom-scanning window 16 as shown. These scanning planes are useful for reading ladder type bar code symbols disposed on bottom-, back-, and right-facing surfaces.

FIGS. 3D1 and 3D2 illustrate the second group GH2 of laser beam folding mirrors of the first laser scanning station (HST1), which cooperate with the four scanning facets of the first rotating polygonal mirror PM1 so as to generate four different horizontal laser scanning planes that project from the right side of the bottom-scanning window 16 diagonally outward and upward above the left side of the bottom-scanning window 16 as shown. These scanning planes are useful for reading picket-fence type bar code symbols disposed on bottom- and right-facing surfaces.

FIGS. 3E1 and 3E2 illustrate the third group GH3 of laser beam folding mirrors of the first laser scanning station (HST1), which cooperate with the four scanning facets of the first rotating polygonal mirror PM1 so as to generate four different vertical laser scanning planes that project from the right front corner of the bottom-scanning window 16 diagonally outward and upward above the back left side and back left corner of the bottom-scanning window 16 as shown. These scanning planes are useful for reading ladder type bar code symbols disposed on bottom-, front-, and right-facing surfaces.

FIGS. 3F1 and 3F2 illustrate the fourth group GH4 of laser beam folding mirrors of the first laser scanning station (HST1), which cooperate with the four scanning facets of the first rotating polygonal mirror PM1 so as to generate eight different horizontal laser scanning planes that project from the front side of the bottom-scanning window 16 diagonally outward and upward above the back side of the bottom-scanning window 16 as shown. Note that the first laser scanning station HST1 utilizes mirrors MH4 and MH5 (and not MH6) of group GH4 to produce eight different scan planes there from. These scanning planes are useful for reading picket-fence type bar code symbols disposed on bottom- and front-facing surfaces.

The position and orientation of each beam folding mirror employed at scanning station HST1 relative to a global coordinate reference system is specified by a set of position vectors pointing from the from the origin of this global coordinate reference system to the vertices of each such beam folding mirror element (i.e. light reflective surface patch). The x,y,z coordinates of these vertex-specifying vectors as set forth above in Table I specify the perimetrical boundaries of these beam folding mirrors employed in the scanning system of the illustrative embodiment.

Second Laser Scanning Station HST2

As shown in FIGS. 2G, 2H and 4A–4E2, the second laser scanning station (HST2) includes four groups of laser beam folding mirrors (GH4, GH5, GH6, and GH7) which are arranged about the first rotating polygonal mirror PM1, and cooperate with the four scanning facets of the first rotating polygonal mirror PM1 so as to generate and project four different groups of laser scanning planes (with 20 total scanning planes in the four groups) through the bottom-scanning window 16. The intersection of the four groups of laser scanning planes (with 20 total scanning planes in the four groups) on the bottom-scanning window 16 is shown in FIG. 4A. The twenty laser scanning planes (of these four groups projected through the bottom-scanning window 16) can be classified as either vertical scanning planes or horizontal scanning planes as defined above.

FIGS. 4B1 and 4B2 illustrate the first group (GH4) of laser beam folding mirrors of the second laser scanning station (HST2), which cooperate with the four scanning facets of the first rotating polygonal mirror PM1 so as to generate eight different horizontal laser scanning planes that project from the front side of the bottom-scanning window 16 diagonally outward and upward above the back side of the bottom-scanning window 16 as shown. Note that the second laser scanning station HST2 utilizes mirrors MH5 and MH6 (and not MH4) of group GH4 to produce eight different scan planes there from. These scanning planes are useful for reading picket-fence type bar code symbols disposed on bottom- and front-facing surfaces.

FIGS. 4C1 and 4C2 illustrate the second group (GH5) of laser beam folding mirrors of the second laser scanning station (HST2), which cooperate with the four scanning facets of the first rotating polygonal mirror PM1 so as to generate four different vertical laser scanning planes that project from the left front corner of the bottom-scanning window 16 diagonally outward and upward above the back right side and back right corner of the bottom-scanning window 16 as shown. These scanning planes are useful for reading ladder type bar code symbols disposed on bottom-, front-, and left-facing surfaces.

FIGS. 4D1 and 4D2 illustrate the third group (GH6) of laser beam folding mirrors of the second laser scanning station (HST2), which cooperate with the four scanning facets of the first rotating polygonal mirror PM1 so as to generate four different horizontal laser scanning planes that project from the left side of the bottom-scanning window 16 diagonally outward and upward above the right side of the bottom-scanning window 16 as shown. These scanning planes are useful for reading picket-fence type bar code symbols disposed on bottom- and left-facing surfaces.

FIGS. 4E1 and 4E2 illustrate the fourth group (GH7) of laser beam folding mirrors of the second laser scanning station (HST2), which cooperate with the four scanning facets of the first rotating polygonal mirror PM1 so as to generate four different vertical laser scanning planes that project from the left back corner of the bottom-scanning window 16 diagonally outward and upward above the front right side and front right corner of the bottom-scanning window 16 as shown. These scanning planes are useful for reading ladder type bar code symbols disposed on bottom-, back-, and left-facing surfaces.

The position and orientation of each beam folding mirror employed at scanning station HST2 relative to a global coordinate reference system is specified by a set of position vectors pointing from the from the origin of this global coordinate reference system to the vertices of each such beam folding mirror element (i.e. light reflective surface patch). The x,y,z coordinates of these vertex-specifying vectors as set forth above in Table I specify the perimetrical boundaries of these beam folding mirrors employed in the scanning system of the illustrative embodiment.

As shown in FIG. 4F, the vertical scanning planes that project from the bottom-scanning window 16 include 4 groups (namely, GH1, GH3, GH5 and GH7). Groups GH1 and GH5 project from opposing portions (e.g., the back-right and front-left corners of the window 16) of the bottom-scanning window 16, and groups GH3 and GH7 project from opposing portions (e.g., front-right and back-left corners of the window 16) of the bottom-scanning window. Note that groups GH1 and GH5 are substantially co-planar (i.e., quasi co-planar) and groups GH3 and GH7 are substantially co-planar (i.e., quasi co-planar), while groups GH1 and GH5 are substantially orthogonal (i.e., quasi-orthogonal) to groups GH3 and GH7, respectively, as shown.

Third Laser Scanning Station VST1

Figure 5A:
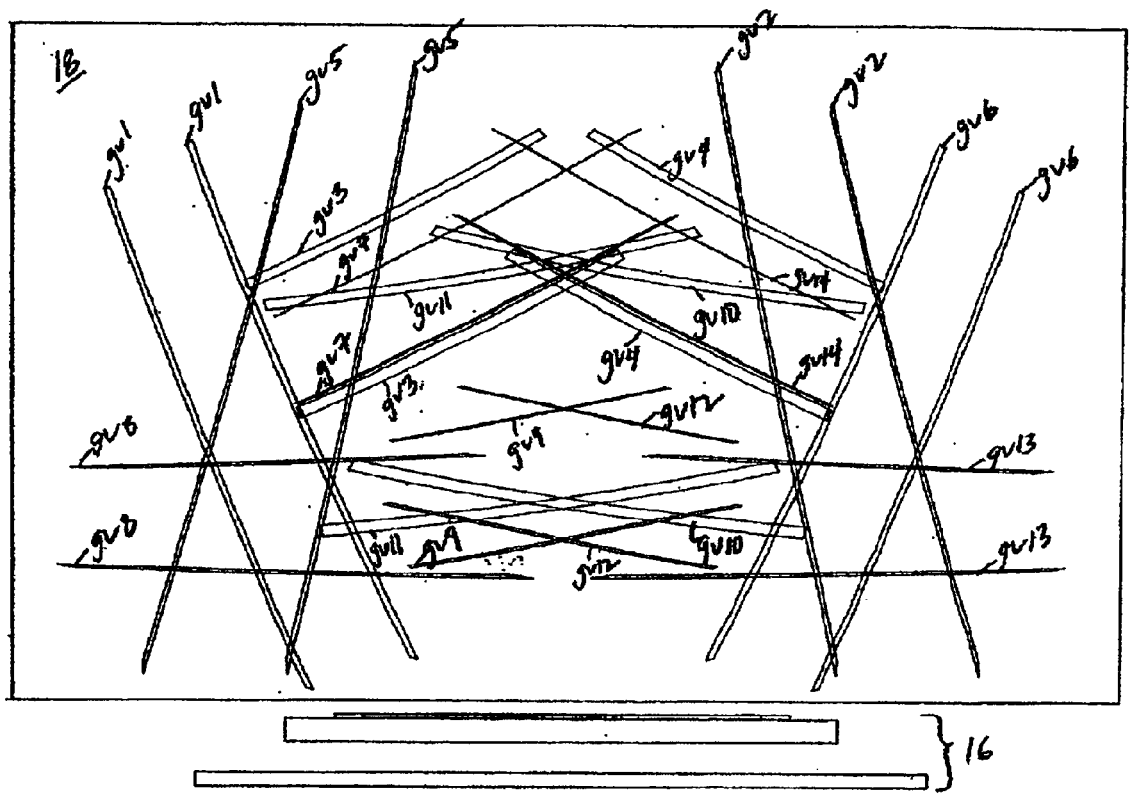
FIG. 5A illustrates the intersection of the fourteen groups of laser scanning planes (with 28 total scanning planes in the fourteen groups) produced by the third laser scanning station VST1 on the side-scanning window 18 of the illustrative bioptical laser scanning system a described herein.
Figure 502:
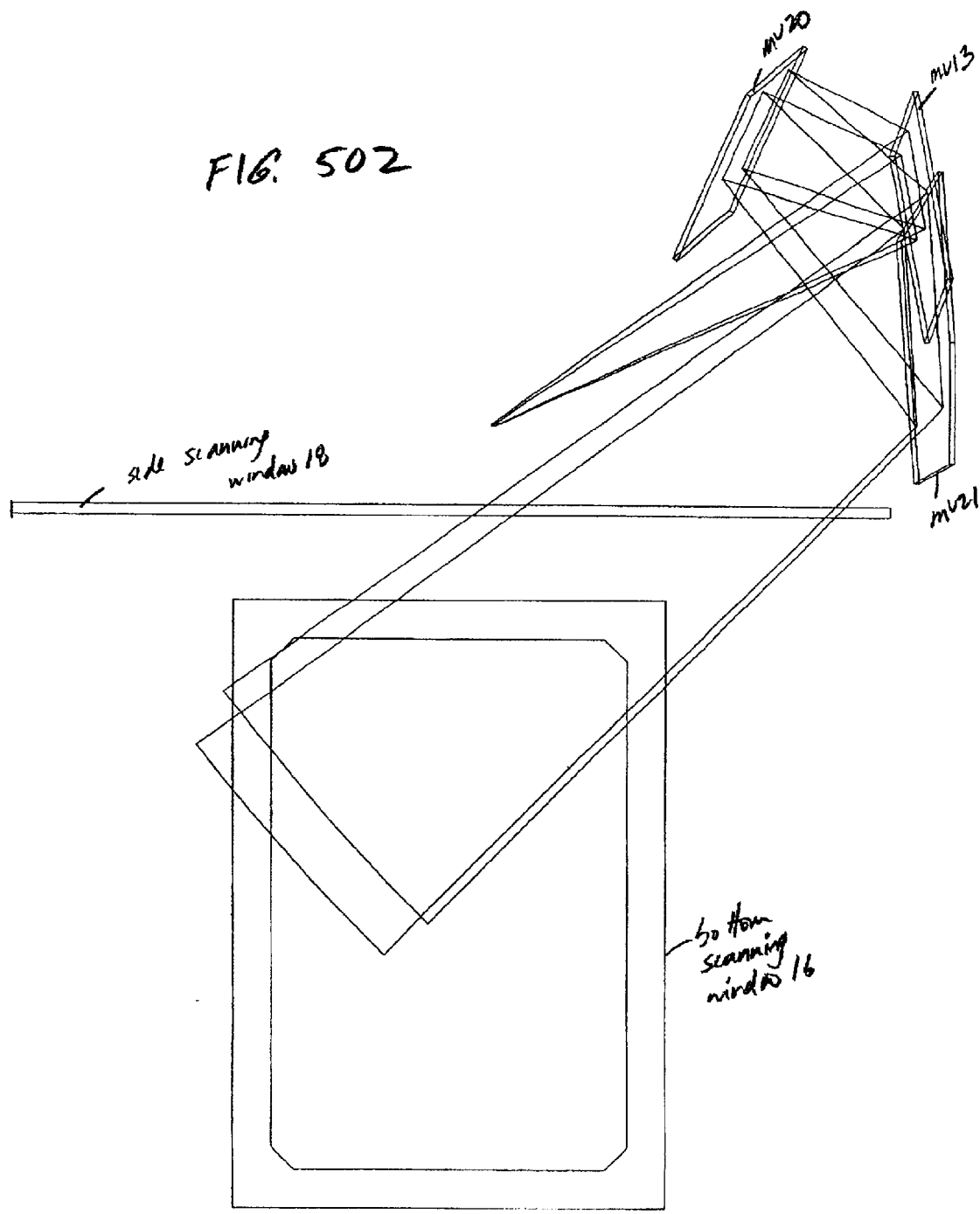

As shown in FIGS. 2K, 2L and 5A–5P2, the third laser scanning station (VST1) includes fourteen groups of laser beam folding mirrors (GV1, GV2, GV3 . . . GV14) which are arranged about the second rotating polygonal mirror PM2, and cooperate with the four scanning facets of the second rotating polygonal mirror PM2 so as to generate and project fourteen different groups of laser scanning planes (with 28 total scanning planes in the fourteen groups) through the side-scanning window 18. The intersection of the fourteen groups of laser scanning planes (with 28 total scanning planes in the fourteen groups) on the side-scanning window 18 is shown in FIG. 5A. The twenty-eight laser scanning planes (of these fourteen groups projected through the side-scanning window 18) can be classified as either vertical scanning planes or horizontal scanning planes, which can be defined as follows.

As shown in FIGS. 5B1 and 5B2, a scanning plane has a characteristic direction of propagation $D_p$ and a normal direction $SP_N$, which define a direction O that is orthogonal thereto (e.g., $O=D_p \times SP_N$). A horizontal scanning plane is a scanning plane wherein the angle $\phi$ between the direction O and the plane defined by the bottom-scanning window 16 is in the range between 0 and 45 degrees (and preferably in the range between 0 and 20 degrees, and more preferably in the range between 0 and 10 degrees). An exemplary horizontal scanning plane projected from the side-scanning window 18 is shown in FIG. 5B1. A vertical scanning plane is a scanning plane wherein the angle $\phi$ between the direction O and the plane defined by the bottom-scanning window 16 is in the range between 45 and 90 degrees (and preferably in the range between 70 and 90 degrees, and more preferably in the range between 80 and 90 degrees). An exemplary vertical scanning plane projected from the side-scanning window 18 is shown in FIG. 5B2.

FIGS. 5C1 and 5C2 illustrate the first group (GV1) of laser beam folding mirrors of the third laser scanning station (VST1), which cooperate with the two low-elevation (LE) scanning facets of the second rotating polygonal mirror PM2 (corresponding to angles $\beta_3$ and $\beta_4$ of the second polygonal mirror PM2 in FIG. 2N1) so as to generate two different vertical laser scanning planes that project from the left side of the side-scanning window 18 diagonally down and out across the bottom-scanning window 16 above the front right corner of the bottom-scanning window 16 as shown. These scanning planes are useful for reading ladder type bar code symbols disposed on left- and back-facing surfaces.

FIGS. 5D1 and 5D2 illustrate the second group (GV2) of laser beam folding mirrors of the third laser scanning station (VST1), which cooperate with the two low-elevation scanning facets of the second rotating polygonal mirror PM2 (corresponding to angles $\beta_3$ and $\beta_4$ of the second polygonal mirror PM2 in FIG. 2N1) so as to generate two different vertical laser scanning planes that project from the top left corner of the side-scanning window 18 downward toward the bottom-scanning window 16 substantially along the left side of the bottom-scanning window 16 as shown. These scanning planes are useful for reading ladder type bar code symbols disposed on top- and back-facing surfaces.

FIGS. 5E1 and 5E2 illustrate the third group (GV3) of laser beam folding mirrors of the third laser scanning station (VST1), which cooperate with the two low-elevation scanning facets of the second rotating polygonal mirror PM2 (corresponding to angles $\beta_3$ and $\beta_4$ of the second polygonal mirror PM2 in FIG. 2N1) so as to generate two different horizontal laser scanning planes that project from the top left quadrant of the side-scanning window 18 diagonally down across the bottom-scanning window 16 as shown. These scanning planes are useful for reading picket-fence type bar code symbols disposed on back- and top-facing surfaces.

FIGS. 5F1 and 5F2 illustrate the fourth group (GV4) of laser beam folding mirrors of the third laser scanning station (VST1), which cooperate with the two low elevation scanning facets of the second rotating polygonal mirror PM2 (corresponding to angles $\beta_3$ and $\beta_4$ of the second polygonal mirror PM2 in FIG. 2N1) so as to generate two different horizontal laser scanning planes that project from the top right quadrant of the side-scanning window 18 diagonally down across the bottom-scanning window 16 as shown. These scanning planes are useful for reading picket-fence type bar code symbols disposed on back- and top-facing surfaces.

FIGS. 5G1 and 5G2 illustrate the fifth group (GV5) of laser beam folding mirrors of the third laser scanning station (VST1), which cooperate with the two low-elevation scanning facets of the second rotating polygonal mirror PM2 (corresponding to angles $\beta_3$ and $\beta_4$ of the second polygonal mirror PM2 in FIG. 2N1) so as to generate two different vertical laser scanning planes that project from the top right corner of the side-scanning window 18 downward toward the bottom-scanning window 16 substantially along the right side of the bottom-scanning window 16 as shown. These scanning planes are useful for reading ladder type bar code symbols disposed on top- and back-facing surfaces.

FIGS. 5H1 and 5H2 illustrate the sixth group (GV6) of laser beam folding mirrors of the third laser scanning station (VST1), which cooperate with the two low elevation scanning facets of the second rotating polygonal mirror PM2 (corresponding to angles $\beta_3$ and $\beta_4$ of the second polygonal mirror PM2 in FIG. 2N1) so as to generate two different vertical laser scanning planes that project from the right side of the side-scanning window 18 diagonally out across the bottom-scanning window 16 above the front left corner of the bottom-scanning window 16 as shown. These scanning planes are useful for reading ladder type bar code symbols disposed on right- and back-facing surfaces.

FIGS. 5I1 and 5I2 illustrate the seventh group (GV7) of laser beam folding mirrors of the third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2N1) so as to generate two different horizontal laser scanning planes that project from the top left quadrant of the side-scanning window 18 outwardly across the bottom-scanning window 16 (substantially parallel to the bottom-scanning window 16) as shown. These scanning planes are useful for reading picket-fence type bar code symbols disposed on back- and left-facing surfaces.

FIGS. 5J1 and 5J2 illustrate the eight group (GV8) of laser beam folding mirrors of the third laser scanning station (VST1), which cooperate with the two high elevation scanning facets of the second rotating polygonal mirror PM2 (corresponding to angles $\beta_3$ and $\beta_2$ of the second polygonal mirror PM2 in FIG. 2N1) so as to generate two different horizontal laser scanning planes that project from the left side of the side-scanning window 18 outwardly across the bottom-scanning window 16 (substantially parallel to the bottom-scanning window 16) as shown. In the illustrative embodiment, the characteristic direction of propagation of such scanning planes has a non-vertical component (i.e., components in the plane parallel to the bottom-scanning window 16) whose orientation relative to the normal of the side-scanning window 18 is greater than 35 degrees. These scanning planes are useful for reading picket-fence type bar code symbols disposed on back- and left-facing surfaces (including those surfaces whose normals are substantially offset from the normal of the side-scanning window).

FIGS. 5K1 and 5K2 illustrate the ninth group (GV9) of laser beam folding mirrors of the is third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2N1) so as to generate two different horizontal laser scanning planes that project from the central portion of the side-scanning window 18 outwardly and downward across the bottom-scanning window 16 as shown. These scanning planes are useful for reading picket-fence type bar code symbols disposed on back-facing surfaces.

FIGS. 5L1 and 5L2 illustrate the tenth group (GV10) of laser beam folding mirrors of the third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2N1) so as to generate two different horizontal laser scanning planes that project from the central portion of the side-scanning window 18 outwardly and sharply downward across the bottom-scanning window 16 as shown. These scanning planes are useful for reading picket-fence type bar code symbols disposed on top- and back-facing surfaces.

FIGS. 5M1 and 5M2 illustrate the eleventh group (GV11) of laser beam folding mirrors of the third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2N1) so as to generate two different horizontal laser scanning planes that project from the central portion of the side-scanning window 18 outwardly and sharply downward across the bottom-scanning window 16 as shown. These scanning planes are useful for reading picket-fence type bar code symbols disposed on top- and back-facing surfaces.

FIGS. 5N1 and 5N2 illustrate the twelfth group (GV12) of laser beam folding mirrors of the third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2N1) so as to generate two different horizontal laser scanning planes that project from the central portion of the side-scanning window 18 outwardly across the bottom-scanning window 16 (substantially parallel to the bottom-scanning window 16) as shown. These scanning planes are useful for reading picket-fence type bar code symbols disposed on back-facing surfaces.

FIGS. 5O1 and 5O2 illustrate the thirteenth group (GV13) of laser beam folding mirrors of the third laser scanning station (VST1), which cooperate with the two high elevation scanning facets of the second rotating polygonal mirror (corresponding to angles $\beta_1$ and $\beta_2$ of the second polygonal mirror PM2 in FIG. 2N1) so as to generate two different horizontal laser scanning planes that project from the right side of the side-scanning window 18 outwardly across the bottom-scanning window 16 (substantially parallel to the bottom-scanning window 16) as shown. In the illustrative embodiment, the characteristic direction of propagation of such scanning planes has a non-vertical component (i.e., components in the plane parallel to the bottom-scanning window 16) whose orientation relative to the normal of the side-scanning window 18 is greater than 35 degrees. These scanning planes are useful for reading picket-fence type bar code symbols disposed on back- and right-facing surfaces (including those surfaces whose normals are substantially offset from the normal of the side-scanning window).

FIGS. 5P1 and 5P2 illustrate the fourteenth group (GV14) of laser beam folding mirrors of the third laser scanning station (VST1), which cooperate with the two high elevation scanning facets of the second rotating polygonal mirror PM2 (corresponding to angles $\beta_1$ and $\beta_2$ of the second polygonal mirror PM2 in FIG. 2N1) so as to generate two different horizontal laser scanning planes that project from the top right quadrant of the side-scanning window 18 outwardly across the bottom-scanning window 16 (substantially parallel to the bottom-scanning window 16) as shown. These scanning planes are useful for reading picket-fence type bar code symbols disposed on back- and right-facing surfaces.

The position and orientation of each beam folding mirror employed at scanning station VST1 relative to a global coordinate reference system is specified by a set of position vectors pointing from the from the origin of this global coordinate reference system to the vertices of each such beam folding mirror element (i.e. light reflective surface patch). The x,y,z coordinates of these vertex-specifying vectors as set forth above in Table III specifies the perimetrical boundaries of these beam folding mirrors employed in the scanning system of the illustrative embodiment.

In the illustrative bioptical laser scanning system, the laser beam folding mirrors associated with scanning stations HST1, HST2 and VST1 are physically supported utilizing one or more mirror support platforms, formed with the scanner housing. Preferably, these mirror mounting support structures, as well as the components of the scanning housing are made from a high-impact plastic using injection molding techniques well known in the art.

In the illustrative bioptical laser scanning system, the principal function of each facet on the first and second rotating polygonal mirrors PM1 and PM2 is to deflect an incident laser beam along a particular path in 3-D space in order to generate a corresponding scanning plane within the 3-D laser scanning volume produced by the laser scanning system hereof. Collectively, the complex of laser scanning planes produced by the plurality of facets in cooperation with the three laser beam production modules of HST1, HST2 and VST1 creates an omnidirectional scanning pattern within the highly-defined 3-D scanning volume of the scanning system between the space occupied by the bottom and side-scanning windows of the system. As shown in the exemplary timing scheme of FIG. 6, the illustrative bioptical laser scanner cyclically generates a complex omnidirectional laser scanning pattern from both the bottom and side-scanning windows 16 and 18 thereof during the revolutions of the scanning polygonal mirrors PM1 and PM2. In this exemplary timing scheme, four sets of scan plane groups (4*[GH1 . . . GH7]) are produced by stations HST1 and HST2 during each revolution of the polygonal mirror PM1. Moreover, two sets of scan plane groups (2*[GV1 . . . GV14]) are produced by station VST1 during a single revolution of the polygonal mirror PM2. The complex omnidirectional scanning pattern is graphically illustrated in FIGS. 3A through 5P2, which consists of 68 different laser scanning planes which cooperate in order to generate a plurality of quasi-orthogonal laser scanning patterns within the 3-D scanning volume of the system, thereby enabling true omnidirectional scanning of bar code symbols.

In each laser scanning station (HST1, HST2, and VST1) of the illustrative embodiment, a laser beam production module produces a laser beam that is directed at the point of incidence on the facets of the first or second rotating polygonal mirrors at the pre-specified angle of incidence. Preferably, such laser beam production modules comprise a visible laser diode (VLD) and possibly an aspheric collimating lens supported within the bore of a housing mounted upon the optical bench of the module housing.

In the illustrative embodiment described above, the pre-specified angle of incidence of the laser beams produced by the laser beam production modules of the laser scanning stations HST1 and HST2 are offset from the rotational axis of the polygonal mirror PM1 along a direction perpendicular to the rotational axis as shown in FIG. 2O. Such offset provides for spatial overlap in the scanning pattern of light beams produced from the polygonal mirror PM1 by these laser beam production modules. In the illustrative embodiment, the offset between the rotational axis of the rotating polygonal mirror PM1 and the incident directions of the scanning beams SB1 and SB2, respectively, is approximately 5 mm. Such spatial overlap can be exploited such that the overlapping rays are incident on at least one common mirror (mh5 in the illustrative embodiment) to provide a dense scanning pattern projecting there from. In the illustrative embodiment, a dense pattern of horizontal planes (groups GH4) is projected from the front side of the bottom window as is graphically depicted in FIGS. 3F1, 3F2 and 4B1 and 4B2.

Light Collection for the 3 Scanning Stations

When a bar code symbol is scanned by any one of the laser scanning planes projected from the bottom-scanning window 16 (by either the first or second laser scanning stations HST1, HST2), or by any one of the laser scanning planes projected from the side-scanning window 18 by the third laser scanning station VST1, the incident laser light scanned across the object is intensity modulated by the absorptive properties of the scanned object and scattered according to Lambert's Law (for diffuse reflective surfaces). A portion of this laser light is reflected back along the outgoing ray (optical) path, off the same group of beam folding mirrors employed during the corresponding laser beam generation process, and thereafter is incident on the same scanning facet (of the first or second rotating polygonal mirror) that generated the corresponding scanning plane only a short time before. The scanning facet directs the returning reflected laser light towards a light collecting optical element (e.g., parabolic mirror structure) of the respective -laser scanning station, which collects the returning light and focuses these collected light rays onto a photodetector, which may be disposed on a planar surface beneath the respective scanning polygon (as shown in FIGS. 2I and 2J), or which may be disposed on a planar surface above the respective scanning polygon (as shown in FIG. 2M). FIGS. 2I and 2J depict the light collection optical elements $LC_{HST1}$ and $LC_{HST2}$, e.g., parabolic mirrors, and photodetectors $PD_{HST1}$ and $PD_{HST2}$ for the two laser scanning stations HST1 and HST2, respectively. FIG. 2M depicts the light collection optical elements $LC_{VST1}$, e.g., parabolic mirror, and photodetector $PD_{VST1}$ for the third laser scanning station VST1. The electrical signal produced by the photodetector for the respective laser scanning stations is supplied to analog/digital signal processing circuitry, associated with the respective laser scanning stations, that process analog and digital scan data signals derived there from to perform bar code symbol reading operations as described herein.

The bottom and side-scanning windows 16 and 18 have light transmission apertures of substantially planar extent. In order to seal off the optical components of the scanning system from dust, moisture and the like, the scanning windows 16 and 18, are preferably fabricated from a high impact plastic material and installed over their corresponding light transmission apertures using a rubber gasket and conventional mounting techniques. In the illustrative embodiment, each scanning window 16 and 18 preferably has spectrally-selective light transmission characteristics which, in conjunction with a spectrally-selective filters installed before each photodetector within the housing, forms a narrow-band spectral filtering subsystem that performs two different functions. The first function of the narrow-band spectral filtering subsystem is to transmit only the optical wavelengths in the red region of the visible spectrum in order to impart a reddish color or semi-transparent character to the scanning window. This makes the internal optical components less visible and thus remarkably improves the external appearance of the bioptical laser scanning system. This feature also makes the bioptical laser scanner less intimidating to customers at point-of-sale (POS)

stations where it may be used. The second function of the narrow-band spectral filtering subsystem is to transmit to the photodetector for detection, only the narrow band of spectral components comprising the outgoing laser beam produced by the associated laser beam production module. Details regarding this optical filtering subsystem are disclosed in copending application Ser. No. 08/439,224, entitled "Laser Bar Code Symbol Scanner Employing Optical Filtering With Narrow Band-Pass Characteristics and Spatially Separated Optical Filter Elements" filed on May 11, 1995, which is incorporated herein by reference in its entirety.

Electrical Subsystem

The illustrative bioptical laser scanning system 1' comprises a number of system components as shown in the system diagram of FIG. 7, including: photodetectors (e.g. a silicon photocells) for detection of optical scan data signals generated by the respective laser scanning stations (e.g., HST1, HST2, VST1); signal conditioning circuitry for conditioning (e.g., preamplification and/or filtering out unwanted noise in) the electrical signals out by the photodetectors; bar code symbol detection circuitry (e.g., analog and/or digital circuitry) that forms a digitized representation (e.g., a sequence of binary bit values) of a bar code label being read from signals derived from the output of the signal conditioning circuitry; bar code digitization circuitry that converts the digitized representation of the bar code symbol being read into a corresponding digital word value, and bar code symbol decode circuitry that decodes the digital word value of the bar code symbol being read to generate character data string values associated therewith.

As described above, during laser scanning operations, the optical scan data signal $D_0$ focused and incident on the photodetectors is produced by light rays associated with a diffracted laser beam being scanned across a light reflective surface (e.g. the bars and spaces of a bar code symbol) and scattering thereof, whereupon the polarization state distribution of the scattered light rays is typically altered when the scanned surface exhibits diffuse reflective characteristics. Thereafter, a portion of the scattered light rays are reflected along the same outgoing light ray paths toward the facet which produced the scanned laser beam. These reflected light rays are collected by the scanning facet and ultimately focused onto the photodetector by its parabolic light reflecting mirror. The function of each photodetector is to detect variations in the amplitude (i.e. intensity) of optical scan data signal $D_0$, and produce in response thereto an electrical analog scan data signal $D_1$ which corresponds to such intensity variations. When a photodetector with suitable light sensitivity characteristics is used, the amplitude variations of electrical analog scan data signal $D_1$ will linearly correspond to light reflection characteristics of the scanned surface (e.g. the scanned bar code symbol). The function of the signal conditioning circuitry is to amplify and/or filter the electrical analog scan data signal $D_1$, in order to improve the SNR of the analog signal.

The bar code symbol detection circuitry processes the conditioned $D_1$ signals produced by the signal conditioning circuitry to form a digitized representation (e.g., a sequence of binary bit values) of a bar code label being read from the information encoded in the conditioned $D_1$ signals. In practice, this processing (which may be performed in the analog domain or digital domain) is a thresholding function which converts the conditioned analog scan data signal $D_1$ into a corresponding digital scan data signal $D_2$ having first and second (i.e. binary) signal levels which correspond to the bars and spaces of the bar code symbol being scanned. Thus, the digital scan data signal $D_2$ appears as a pulse-width modulated type signal as the first and second signal levels vary in proportion to the width of bars and spaces in the scanned bar code symbol.

The bar code digitization circuitry processes the digital scan data signal $D_2$, associated with each scanned bar code symbol, to form a corresponding sequence of digital words $D_3$ (i.e., a sequence of digital count values). Notably, in the digital word sequence $D_3$, each digital word represents the time length associated with each first or second signal level in the corresponding digital scan data signal $D_2$. Preferably, these digital count values are in a suitable digital format for use in carrying out various symbol decoding operations which, like the scanning pattern and volume of the present invention, will be determined primarily by the particular scanning application at hand. Reference is made to U.S. Pat. No. 5,343,027 to Knowles, incorporated herein by reference, as it provides technical details regarding the design and construction of microelectronic bar code digitization circuits suitable for use in the illustrative bioptical laser scanning system.

The bar code symbol decoding circuitry receive the digital word sequences $D_3$ produced from the bar code digitization circuits, and subject such words to one or more bar code symbol decoding algorithms in order to determine which bar code symbol is indicated (i.e. represented) by the given digital word sequence $D_3$, originally derived from corresponding scan data signal $D_1$ detected by the photodetector associated therewith. In more general scanning applications, the function of the bar code symbol decoding circuitry is to receive each digital word sequence $D_3$ produced from the digitizing circuit, and subject it to one or more pattern recognition algorithms (e.g. character recognition algorithms) in order to determine which pattern is indicated by the digital word sequence $D_3$. In bar code symbol reading applications, in which scanned code symbols can be any one of a number of symbologies, a bar code symbol decoding algorithm with auto-discrimination capabilities can be used in a manner known in the art. In the preferred embodiment, the bar code symbol decoding function is carried out in software as part of a programmed routine that executes on the programmed microprocessor.

Details of exemplary signal processing circuitry for signal conditioning and bar code detection and decoding is set forth in U.S. application Ser. No. 10/045,605, incorporated by reference above in its entirety.

As shown in FIG. 7, the system also includes a programmed microprocessor (e.g., system controller) with a system bus and associated program and data storage memory, for controlling the system operation of the bioptical laser scanner and performing other auxiliary functions and for receiving bar code symbol character data (provided by the bar code symbol decoding circuitry); a data transmission subsystem for interfacing with and transmitting symbol character data and other information to host computer system (e.g. central computer, cash register, etc.) over a communication link therebetween; and an input/output interface for providing drive signals to an audio-transducer and/or LED-based visual indicators used to signal successful symbol reading operations to users and the like, for providing user input via interaction with a keypad, and for interfacing with a plurality of accessory devices (such as an external handheld scanner that transmits bar code symbol character data to the bioptical laser scanning system, a display device, a weight scale, a magnetic card reader and/or a coupon printer as shown). In addition, the input-output interface may provide a port that enables an external handheld scanner to transmit sequences of digital words $D_3$ (i.e. a sequence of digital count values) generated therein to the bioptical laser scanning system for bar code symbol decoding operations. Details of such an interface port are described in U.S. Pat. No. 5,686,717 to Knowles et al., commonly assigned to the assignee of the present invention, herein incorporated by reference in its entirety.

The microprocessor also produces motor control signals, and laser control signals during system operation. Motor control circuitry operates in response to such motor control signals to drive the two motors (motor 1 and motor 2) that cause rotation of the first and second rotating polygonal mirrors PM1 and PM2, respectively. In addition, VLD drive circuitry operates in response to such laser control signals to supply current to the laser diodes of the laser beam production modules in the three laser scanning stations HST1, HST2, VST1 and control the output optical power levels of such laser diodes. A power regulation circuit receives 120 Volt, 60 Hz line voltage signal from an external power source (such as a standard power distribution circuit) and provides a regulated supply of electrical power to electrical components of the scanning system.

The communication link between the data transmission subsystem and the host system may be a wireless data link (such as an infra-red link, Bluetooth RF link or IEEE 802.11a or 802.11b RF link) or wired serial data link (such as keyboard wedge link—for example supporting XT-, AT- and PS/2-style keyboard protocols, an RS-232 link, USB link, a Firewire (or IEEE 1394) link, an RS-422 link, and RS-485 link), a wired parallel data bus, or other common wired interface links (such as an OCIA link, IBM 46XX link, Light Pen Emulation link, LTPN link). Similarly, the input/output interface between the external handheld scanner and the bioptical laser scanning system may support a wireless data link (such as an infra-red link, Bluetooth RF link or IEEE 802.11a or 802.11b RF link) or wired serial data link (such as keyboard wedge link—for example supporting XT-, AT- and PS/2-style keyboard protocols, an RS-232 link, USB link, a Firewire (or IEEE 1394) link, an RS-422 link, and RS-485 link), a wired parallel data bus, or other common wired interface links (such as an OCIA link, IBM 46XX link, Light Pen Emulation link, LTPN link).

Modifications

In some scanning applications, where omnidirectional scanning cannot be ensured at all regions within a pre-specified scanning volume, it may be useful to use scan data produced either (i) from the same laser scanning plane reproduced many times over a very short time duration while the code symbol is being scanned there through, or (ii) from several different scanning planes spatially contiguous within a pre-specified portion of the scanning volume. In the first instance, if the bar code symbol is moved through a partial region of the scanning volume, a number of partial scan data signal fragments associated with the moved bar code symbol can be acquired by a particular scanning plane being cyclically generated over an ultra-short period of time (e.g. 1–3 milliseconds), thereby providing sufficient scan data to read the bar code symbol. In the second instance, if the bar code symbol is within the scanning volume, a number of partial scan data signal fragments associated with the bar code symbol can be acquired by several different scanning planes being simultaneously generated by the three laser scanning stations of the system hereof, thereby providing sufficient scan data to read the bar code symbol, that is, provided such scan data can be identified and collectively gathered at a particular decode processor for symbol decoding operations.

In order to allow the illustrative bioptical scanning system to use symbol decoding algorithms that operate upon partial scan data signal fragments, as described above, a SOS synchronization signal (as described below) can be used to identify a set of digital word sequences $D_3$, (i.e. $\{D_S\}$), associated with a set of time-sequentially generated laser scanning beams produced by a particular facet on the first and second rotating polygonal mirrors. In such applications, each set of digital word sequences can be used to decode a partially scanned code symbol and produce symbol character data representative of the scanned code symbol. In code symbol reading applications where complete scan data signals are used to decode scanned code symbols, the synchronizing signal described above need not be used, as the digital word sequence $D_3$ corresponding to the completely scanned bar code symbol is sufficient to carry out symbol decoding operations using conventional symbol decoding algorithms known in the art.

As each synchronizing pulse in the synchronizing signal is synchronous with a "reference" point on the respective rotating mirror, the symbol decoding circuitry provided with this periodic signal can readily "link up" or relate, on a real-time basis, such partial scan data signal fragments with the particular facet on the respective rotating polygonal mirror that generated the partial scan data fragment. By producing both a scan data signal and a synchronizing signal as described above, the laser scanning system of the present invention can readily carry out a diverse repertoire of symbol decoding processes which use partial scan data signal fragments during the symbol reading process.

The SOS synchronizing signal can be derived from a position sensor (such as a hall sensor), integrated into the rotating shaft (or other portion) of the rotating polygonal mirror, that generates an electrical signal when the rotating polygonal mirror reaches a predetermined point (such as a start-of-scan position) in its rotation. Alternatively, such synchronization may be derived from a position indicating optical element (e.g., mirror or lens), which is preferably mounted adjacent (or near) the perimeter of one of the light folding mirrors, such that the position indicating optical element is illuminated by the scanning beam when the rotating polygonal mirror reaches a predetermined point (such as a start-of-scan position) in its rotation. The position indicating optical element may be a mirror that directs the illumination of the scanning beam incident thereon to a position indicating optical detector (which generates an electrical signal whose amplitude corresponds to the intensity of light incident thereon). Alternatively, the position indicating optical element may be a light collecting lens that is operably coupled to a light guide (such as a fiber optic bundle) that directs the illumination of the scanning beam incident thereon to a position indicating optical detector (which generates an electrical signal whose amplitude corresponds to the intensity of light incident thereon).

The illustrative bioptical laser scanning systems described herein can be modified in various ways.

For example, the rotating polygonal mirrors can be substituted by one or more multi-faceted rotating holographic disk. A detailed description of such a system is described in detail in U.S. patent application No. 09/551,887, filed Apr. 18, 2000, commonly assigned to the assignee of the present invention, incorporated by reference herein in its entirety.

In another example, more (or less) groups of beam folding mirrors can be used in each laser scanning station within the system and/or more or less facets can be used for the rotating polygonal mirrors. Such modifications will add (or remove) scanning planes from the system.

Also more or less laser scanning stations might be employed within the system. Such modifications might be practiced in order to provide an omnidirectional laser scanning pattern having scanning performance characteristics optimized for a specialized scanning application.

While the second rotating polygonal mirror of the illustrative embodiment employs facets having low and high elevation angle characteristics, it is understood that it might be desirable in particular applications to use scanning facets with different characteristics (such as varying angular reflection characteristics) so as to enable a compact scanner design in a particular application.

Also, it is contemplated that each laser scanning station may not have its own laser source (e.g., VLD). More specifically, as is well known in the scanning art, the laser light produced by a laser source (OLD) may be split into multiple beams (with a beam splitter) and directed to multiple laser scanning stations with mirrors, a light pipe or other light directing optical element.

While the various embodiments of the laser scanner hereof have been described in connection with linear (1-D) bar code symbol scanning applications, it should be clear, however, that the scanning apparatus and methods of the present invention are equally suited for scanning 2-D bar code symbols, as well as alphanumeric characters (e.g. textual information) in optical character recognition (OCR) applications, as well as scanning graphical images in graphical scanning arts.

Several modifications to the illustrative embodiments have been described above. It is understood, however, that various other modifications to the illustrative embodiment of the present invention will readily occur to persons with ordinary skill in the art. All such modifications and variations are deemed to be within the scope and spirit of the present invention as defined by the accompanying Claims to Invention.

What is claimed is:

1. A laser scanning system for reading bar code symbols, said laser scanning system comprising:
   a system housing having two scanning windows and two corresponding service ports integral thereto; and
   two scan module inserts, each scan module insert being removably disposed within the system housing through a corresponding service port;
   wherein each scan module insert projects an omnidirectional laser scanning pattern through one of said scanning windows; and
   wherein each said scan module contains components including:
      at least one laser diode for producing laser light;
      a rotating scanning element for redirecting laser light incident thereon to produce one or more scanning laser beams;
      an electric motor for rotating the rotating scanning element;
      at least one photodetector for detecting light incident thereon and producing an electrical signal whose amplitude is proportional to the intensity of such detected light; and
      analog signal processing circuitry for conditioning the electrical signal produced by the photodetector.

2. A laser scanning system comprising:
   a system housing having two scanning windows and two corresponding service ports integral thereto; and
   two scan module inserts, each scan module insert being removably disposed within said system housing through a corresponding service port;
   wherein each said scan module contains components including:
      at least one laser diode for producing laser light;
      a rotating scanning element for redirecting laser light incident thereon to produce one or more scanning laser beams;
      an electric motor for rotating the rotating scanning element;
      at least one photodetector for detecting light incident thereon and producing an electrical signal whose amplitude is proportional to the intensity of such detected light; and
      analog signal processing circuitry for conditioning the electrical signal produced by the photodetector; and
   wherein components of one of said two scan module inserts contributes to production of a first omnidirectional laser scanning beam projected through one of the two scanning windows,
   while components of the other of said two scan module inserts contributes to production of a second omnidirectional laser scanning beam projected through the other one of the two scanning windows.

3. A method of reconfiguring or repairing a laser scanning system, said method comprising the steps of:
   (a) providing a system housing having at least one scanning window and at least one service port integral thereto, wherein at least one omnidirectional scanning beam is projected through said scanning window through operation of a first scan module insert, and wherein said first scan module insert is removably disposed within said system housing through said service port, and wherein said first scan module insert includes:
      at least one laser diode for producing laser light;
      a rotating scanning element for redirecting laser light incident thereon to produce one or more scanning laser beams;
      an electric motor for rotating the rotating scanning element;
      at least one photodetector for detecting light incident thereon and producing an electrical signal whose amplitude is proportional to the intensity of such detected light; and
      analog signal processing circuitry that conditions the electrical signal produced by the photodetector;
   (b) providing a second scan module insert, which includes:
      at least one laser diode for producing laser light;
      a rotating scanning element for redirecting laser light incident thereon to produce one or more scanning laser beams;
      an electric motor for rotating the rotating scanning element;
      at least one photodetector for detecting light incident thereon and produces an electrical signal whose amplitude is proportional to the intensity of such detected light; and
      analog signal processing circuitry for conditioning the electrical signal produced by the photodetector;
   (c) removing said first scan module insert from said system housing by passing said first scan module insert through said service port; and
   (d) removably installing said second scan module into said system housing through said service port.

4. The method of claim 3, wherein said first and second scan module inserts have different configurations.

5. The method of 3, wherein said first and second scan module inserts each further include at least one component selected from the group consisting of:

at least one light collecting optical element, corresponding to the at least one photodetector, that collects returning light (i.e., light from the scanning beam which has been reflected and/or scattered by a bar code label being read) and focuses such returning light onto the corresponding photodetector; and at least one beam folding mirror that redirects the scanning laser beam produced by the rotating scanning element through said scanning window, and redirects returning light back toward the rotating scanning element from which it originated.

6. The method of claim 3, wherein said first and second scan module inserts each further include at least one light collecting optical element, corresponding to the at least one photodetector, that collects returning light (i.e., light from the scanning beam which has been reflected and/or scattered by a bar code label being read) and focuses such returning light onto the corresponding photodetector.

7. The method of claim 3, wherein said first and second scan module inserts each further include at least one beam folding mirror that redirects the scanning laser beam produced by the rotating scanning element through said scanning window, and redirects returning light back toward the rotating scanning element from which it originated.

8. The method of claim 3, wherein said first and second scan module inserts each further include at least one component selected from the group consisting of:

at least one light collecting optical element, corresponding to the at least one photodetector, for collecting returning light (i.e., light from the scanning beam which has been reflected and/or scattered by a bar code label being read) and focuses such returning light onto the corresponding photodetector;

at least one beam folding mirror for redirecting the scanning laser beam produced by the rotating scanning element through said scanning window, and redirects returning light back toward the rotating scanning element from which it originated;

analog-to-digital signal conversion circuitry for converting the analog electric signals produced by the analog signal processing circuitry into digital data signals;

bar code detection circuitry for forming a digitized representation (e.g., a sequence of binary bit values) of a bar code label being read from signals derived from the output of the analog signal processing circuitry;

bar code digitization circuitry for converting the digitized representation of the bar code symbol being read produced by said bar code detection circuitry into a corresponding digital word value;

bar code symbol decode circuitry for decoding the digital word value of the bar code label symbol being read produced by said bar code digitization circuitry to generate character data string values associated therewith;

interface circuitry for formatting one of said digitized representation and said digital word value of the bar code label symbol into a specific output format;

interface circuitry for converting the character data string values of a bar code label into a format suitable for transmission over a communication link to an external host system;

circuitry for communicating the character data string values over a communication link to an external host system;

circuitry for storing the character data string values in persistent memory for subsequent communication to an external host system;

laser drive circuitry for supplying current to the at least one laser diode and controls the output optical power levels of the at least one laser diode;

motor drive circuitry for supplying power to the motor that rotates the rotating scanning element;

a system controller for performing system control operations; and power supply circuitry, operably coupled to an external power supply, for providing a regulated supply of electrical power to electrical components of the system.

9. The method of claim 3, wherein said first and second scan module inserts each further include two laser diodes and two corresponding photodetectors disposed on opposite sides of said rotating scanning element, in addition to analog signal processing circuitry that conditions the electrical signal produced by the two photodetectors.

10. The method of claim 6, wherein said first and second scan module inserts each further include:

two laser sources and two corresponding photodetectors disposed on opposite sides of said rotating scanning element, in addition to analog signal processing circuitry that conditions the electrical signal produced by the two photodetectors; and two light collecting optical element corresponding to the two photodetectors disposed on opposite sides of said rotating scanning element.

11. The method of claim 7, wherein said first and second scan module inserts, when mated to the system housing, are each fixably disposed such that the exterior surface of the scan module insert is flush with the exterior surface of the system housing that is adjacent said service port.

12. The method of claim 7, wherein said first and second scan module inserts and the system housing include a mating mechanism that enables the respective scan module insert to be fixably mated and unmated to the system housing such that the respective scan module insert is disposed within the system housing and that also enables spatial registration of optical components mounted within the respective scan module insert to optical components mounted within the system housing.

13. The method of claim 12, wherein said mating mechanism comprises an interlocking flange structure with screw holes, posts and screws.

14. The method of claim 3, wherein a first electrical interconnect is integral to the system housing and is operably coupled to electric components integral thereto, and a second electrical interconnect is integral to each respective scan module insert and is operably coupled to electrical components integral thereto, wherein the first and second electrical interconnects are releasably coupled together to provide an electric connection between the electrical components operably coupled thereto.

15. The method of claim 14, wherein said first electrical interconnect and said second electrical interconnect are fixably mounted to the system housing and respective scan module insert, respectively, in a manner that provides for spatial registration and electrical connection between the two interconnects when the respective scan module insert is mated to system housing.

16. The method of claim 3, wherein said rotating scanning element comprises a rotating polygonal mirror.

17. The method of claim 3, wherein said rotating scanning element comprises a rotating multi-faceted holographic disk.

18. The method of claim 3, wherein the system housing includes two scanning windows and two corresponding service ports integral thereto; and further comprising the step of providing two scan module inserts that are removably disposed within the system housing through a corresponding service port; wherein each said scan module insert includes:
- at least one laser diode that produces laser light;
- a rotating scanning element that redirects laser light incident thereon to produce one or more scanning laser beams;
- an electric motor that rotates the rotating scanning element;
- at least one photodetector that detects light incident thereon and produces an electrical signal whose amplitude is proportional to the intensity of such detected light; and
- analog signal processing circuitry that conditions the electrical signal produced by the photodetector.

19. The method of 18, wherein components of one of said two scan module inserts contributes to production of an omnidirectional laser scanning beam projected through one of the two scanning windows, while components of the other of said two scan module inserts contributes to production of an omnidirectional laser scanning beam projected through the other one of the two scanning windows.

20. A bioptical laser scanning system comprising:
- a system housing having first and second scanning windows and first and second service ports integral to said system housing, and corresponding to said first and second scanning windows, respectively;
- a first scan module insert removably disposed within said system housing through said first service port, and projecting a first omnidirectional laser scanning pattern through said first scanning window;
- a second scan module insert removably disposed within said system housing through said second service port, and projecting a second omnidirectional laser scanning pattern through said second scanning window, wherein said first and second omnidirectional laser scanning patterns intersect within 3D scanning volume disposed between said first and second scanning windows, and produce a complex omnidirectonal laser scanning pattern for reading bar code symbols omnidirectionally when presented within said 3D scanning volume; and
wherein said first and second scan module inserts each contain components including:
- at least one laser diode for producing laser light;
- a rotating scanning element for redirecting laser light incident thereon to produce one or more scanning laser beams;
- an electric motor for rotating the rotating scanning element;
- at least one photodetector for detecting light incident thereon and producing an electrical signal whose amplitude is proportional to the intensity of such detected light; and
- analog signal processing circuitry for conditioning the electrical signal produced by the photodetector.

21. The bioptical laser scanning system of claim 20, wherein the components of said first scan module insert contributes to production of said first omnidirectional laser scanning beam projected through said first scanning window, while the components of said second scan module insert contributes to production of said second omnidirectional laser scanning beam projected through said second scanning window.

22. The bioptical laser scanning system of claim 20, wherein said first and second scan module inserts each further include at least one component selected from the group consisting of:
- at least one light collecting optical element, corresponding to the at least one photodetector, that collects returning light (i.e., light from the scanning beam which has been reflected and/or scattered by a bar code label being read) and focuses such returning light onto the corresponding photodetector; and
- at least one beam folding mirror that redirects the scanning laser beam produced by the rotating scanning element through the respective scanning window, and redirects returning light back toward the rotating scanning element from which it originated.

23. The bioptical laser scanning system of claim 20, wherein said first and second scan module inserts each further include at least one light collecting optical element, corresponding to the at least one photodetector, that collects returning light (i.e., light from the scanning beam which has been reflected and/or scattered by a bar code label being read) and focuses such returning light onto the corresponding photodetector.

24. The bioptical laser scanning system of claim 20, wherein said first and second scan module inserts each further include at least one beam folding mirror that redirects the scanning laser beam produced by the rotating scanning element through the respective scanning window, and redirects returning light back toward the rotating scanning element from which it originated.

25. The bioptical laser scanning system of claim 20, wherein said first and second scan module inserts each further include at least one component selected from the group consisting of:
- at least one light collecting optical element, corresponding to the at least one photodetector, for collecting returning light (i.e., light from the scanning beam which has been reflected and/or scattered by a bar code label being read) and focuses such returning light onto the corresponding photodetector;
- at least one beam folding mirror for redirecting the scanning laser beam produced by the rotating scanning element through said scanning window, and redirects returning light back toward the rotating scanning element from which it originated;
- analog-to-digital signal conversion circuitry for converting the analog electric signals produced by the analog signal processing circuitry into digital data signals;
- bar code detection circuitry for forming a digitized representation (e.g., a sequence of binary bit values) of a bar code label being read from signals derived from the output of the analog signal processing circuitry;
- bar code digitization circuitry for converting the digitized representation of the bar code symbol being read produced by said bar code detection circuitry into a corresponding digital word value;
- bar code symbol decode circuitry for decoding the digital word value of the bar code label symbol being read produced by said bar code digitization circuitry to generate character data string values associated therewith;
- interface circuitry for formatting one of said digitized representation and said digital word value of the bar code label symbol into a specific output format;
- interface circuitry for converting the character data string values of a bar code label into a format suitable for transmission over a communication link to an external host system;

circuitry for communicating the character data string values over a communication link to an external host system;

circuitry for storing the character data string values in persistent memory for subsequent communication to an external host system;

laser drive circuitry for supplying current to the at least one laser diode and controls the output optical power levels of the at least one laser diode;

motor drive circuitry for supplying power to the motor that rotates the rotating scanning element;

a system controller for performing system control operations; and power supply circuitry, operably coupled to an external power supply, for providing a regulated supply of electrical power to electrical components of the system.

26. The bioptical laser scanning system of claim 20, wherein said first and second scan module inserts, when mated to the system housing, are each fixably disposed such that the exterior surface of the scan module insert is flush with the exterior surface of the system housing that is adjacent said service port.

27. The bioptical laser scanning system of claim 20, wherein said first and second scan module inserts and the system housing include a mating mechanism that enables the respective scan module insert to be fixably mated and unmated to the system housing such that the respective scan module insert is disposed within the system housing and that also enables spatial registration of optical components mounted within the respective scan module insert to optical components mounted within the system housing.

28. The bioptical laser scanning system of claim 27, wherein said mating mechanism comprises an interlocking flange structure with screw holes, posts and screws.

29. The of bioptical laser scanning system 20, wherein a first electrical interconnect is integral to the system housing and is operably coupled to electric components integral thereto, and a second electrical interconnect is integral to each respective scan module insert and is operably coupled to electrical components integral thereto, wherein the first and second electrical interconnects are releasably coupled together to provide electric connection between the electrical components operably coupled thereto.

30. The bioptical laser scanning system of claim 20, wherein said rotating scanning element comprises a rotating polygonal mirror.

31. The bioptical laser scanning system of claim 20, wherein said rotating scanning element comprises a rotating multi-faceted holographic disk.

32. The bioptical laser scanning system of claim 30, wherein said first electrical interconnect and second electrical interconnect are fixably mounted to the system housing and respective scan module insert, respectively, in a manner that provides for spatial registration and electrical connection between the two interconnects when the respective scan module insert is mates to the system housing.

* * * * *